US010664246B2

(12) United States Patent
Hoover

(10) Patent No.: US 10,664,246 B2
(45) Date of Patent: May 26, 2020

(54) METHOD AND SYSTEM FOR USING INFORMATION ABOUT CHANGE TO DESIGN EVOLVABLE COMPOSITIONS OF REUSABLE SOFTWARE COMPONENTS

(71) Applicant: BiznessLegion, LLC, Sewickley, PA (US)

(72) Inventor: Carol L. Hoover, Sewickley, PA (US)

(73) Assignee: BiznessLegion, LLC, Sewickley, PA (US)

( * ) Notice: Subject to any disclaimer, the term of this patent is extended or adjusted under 35 U.S.C. 154(b) by 0 days.

(21) Appl. No.: 16/167,991

(22) Filed: Oct. 23, 2018

(65) Prior Publication Data

US 2020/0125340 A1    Apr. 23, 2020

(51) Int. Cl.
  *G06F 9/44*  (2018.01)
  *G06F 8/36*  (2018.01)
  (Continued)

(52) U.S. Cl.
  CPC .................. *G06F 8/36* (2013.01); *G06F 8/10* (2013.01); *G06F 8/20* (2013.01)

(58) Field of Classification Search
  CPC ....................................................... G06F 8/36
  See application file for complete search history.

(56) References Cited

U.S. PATENT DOCUMENTS

2010/0153908 A1\* 6/2010 Sarkar ..................... G06Q 10/00
                                                                   717/104
2011/0214104 A1\* 9/2011 Sharma ..................... G06F 8/34
                                                                   717/105

(Continued)

OTHER PUBLICATIONS

Shtern, M. et al., Clustering Methodologies for Software Engineering, 2012, Advances in Software Engineering, 1-19, Hindawi Publishing Corporation.

(Continued)

*Primary Examiner* — Hang Pan
(74) *Attorney, Agent, or Firm* — Buchanan Ingersoll & Rooney PC

(57) ABSTRACT

A computer-implemented method and system that systematically and analytically uses information about change to design evolvable compositions of reusable software components (modules and other units of software encapsulation) for the development of evolvable software solutions. The invention provides a computerized framework for identifying, capturing, encoding, codifying, learning, verifying, applying, and reusing information acquired through requirements and design analyses to systematically determine compositions of reusable components that localize the impact of expected and feasible or feasible (EFF) change, promote reuse, and thereby can help lower the cost associated with software evolution. The framework provides computerized support for the systematic transformation of natural language descriptions of the data and operational requirements of one or more related solutions into alternative sets of multi-level required components via iterative analysis of required solution elements with respect to EFF change and reuse followed by automated partitioning based on such iterative analysis. A partition of functionally general or conceptually higher-level required elements can serve as a baseline architecture for the design of evolvable software systems or related software solutions, while a partition of detailed or lower-level required elements may be used to design reusable components that compose larger software components or parts of evolvable software solutions.

40 Claims, 10 Drawing Sheets

(51) Int. Cl.
  *G06F 8/10* (2018.01)
  *G06F 8/20* (2018.01)

(56) References Cited

U.S. PATENT DOCUMENTS

| | | | | |
|---|---|---|---|---|
| 2012/0066664 | A1* | 3/2012 | Howard | G06F 8/20 717/106 |
| 2013/0097583 | A1* | 4/2013 | Kung | G06F 8/10 717/105 |
| 2014/0129213 | A1* | 5/2014 | Kimelfeld | G06F 17/271 704/9 |
| 2017/0003937 | A1* | 1/2017 | Huebra | G06F 8/20 |

OTHER PUBLICATIONS

Hoover, C.L. et al., The Metaphor Project Summary Report: Technology for Analyzing Change and Composing Resusable, Real-Time Components and Applications, 1998, The Robotics Institute, Carnegie Mellon University, 1-18.

Hoover, C.L. et al., Analytical Partition of Software Components for Evolvable and Reliable MEMS Design Tools, 1998, IEEE Third International High-Assurance Systems Engineering Symposium, 188-199, IEEE Computer Society Press.

Gamma, E. et al., Design Patterns Elements of Reusable Object-Oriented Software, 1995, 1-33, Addison-Wesley Publishing Company.

Cai, Y. et al., Design Rule Spaces: A New Model for Representing and Analyzing Software Architecture, 1-27, http://www.ieee.org/publications_standards/publications/rights/index.html, 2018 IEEE.

Kazman, R. et al., ADD 3.0: Rethinking Drivers and Decisions in the Design Process, 1-77, Saturn 2015.

Parnas, D.L., On the Criteria to Be Used in Decomposing Systems Into Modules, Communications of the ACM, 1972, vol. 15, No. 12, 1053-1058, Carnegie-Mellon University.

Hoover, C.L. et al., Evaluating Project Decisions Case Studies in Software Engineering, 2010, 1-29, Pearson Education, Inc.

Buschmann, F. et al., A System of Patterns, Pattern-Oriented Software Architecture, 1996, 1-25, John Wiley & Sons.

Hoover, C.L. et al., Analytical Design of Reusable Software Components for Evolvable, Embedded Applications, IEEE Application-Specific Software and Systems Engineering & Technology (ASSET '99), 1999, 170-179, IEEE Computer Society Press.

Suh, N. P. et al., Axiomatic Design of Software, Axiomatic Design-Advances and Applications, 2001, 239-298, Massachusetts Institute of Technology, Oxford University Press.

Malavolta, I., What Industry Needs from Architectural Languages: A Survey, IEEE Transactions on Software Engineering, 2013, 869-891, vol. 39, No. 6, IEEE Computer Society.

Shaw, M. et al., Architecture—Perspectives on an Emerging Discipline, An Alan R. Apt Book, 1996, 1-8, Prentice-Hall Inc.

Hoover, C. L., Analytical Design of Evolvable Software for High-Assurance Computing, School of Computer Science, Carnegie Mellon University, 2001, 1-350.

* cited by examiner

METHOD AND SYSTEM FOR USING INFORMATION ABOUT CHANGE TO DESIGN EVOLVABLE COMPOSITIONS OF REUSABLE SOFTWARE COMPONENTS

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

TECHNICAL FIELD

The present description relates to the fields of requirements analysis (problem), architectural design (solution), and knowledge management (capture and codification of information and experience to build reusable knowledge assets for software solution development), as well as, more specifically to the systematic application of information about change to analytically design compositions of reusable software components that facilitate evolution and rapid development of solutions. Professionals working in this field may have titles such as software architects, software developers, software engineers, software project managers, solution architects, and technical software product managers.

BACKGROUND OF THE INVENTION

1. Overview

Enterprises, companies, consulting firms, clients, and other organizations ("enterprises") may seek to have componentized software or designs for componentized software solutions ("solutions") developed. Furthermore, enterprises may pursue the development of similar solutions that can be reliably evolved or rapidly produced with minimal effort and risk. For example, they may want to develop families of products or applications whose required features are similar but variant across different versions.

In pursuit of these enterprise objectives, solution developers make decisions about what precisely constitutes the required elements of one or more related solutions, about whether the required elements should be refined in some way to yield better solutions, and about how to group the required elements or their refinements into components that will compose the target and related solutions. The results of these decisions depend on the information gathered as well as the knowledge and expertise of the solution developers.

2. Description of Related Arts

Current techniques, such as use cases, user scenarios, and data or operational models help solution developers to describe and analyze the required behavior of a solution. Architectural description languages and modeling techniques (Clements 1996, Shua and Krebs 2008, Malavolta et al. 2013), architecture analysis and design methods (Kazman and Cervantes 2015, Cai et al. 2018), architectural and design patterns (Gamma et al. 1995, Buschmann et al. 1996), and other techniques help developers to describe solution architectures and to evaluate candidate architectures for applicability or reuse. Using these techniques, a developer may find an existing solution that can be easily modified to satisfy the requirements for a new solution. There is no guarantee that existing solutions will facilitate the evolution of target solutions.

There is research involving analytical ways to acquire an understanding of the high-level structure of an existing software system. These approaches involve the discovery and grouping of entities (e.g. classes or files) within a software implementation (source code) into meaningful subsystems. Shtern and Tzerpos (2012) overview the state of the art in clustering methodologies used to detect the organization of existing software systems. Cai et al. (2018) explain that clustering techniques recover high-level architectural views from source code with respect to singular points of view such as cohesion and coupling (dependencies between modules or files), lexical information (e.g. comments or naming), and similarity measures. They present an alternative approach for architectural recovery and analysis that focuses on multiple points of view and design spaces. The end goal for these reengineering efforts is to refactor an existing system to achieve a better design.

The invention differs from the clustering (recovery and refactoring) approaches and design space analysis (recovery and evaluation) techniques in several ways. Starting with basic elements of requirements rather than source code, the invention is a machine-assisted way to generate (rather than to recover an understanding of) an evolvable baseline architecture for related software solutions to be implemented. The invention focuses on software design for evolution and reuse, critical objectives for software product families. The invention gathers and archives design and other software development decisions along with the rationale for these decisions to simplify the understanding and maintenance of target solutions throughout their software life cycle, whereas recovery and refactor techniques typically are applied during the maintenance phase. The invention applies in general to the design of componentized software at various levels of abstraction (architectural to lower-level design). The recovery techniques focus on the lowest of abstraction, the source code, to make sense of the architecture of a software system in retrospect.

Axiomatic design applies functional decomposition to reduce the coupling between software objects resulting from the sequence of connections between them. The goal is the creation of functionally independent software modules to simplify the test and maintenance of the resulting software system (Suh 2001). The innovations described in patent documents U.S. Pat. No. 7,546,577B2 and U.S. Pat. No. 8,042,098B2 apply axiomatic design to the analysis and restructuring of object-oriented source code to minimize dependencies between classes. Similarly, the invention is a top-down approach that starts with statements of requirements and applies functional decomposition. In contrast, the invention focuses on the analysis, refinement, and automated partitioning (grouping) of required solutions elements into multi-level components with respect to change and reuse within and across related solutions. The design goal is localization with respect to change to simplify software evolution. A resulting partition or composition of components may represent various levels of abstraction from system architecture to detailed design, depending on the scope of the input requirements.

There is minimal automation to enable (1) the systematic and repeatable design of solutions that are evolvable and reusable or (2) the computerized generation of a solution architecture that facilitates the proliferation of related solutions. Designing a baseline architecture that can be reused and evolved across related or similar solutions primarily is manual process dependent on the knowledge and skill of the solution architect, though automation exists for generating templates for components (component names and interfaces) once a baseline or reference architecture is determined or selected and for analyzing source code to determine the dependencies between software modules.

There is a need for automatable and commercially useful techniques that enable the developer to systematically use information change to refine and partition the required elements of a solution into a composition of reusable components that facilitate evolution of the target solution and rapid development of related solutions. There is a corresponding need for automated methods and systems to guide users in gathering the rights types of information and in making critical decisions appropriately to ensure repeatable, cost-effective results. The return on the investment increases if the methods and systems can capture, codify, manage, and promote the reuse of useful information and effective decisions.

The inventor's doctoral dissertation established a theoretical basis for using information about change to partition a set of required data and operations represented by textual identifiers into a single-level composition of components that minimize the impact of making expected changes to the implemented solution (Hoover 2001). For funding purposes, the inventor applied her theoretical partitioning approach to the design of software systems with high assurance requirements (Hoover and Khosla 1996, 1998b; Hoover et al. 1999). The theoretical foundation for the invention applies in general to the design of evolvable and componentized software systems, regardless of the application area in which the software is to be used. The Metaphor Project demonstrated that the input and partitioning of textual identifiers into single-level components based on their relationships with respect to change could be computerized (Hoover and Khosla 1998a). This work demonstrated the feasibility of automated partitioning to determine compositions of components and helped motivate the need for innovations to make the theoretical concept commercially useful by developing and incorporating it into existing software architecture and component design practice.

The invention expands and transforms this theoretical concept into a commercially useful and innovative method and system to enable computer-guided and assisted integration and reuse of requirements and change analysis information with automated partitioning and component design. The innovations include, along with others, automated partition of multi-level components and the generation of component change signatures and change signature indexes that are used to identify the multi-level components impacted by specific changes. The invention enables the exploration of alternative partitions of required solution elements that can represent varying levels of abstraction and scope. The invention provides specifications for a computerized tool or application that executes in a stand-alone or enterprise computing environment to support iterative and evolutionary solution design.

There are patented methods for using existing software components and reference architectures to develop solutions. For example, patent documents U.S. Pat. No. 8,442,985B2 and U.S. Pat. No. 9,400,778B2 describe computer-implemented technologies to parse textual statements and map predefined keywords to existing software components with capabilities associated with the keywords. Patent document U.S. Pat. No. 8,607,190B2 discusses a method for the selection of suitable software models that map to component code. The invention published in patent document U.S. Pat. No. 8,185,491B2 is a method for classifying and organizing decision instances with respect to a reference architecture to manage software development.

The invention complements but is different from existing software solution design techniques and tools in providing innovations to automatically generate alternative partitions based on iterative analysis of change and reuse to analytically make decisions about the compositions of components that can best serve as baseline architectures for evolvable software solutions. The invention provides innovations in computerized guidance and assistance in gathering, codifying, analyzing, applying, and reusing information needed to accomplish change analysis and partitioning objectives as well as to document, track, and make decisions or resolve issues that specifically correlate to the invention's methods.

SUMMARY

The innovations described herein provide a computer-implemented method and system for systematically managing and using information about expected and feasible or feasible (EFF) change to automatically generate evolvable compositions of reusable software components for target solutions. The method and system ("the invention") embody a framework for identifying, capturing, encoding, codifying, learning, verifying, applying, and reusing information acquired through requirements and design analysis to systematically determine compositions of software components that enable solution evolution with less effort, lower risk of error, and therefore less cost.

Innovations, among others, that constitute the invention include: (1) specialized encoding of target information (specified as tuples and attributes using a formal relational database model though not implying or limited to a specific style of database implementation or specific record structure), (2) key relationships between the invention's attributes that enable automated transformation, optimized search, and reuse of the target information to support systematic and repeatable analysis and design decisions, (3) automated partition of required solution elements into compositions of multi-level components that facilitate evolution of related solutions, (4) automated generation of a symbolic representation of multi-level components to support automated analysis of the impact of EFF change on the components that compose a solution, and (5) automated generation of a change signature index for automated analysis and presentation of the extent of the impact of specific EFF changes under consideration.

Target information for designing evolvable solutions includes, though not exclusively: (1) required elements of the solution and their characteristics, (2) refinements to the required solution elements that make them easier to change and reuse, (3) required solution elements that are targets for reuse within and across related solutions (4) EFF changes to the problem and solution that are identified for the development domain and environment of use, (5) impact of the EFF changes on the required solution elements, (6) likelihood of EFF changes, (7) partitions of target solution elements into multi-level components that minimize the impact of target EFF changes on the solution, and (8) extent of impact of specific EFF changes being considered on the components resulting from a specific partition associated with these EFF changes.

The specifications for tuples and attributes in the detailed description provide precise mathematical definitions by which embodiments of the invention can ensure that target information, input or generated, represented, linked, modified, stored, retrieved, and output by such embodiments, is complete and without error with respect to the specifications. Embodiments of the invention facilitate the analysis and reuse of target information by providing for electronic representation and storage of target information in one or more permanent memory devices configured to support automated storage of, search for, and retrieval of information ("database" or "databases").

Embodiments of the invention can provide distinct benefits over conventional methods and systems. Table I identifies at least some of the salient improvements over conventional methods and systems that can be achieved with the various embodiments disclosed herein. The improvements are identified as capabilities that can be accomplished by embodiments of the invention that operate as stand-alone systems or by embodiments of the invention that interface and collaborate with other systems. Table I further identifies at least some of the tuples and attributes that facilitate the capabilities.

TABLE I

Salient Capabilities of The Invention

| CAPABILITY | TUPLES AND ATTRIBUTES |
|---|---|
| Embodiments of the invention enable a systematic, traceable, and verifiable flow of information from requirement statements to required solution elements and identified EFF changes to the automated partition of required solution elements into an evolvable composition of multi-level components; whereby the evolvable composition localizes the impact of target EFF changes and promotes reuse of required solution elements targeted for inclusion in the partition. Embodiments of the invention provide automated and guided support for input or generation, assignment, representation, modification, storage, retrieval, verification, and output of key analysis and design information, rationale, and decisions that facilitate the development of an evolvable composition of reusable components. The detailed description includes the mathematical specifications for the contents of impacted small components and impacted large components that compose an impact partition and for the contents of not impacted small components and not impacted large components that compose a no impact partition correlating to the impact partition. Embodiments of the invention ensure that the automated generation of these components is correct with respect to these specifications. | REQ_ID-RSNOUN tuples<br>  REQ_ID attribute<br>  RSNOUN attribute<br>REQ_ID-RSVERB tuples<br>  REQ_ID attribute<br>  RSVERB attribute<br>PRIMARY CANDIDATE NOUN tuples<br>  NOUN attribute<br>PRIMARY CANDIDATE VERB tuples<br>  VERB attribute<br>DATA tuples<br>  DATA_ID attribute<br>  NOUN attribute<br>  KEEP FLAG attribute<br>DATA_ID-REQ_ID tuples<br>OPERATION tuples<br>  OP_ID attribute<br>  VERB attribute<br>  KEEP FLAG attribute<br>OP_ID-REQ_ID tuples<br>DATA-OPERATION tuples<br>REUSE CANDIDATE tuples<br>  DA_OR_OP_ID attribute<br>CHANGE DETAILS tuples<br>  CHANGE_ID attribute<br>  LIKELIHOOD attribute<br>CHANGE IMPACT RELATIONSHIP tuples<br>CHANGE IMPACT DECISION tuples<br>  ISSUE attribute<br>  DECISION attribute<br>  STATUS attribute<br>  TARGET LIKELIHOOD<br>  tuplesLIKELIHOOD attribute<br>  USER_ID attribute<br>TARGET KEEP FLAG tuples<br>  KEEP_FLAG attribute<br>  USER_ID attribute<br>IMPACT PARTITION tuples<br>  IMP_PAR_ID attribute<br>IMPACTED SMALL COMPONENT tuples<br>  IMP_SM_COMP_ID attribute<br>IMPACTED SMALL COMPONENT-DATA_OR_OP tuples<br>IMPACTED LARGE COMPONENT tuples<br>  IMP_LG_COMP_ID attribute<br>IMPACTED LARGE COMPONENT-IMPACTED SMALL COMPONENT tuples<br>NO IMPACT PARTITION tuples<br>  NIMP_PAR_ID attribute<br>NOT IMPACTED SMALL COMPONENT tuples<br>NOT IMPACTED LARGE COMPONENT tuples |
| Embodiments of the invention can involve refining primary candidate nouns and primary candidate verbs to eliminate redundant, redundant and ambiguous, or ambiguous candidates and to standardize primary candidate nouns used to describe required item-features and primary candidate verbs used to describe required action-features. Embodiments of the invention can involve identifying standard primary candidate noun synonyms and standard primary candidate verb | PRIMARY CANDIDATE NOUN tuples<br>  NOUN attribute<br>PRIMARY CANDIDATE VERB tuples<br>  VERB attribute<br>NOUN SYNONYM tuples<br>  NOUN attribute<br>  NSYNONYM attribute<br>  STANDARD attribute<br>VERB SYNONYM tuples<br>  VERB attribute |

TABLE I-continued

Salient Capabilities of The Invention

| CAPABILITY | TUPLES AND ATTRIBUTES |
| --- | --- |
| synonyms, thereby providing automated support for learning and using standard primary candidate nouns and standard primary candidate verbs. | VSYNONYM attribute<br>STANDARD attribute |
| Embodiments of the invention can involve enabling identification and reconstruction of deleted primary candidates and facilitating traceability between refined primary candidates and their correlated requirement statements as well as preservation of design rationale. | REQ_ID-RSNOUN tuples<br>  PCDELETED attribute<br>  PCNOUN attribute<br>REQ_ID-RSVERB tuples<br>  PCDELETED attribute<br>  PCVERB attribute<br>PRIMARY CANDIDATE NOUN tuples<br>PRIMARY CANDIDATE VERB tuples |
| Embodiments of the invention can involve characterizing each unique required datum and each unique required operation via a plurality of attributes that compose an associated DATA tuple or an associated OPERATION tuple. The plurality of attributes embeds key information about functional and non-functional requirements as well as design rationale within the specification of a required solution element, thereby helping to ensure that software developers will better understand how the solution element should satisfy its correlated requirement statements. | DATA tuples<br>  DATA_ID attribute<br>  USE attribute<br>  KEEP_FLAG attribute<br>OPERATION tuples<br>  OP_ID attribute<br>  USE attribute<br>  FUNCTION attribute<br>  KEEP_FLAG attribute |
| Embodiments of the invention can provide a plurality of standard values for the KEEP_FLAG attribute that enable software developers to describe in a clear, accurate, and consistent way the purpose of a required solution element within the design of a target software solution. Embodiments of the invention can also provide verification of KEEP_FLAG attribute values with respect to such standard terms. | |
| Embodiments of the invention can involve characterizing each identified reuse candidate via a plurality of attributes that compose an associated REUSE CANDIDATE tuple. The plurality of attributes embeds within the specification of the reuse candidate key information for reusing a specific datum or operation within a target software solution or across related software solutions. | REUSE CANDIDATE tuples<br>  DA_OR_OP_ID attribute<br>  NAME attribute<br>  REUSE_SCOPE attribute<br>  LIBRARY_REFERENCE attribute |
| Embodiments of the invention can provide a plurality of standard values for the REUSE_SCOPE attribute that enable software developers to describe in a clear, accurate, and consistent way the expected scope for reusing a designated datum or operation. Embodiments of the invention may also provide for verification of REUSE_SCOPE attribute values with respect to such standard terms. | |
| Embodiments of the invention can involve refining the required solution elements to satisfy required solution qualities such as changeability, reuse, adaptability, performance, security, and others. The refinements comprise decomposing large-effect solution elements into smaller-effect solution elements, reusing solution elements to reduce redundancy, and others. | DATA tuples<br>  PARENT_RELATIONSHIP attribute<br>  KEEP_FLAG attribute<br>DATA PARENT-CHILD tuples<br>OPERATION tuples<br>  FUNCTION attribute<br>  PARENT_RELATIONSHIP attribute |
| Embodiments of the invention can provide a plurality of standard values for the PARENT_RELATIONSHIP attribute that enable software developers to describe in a clear, accurate, and consistent way the nature of the relationship between a decomposed solution element and the resulting smaller-effect solution elements as well as the rationale for the decomposition. Embodiments of the invention can also provide verification of PARENT_RELATIONSHIP attribute values with respect to such standard terms. |   KEEP_FLAG attribute<br>OPERATION PARENT-CHILD tuples |
| Embodiments of the invention can involve characterizing each EFF change via a plurality of attributes that compose a CHANGE DETAILS tuple, eliminating redundant EFF changes, and reusing EFF change descriptions across analyses of change and evolution that may involve different sets of requirement statements and alternative EFF change likelihood values. | CHANGE DETAILS tuples<br>  CHANGE_ID attribute<br>  DESCRIPTION attribute<br>  LIKELIHOOD attribute<br>CHANGE-KEYWORD tuples |
| Embodiments of the invention can provide a plurality of standard values for the LIKELIHOOD | |

TABLE I-continued

Salient Capabilities of The Invention

| CAPABILITY | TUPLES AND ATTRIBUTES |
|---|---|
| attribute that enable solution developers to describe in a clear, accurate, and consistent way the likelihood of a particular EFF change and to use likelihood as a basis for selecting target EFF changes for a partition analysis. Embodiments of the invention can also provide verification of LIKELIHOOD attribute values with respect to such standard terms. | |
| Embodiments of the invention can involve identifying the impact of the EFF changes on the required solution elements as change impact relationships and describing each change impact relationship between an EFF change and a specific required solution element via a plurality of attributes that compose an associated CHANGE IMPACT RELATIONSHIP tuple. | DATA tuples<br>OPERATION tuples<br>CHANGE DETAILS tuples<br>CHANGE IMPACT RELATIONSHIP tuples<br>  CHANGE_ID attribute<br>  DA_OR_OP_ID attribute<br>  CHANGE_RELATIONSHIP attribute |
| Embodiments of the invention can provide a plurality of standard values for the CHANGE_RELATIONSHIP attribute that enable solution developers to describe in a clear, accurate, and consistent way how a solution element is likely to change if the EFF change that impacts it is implemented. Embodiments of the invention can also provide verification of CHANGE_RELATIONSHIP attribute values with respect to such standard terms. | |
| Embodiments of the invention can involve identifying, characterizing, and tracking change impact decisions via a plurality of attributes that compose a CHANGE IMPACT DECISION tuple associated with each decision to be made about the impact of a specific EFF change on a specific required solution element. | CHANGE IMPACT DECISION tuples<br>  CHANGE_ID attribute<br>  DA_OR_OP_ID attribute<br>  ISSUE attribute<br>  DECISION attribute<br>  STATUS attribute |
| Embodiments of the invention can provide a plurality of standard values for the STATUS attribute that enable solution developers to describe in a clear, accurate, and consistent way the status of an identified change impact decision. Embodiments of the invention can also provide verification of STATUS attribute values with respect to such standard terms. | |
| Embodiments of the invention can involve specifying a target set of EFF changes via selection from a default set of EFF changes identified in a prerequisite analysis of the EFF changes to requirements, requirements and solution elements, or to solution elements (to RRSS).<br>The selection options can include:<br>  Use default set of EFF changes from prerequisite analysis.<br>  Directly select CHANGE DETAILS associated with target EFF changes.<br>  Specify target LIKELIHOOD attribute values for selecting CHANGE DETAILS tuples associated with target EFF changes.<br>Embodiments of the invention can provide for the reuse of target likelihood values associated with a specific user. | CHANGE DETAILS tuples<br>  LIKELIHOOD attribute<br>TARGET LIKELIHOOD tuples<br>  LIKELIHOOD attribute<br>  USER_ID attribute |
| Embodiments of the invention can involve specifying a target set of solution elements via selection from a default set of required solution elements identified in a prerequisite analysis of the unique required data and unique required operations.<br>The selection options can include:<br>  Use default set of required solution elements from prerequisite analysis.<br>  Directly select each DATA tuple or OPERATION tuple associated with a target solution element.<br>  Specify target KEEP FLAG attribute values for selecting DATA tuples, DATA tuples and OPERATION tuples, or OPERATION tuples associated with target solution elements.<br>Embodiments of the invention can provide for the reuse of target keep flag values associated with a specific user. | DATA tuples<br>  KEEP_FLAG attribute<br>OPERATION tuples<br>  KEEP_FLAG attribute<br>TARGET KEEP FLAG tuples<br>  KEEP FLAG attribute<br>  USER_ID attribute |
| Embodiments of the invention can involve verifying the parameters used to generate an impact partition, whereby the parameters comprise target EFF | CHANGE DETAILS tuples<br>  CHANGE_ID attribute<br>  LIKELIHOOD attribute |

TABLE I-continued

Salient Capabilities of The Invention

| CAPABILITY | TUPLES AND ATTRIBUTES |
|---|---|
| changes, target solution elements, and target change impact relationships to be used in generating an impact partition.<br>Embodiments of the invention can further comprise providing for the deletion of parameters if they are associated with invalid or missing tuples, with invalid or missing tuples and open change impact decisions, or with open change impact decisions<br>Embodiments of the invention can involve enabling the generation, storage, retrieval, and comparison of alternative impact partitions by using an IMP_PAR_ID attribute value of the IMPACT PARTITION tuple associated with a specific impact partition to correlate a plurality of tuples associated with parameters and results of an impact partition.<br>Embodiments of the invention can involve using a NIMP_PAR_ID attribute value of the NO IMPACT PARTITION tuple associated with a specific no impact partition to correlate a plurality of tuples associated with the results of the no impact partition and linking a specific no impact partition to its prerequisite impact partition via the IMP_PAR_ID attribute value of the NO IMPACT PARTITION tuple. | DATA tuples<br>  DATA_ID attribute<br>  KEEP_FLAG attribute<br>OPERATION tuples<br>  OP_ID attribute<br>  KEEP_FLAG attribute<br>CHANGE IMPACT RELATIONSHIP tuples<br>CHANGE IMPACT DECISION tuples<br>DATA tuples<br>OPERATION tuples<br>CHANGE DETAILS tuples<br>CHANGE IMPACT RELATIONSHIPS tuples<br>IMPACT PARTITION tuples<br>  IMP_PAR_ID attribute<br>IMPACT PARTITION-CHANGE tuples<br>IMPACT PARTITION-DATA_OR_OP tuples<br>IMPACTED SMALL COMPONENT tuples<br>IMPACTED SMALL COMPONENT-DATA_OR_OP tuples<br>IMPACTED LARGE COMPONENT tuples<br>IMPACTED LARGE COMPONENT-IMPACTED SMALL COMPONENT tuples<br>IMPACT PARTITION-IMPACTED LARGE COMPONENT tuples<br>NOT IMPACTED PARTITION tuples<br>   NIMP_PAR_ID attribute<br>   IMP_PAR_ID attribute<br>NOT IMPACTED SMALL COMPONENT tuples<br>NOT IMPACTED LARGE COMPONENT tuples<br>NOT IMPACTED PARTITION-NOT IMPACTED LARGE COMPONENT tuples |
| Embodiments of the invention can involve generating unique change signature values for impacted large components, unique change signature values for impacted small components, and a change signature index that facilitate intuitive understanding and rapid analysis of the scope and nature of the impact of target EFF changes on the impacted large components and impacted small components that compose an impact partition. | IMPACTED LARGE COMPONENT tuples<br>  IMP_LG_COMP_CH_SIGNATURE attribute<br>IMPACTED SMALL COMPONENT tuples<br>  IMP_SM_COMP_CH_SIGNATURE attribute |
| Embodiments of the invention can involve facilitating analysis of the scope of the impact of target EFF changes across one or more software solutions designed using impact partition analyses that target specific EFF changes via attribute values that provide links between keywords, EFF changes, impacted small components, impacted large components, and target solution elements associated with specific impact partitions.<br>Embodiments of the invention can involve using IMP_PAR_ID attribute values to selectively analyze the impact of target EFF changes with respect to specific impact partitions. | CHANGE-KEYWORD tuples<br>  CHANGE_ID attribute<br>  KEYWORD attribute<br>CHANGE DETAILS tuples<br>  CHANGE_ID attribute<br>CHANGE-IMPACTED SMALL COMPONENT tuples<br>  CHANGE_ID attribute<br>  IMP_SM_COMP_ID attribute<br>IMPACTED SMALL COMPONENT tuples<br>  IMP_SM_COMP_ID attribute<br>IMPACTED LARGE COMPONENT-IMPACTED SMALL COMPONENT tuples<br>  IMP_LG_COMP_ID attribute<br>  IMP_SM_COMP_ID attribute<br>IMPACT PARTITION-LARGE COMPONENT tuples<br>  IMP_PAR_ID attribute<br>  IMP_LG_COMP_ID attribute |
| Embodiments of the invention can involve identifying, characterizing, and tracking analysis decisions via a plurality of attributes that compose an ANALYSIS DECISION tuple associated with each decision to be made regarding an issue identified by users or automatically during the performance of a specific type of analysis.<br>Embodiments of the invention can provide a plurality of standard values for the ANALYSIS attribute that enable solution developers to identify in a clear, accurate, and consistent way the type of an analysis and to track decisions with respect to type of analysis. Embodiments of the invention can also provide verification of STATUS attribute values with respect to such standard terms. | ANALYSIS DECISION tuples<br>  AN_DEC_ID attribute<br>  ANALYSIS attribute<br>  ISSUE attribute<br>  DECISION attribute<br>  STATUS attribute |

TABLE I-continued

Salient Capabilities of The Invention

| CAPABILITY | TUPLES AND ATTRIBUTES |
| --- | --- |
| Embodiments of the invention can involve retaining and managing contextual knowledge of analysis inputs and results to facilitate information retrieval and reuse with respect to specific analyses, specific types of analysis, and specific sets of correlated analyses and to enable recall and reflection on key aspects of analyzing and designing a target software solution. | ANALYSIS CONTEXT tuples<br>  COR_AN_ID attribute<br>  LEAD_USER attribute<br>  ANALYSIS attribute<br>ANALYSIS CONTEXT-REQ_ID tuples<br>ANALYSIS CONTEXT- DATA_OR_OP tuples<br>ANALYSIS CONTEXT-CHANGE DETAILS tuples<br>ANALYSIS CONTEXT-IMPACT PARTITION tuples<br>ANALYSIS CONTEXT-ANALYSIS DECISION tuples<br>Other ANALYSIS CONTEXT tuples |
| Embodiments of the invention can involve enabling the use of analysis context information for automated tracking and reporting of project management information and user access control with respect to specific types of analyses performed within specific sets of correlated analyses.<br>Embodiments of the invention can include capabilities such as the following as well as other capabilities to support project management:<br>  Authorizing and verifying managers for a specific set of correlated analyses.<br>  Authorizing and verifying lead and other users to perform specific analyses.<br>  Tracking and reporting time, status, and other information for each analysis performed within a specified set of correlated analyses.<br>  Tracking and reporting of time, date, and other session information for each time period in which an authorized user works on a specific analysis within a specified set of correlated analyses. | ANALYSIS CONTEXT tuples<br>ANALYSIS MANAGER tuples<br>ANALYSIS AUTHORIZED USER tuples<br>USER PROFILE tuples<br>USER SESSION tuples |

In at least one embodiment, a method and system for designing an evolvable composition of reusable software components involves receiving textual requirement statements for a software solution or part thereof, the textual requirement statements comprising a set of statements about required item-features and action-features for the software solution or part thereof, and performing an analysis.

The analysis involves analyzing required solution elements by: a phase 1 analysis of nouns and verbs in requirements, comprising: for each requirement statement (RS): inputting a unique identifier (REQ_ID) for the RS; inputting each noun or noun phrase that is unique with respect to the RS; associating a RSNOUN attribute value with each inputted noun or noun phrase; generating a REQ_ID-RSNOUN tuple for each inputted noun or noun phrase; inputting each verb or verb phrase that is unique with respect to the RS; associating a RSVERB attribute value with each inputted verb or verb phrase; generating a REQ_ID-RSVERB tuple for each inputted verb or verb phrase. The phase 1 analysis further comprises identifying primary candidate nouns and primary candidate verbs by: for all REQ_ID-RSNOUN tuples having an identical RSNOUN attribute value: generating a PRIMARY CANDIDATE NOUN tuple to be associated with the primary candidate noun; assigning the identical RSNOUN attribute value to a NOUN attribute of the primary candidate noun's associated PRIMARY CANDIDATE NOUN tuple; for all REQ_ID-RSVERB tuples having an identical RSVERB attribute value: generating a PRIMARY CANDIDATE VERB tuple to be associated with the primary candidate verb; assigning the identical RSVERB attribute value to a VERB attribute of the primary candidate verb's associated PRIMARY CANDIDATE VERB tuple.

The analysis involves analyzing required solution elements by: a phase 2 analysis of required data and operations, comprising: mapping each primary candidate noun to a unique required datum in the software solution by: generating a DATA tuple to be associated with the unique required datum and correlating the unique required datum with the primary candidate noun by assigning the NOUN attribute value of the primary candidate noun's associated PRIMARY CANDIDATE NOUN tuple to the NOUN attribute of the unique required datum's associated DATA tuple; using a DATA_ID attribute of the DATA tuple to identify the DATA tuple and its associated datum; using a KEEP_FLAG attribute of the DATA tuple to designate the associated datum's status with respect to the software solution and to select DATA tuples and their associated data based on the KEEP_FLAG attribute value; generating a DATA_ID-REQ_ID tuple for each different REQ_ID attribute value of a REQ_ID-RSNOUN tuple whose RSNOUN attribute value or PCNOUN attribute value is identical to the NOUN attribute value of the unique required datum's associated DATA tuple, thereby correlating the unique required datum with the requirement statements corresponding to the primary candidate noun mapped to the unique required datum; mapping each primary candidate verb to a unique required operation in the software solution by: generating an OPERATION tuple to be associated with the unique required operation and correlating the unique required operation with the primary candidate verb by assigning the VERB attribute value of the primary candidate verb's associated PRIMARY CANDIDATE VERB tuple to the VERB attribute of the unique required operation's associated OPERATION tuple; using an OP_ID attribute of the OPERATION tuple to identify the OPERATION tuple and its associated operation; using the KEEP_FLAG attribute of the OPERATION tuple to designate the associated operation's status with respect to the software solution and to select OPERATION tuples and their associated operations based on the KEEP_FLAG attribute value; generating an OP_ID-REQ_ID tuple for each different REQ_ID attribute value of a REQ_ID-RSVERB tuple whose RSVERB attribute value or PCVERB attribute value is identical to the VERB attribute value of the unique required operation's associated OPERATION tuple, thereby correlating the unique required operation with the requirement statements corresponding to the primary candidate verb mapped to the unique required operation; generating a DATA-OPERATION tuple for each unique required operation that operates solely on a specific unique required datum, whereby the design and implementation of the unique required operation is dependent on the design and implementation of the specific unique required datum; identifying reuse candidates by generating a REUSE CANDIDATE tuple for each unique required datum or unique required operation specifically designated for reuse within a target software solution or across related software solutions; using a DA_OR_OP_ID attribute of the REUSE CANDIDATE tuple to correlate the reuse candidate with a specific DATA tuple and its associated datum or with a specific OPERATION tuple and its associated operation.

The analysis involves analyzing change and evolution of the software solution by: identifying EFF changes that would be made to requirements, requirements and solution elements, or solution elements (to RRSS), whereby each solution element is a unique required datum or is a unique required operation and whereby the EFF changes would be made during the evolution of the software solution, by: for each identified EFF change: generating a CHANGE DETAILS tuple; using a CHANGE_ID attribute of the CHANGE DETAILS tuple to identify the CHANGE DETAILS tuple and its associated EFF change; using a LIKELIHOOD attribute of the CHANGE DETAILS tuple to indicate a likelihood that the associated EFF change will be implemented to evolve the software solution; identifying solution elements that would be impacted by the EFF changes by: for each EFF change: identifying a change impact relationship and generating a CHANGE IMPACT RELATIONSHIP tuple for each solution element that a software developer would need to review and potentially alter to implement the EFF change during the evolution of the software solution; using an ISSUE attribute, a DECISION attribute, and a STATUS attribute of CHANGE IMPACT DECISION tuples to track change impact relationship decisions.

The analysis involves partitioning a target set of solution elements into multi-level software encapsulations that localize the impact of a target set of EFF changes by: specifying target EFF changes by selecting the entire set, or part thereof, of the EFF changes identified in a prerequisite analysis of the EFF changes to RRSS; using a USER_ID attribute of TARGET LIKELIHOOD tuples to associate parameters used to select target EFF changes with a specific user; specifying target solution elements by selecting the entire set, or part thereof, of the solution elements resulting from a prerequisite analysis of the unique required data and of the unique required operations; using the USER_ID attribute of TARGET KEEP FLAG tuples to associate parameters used to select target solution elements with a specific user; generating an IMPACT PARTITION tuple to be associated with an impact partition of target solution elements that would be impacted by target EFF changes; generating or inputting a unique value for an IMP_PAR_ID attribute of the IMPACT PARTITION tuple to identify the IMPACT PARTITION tuple and its associated impact partition; generating a set of small software components that partition the target solution elements that would be impacted by the target EFF changes during evolution of the software solution, whereby each impacted small component comprises one or more impacted target solution elements and each target solution element contained within a specific impacted small component would be impacted by each target EFF change that is associated with the impacted small component, by: for each impacted small component: generating an IMPACTED SMALL COMPONENT tuple; generating or inputting a unique value for an IMP_SM_COMP_ID attribute of the IMPACTED SMALL COMPONENT tuple to identify the IMPACTED SMALL COMPONENT tuple and its associated impacted small component; for each target solution element contained within an impacted small component: generating an IMPACTED SMALL COMPONENT-DATA_OR_OP tuple to correlate the target solution element and its associated DATA tuple or the target solution element and its associated OPERATION tuple with the impacted small component that contains the target solution element and its associated IMPACTED SMALL COMPONENT tuple; generating a set of large software components that partition the impacted small components, whereby each impacted large component comprises the impacted small components whose constituent target solution elements would be impacted by one or more of the target EFF changes associated with the impacted large component, by: for each impacted large component: generating an IMPACTED LARGE COMPONENT tuple; generating or inputting a unique value for an IMP_LG_COMP_ID attribute of the IMPACTED LARGE COMPONENT tuple to identify the IMPACTED LARGE COMPONENT tuple and its associated impacted large component; for each impacted small component contained within an impacted large component: generating an IMPACTED LARGE COMPONENT-IMPACTED SMALL COMPONENT tuple to associate the impacted small component and its associated IMPACTED SMALL COMPONENT tuple with the impacted large component that contains the impacted small component and its associated IMPACTED LARGE COMPONENT tuple; generating a NO IMPACT PARTITION tuple to be associated with a no impact partition of target solution elements that would not be impacted by target EFF changes; generating or inputting a unique value for a NIMP_PAR_ID attribute of the NO IMPACT PARTITION tuple to identify the NO IMPACT PARTITION tuple and its associated no impact partition; for each target solution element that would not be impacted by any of the target EFF changes: generating a NOT IMPACTED SMALL COMPONENT tuple to be associated with a not impacted small component consisting of the solution element; for each not impacted small component: generating a NOT IMPACTED LARGE COMPONENT tuple to be associated with a not impacted large component consisting of the not impacted small component, thus paralleling the multi-level encapsulation of the target solution elements that would be impacted by the target EFF changes.

In some embodiments, the method and system involves refining primary candidate nouns and primary candidate verbs to eliminate redundant, redundant and ambiguous, or ambiguous candidates and to standardize primary candidate nouns used to describe required item-features and primary candidate verbs used to describe required action-features by:

merging and deleting or deleting primary candidate nouns that are redundant by combining and deleting or deleting the associated PRIMARY CANDIDATE NOUN tuples; renaming primary candidate nouns that are ambiguous, ambiguous and non-standard, or non-standard by changing the NOUN attribute values of the associated PRIMARY CANDIDATE NOUN tuples; merging and deleting or deleting primary candidate verbs that are redundant by combining and deleting or deleting the associated PRIMARY CANDIDATE VERB tuples; renaming primary candidate verbs that are ambiguous, ambiguous and non-standard, or non-standard by changing the VERB attribute values of the associated PRIMARY CANDIDATE VERB tuples.

In some embodiments, the method and system involves identifying and using standard primary candidate noun synonyms and standard primary candidate verb synonyms by: for each ordered pair of primary candidate nouns that are synonyms: preloading or generating a NOUN SYNONYM tuple; using a STANDARD attribute of the associated NOUN SYNONYM tuple to designate that a first element in an ordered pair of noun synonyms is a standard noun; searching NOUN SYNONYM tuples to locate and reuse primary candidate nouns that are synonyms and standard nouns; for each ordered pair of primary candidate verbs that are synonyms: preloading or generating a VERB SYNONYM tuple; using the STANDARD attribute of the associated VERB SYNONYM tuple to designate that a first element in an ordered pair of verb synonyms is a standard verb; searching VERB SYNONYM tuples to locate and reuse primary candidate verbs that are synonyms and standard verbs.

In some embodiments, the method and system involves enabling identification and reconstruction of deleted primary candidates and facilitating traceability between refined primary candidates and their correlated requirement statements by: designating the deletion of a primary candidate noun via a PCDELETED attribute of the REQ_ID-RSNOUN tuples that have RSNOUN attribute values identical to the primary candidate noun; using the PCDELETED attribute of REQ_ID-RSNOUN tuples with identical RSNOUN attribute values to identify a primary candidate noun that was deleted and generating a new PRIMARY CANDIDATE NOUN tuple to reconstruct the primary candidate noun; recording a new name for a primary candidate noun in the PCNOUN attribute of the REQ_ID-RSNOUN tuples that have RSNOUN attribute values identical to a former name of the primary candidate noun; using the PCNOUN attribute to locate the REQ_ID-RSNOUN tuples that correspond to the renamed primary candidate noun and using the REQ_ID attribute values of these REQ_ID-RSNOUN tuples to locate the requirement statements that correlate to the primary candidate noun; designating the deletion of a primary candidate verb via the PCDELETED attribute of the REQ_ID-RSVERB tuples that have RSVERB attribute values identical to the primary candidate verb; using the PCDELETED attribute of REQ_ID-RSVERB tuples with identical RSVERB attribute values to identify a primary candidate verb that was deleted and generating a new PRIMARY CANDIDATE VERB tuple to reconstruct the primary candidate verb; recording a new name for a primary candidate verb in the PCVERB attribute of the REQ_ID-RSVERB tuples that have RSVERB attribute values identical to the former name of the primary candidate verb; using the PCVERB attribute to locate the REQ_ID-RSVERB tuples that correspond to the renamed primary candidate verb and using the REQ_ID attribute values of these REQ_ID-RS-VERB tuples to locate the requirement statements that correlate to the primary candidate verb.

In some embodiments, the method and system involves characterizing each unique required datum and each unique required operation via a plurality of attributes that compose the associated DATA tuple or the associated OPERATION tuple by: generating or inputting a unique DATA_ID attribute value to identify the datum or a unique OP_ID value to identify the operation; inputting a USE attribute value that describes a purpose of the datum or operation; inputting a FUNCTION attribute value that outlines the operation's required actions, including directives or calls to other operations in the order of their execution; assigning a KEEP_FLAG attribute value to indicate the status of the datum or operation with respect to its inclusion in the software solution; selecting keep flag values from a plurality of standard terms comprising "ONGOING" to indicate the datum or operation being part of the software solution going forward, "REF" to indicate the datum or operation being used for reference only as part of a design rationale, "REC" to indicate that the datum or operation has been recomposed, and other terms; generating, inputting, or assigning values for other attributes that enable a software developer to understand, implement, and recall required behavior and design rationale for the required datum or for the required operation.

In some embodiments, the method and system involves characterizing each newly identified reuse candidate via a plurality of attributes that compose the associated REUSE CANDIDATE tuple by: assigning the value of the DATA_ID attribute of the corresponding datum's associated DATA tuple or the value of the OP_ID attribute of the corresponding operation's associated OPERATION tuple to the DA_OR_OP_ID attribute of the REUSE CANDIDATE tuple; assigning the value of the NOUN attribute of the corresponding datum's associated DATA tuple or the value of the VERB attribute of the corresponding operation's associated OPERATION tuple as a default value for a NAME attribute of the REUSE CANDIDATE tuple; assigning a value of "ACROSS", "WITHIN", or another standard term to a REUSE_SCOPE attribute of the REUSE CANDIDATE tuple to designate an expected scope for reuse; inputting or assigning a value to a LIBRARY_REFERENCE attribute of the REUSE CANDIDATE tuple that facilitates location of the corresponding datum's implementation or of the corresponding operation's implementation; generating, inputting, or assigning values for other attributes that help the software developer to identify and apply reuse candidates.

In some embodiments, the method and system involves refining the unique required data and the unique required operations to satisfy required software solution qualities, whereby software solution qualities that are required comprise changeability and reuse and software solution qualities that may be required comprise adaptability, performance, security, and others, by: decomposing large-effect parent data into smaller-effect child data and large-effect parent operations into smaller-effect child operations by: for each new child datum: generating a new DATA tuple; assigning a standard value or inputting another value for the NOUN attribute of the new DATA tuple to name the smaller datum; using information associated with a parent datum to determine an appropriate USE attribute value for the child datum; assigning the value "ONGOING" to the new DATA tuple's KEEP_FLAG attribute; generating a DATA PARENT-CHILD tuple to associate the child datum and its associated DATA tuple with the parent datum and its associated DATA tuple; for each requirement statement associated with the parent datum that the child helps to satisfy: generating a DATA_ID-REQ_ID tuple to associate the requirement restatement with the child datum; for each new child operation: generating a new OPERATION tuple; assigning a standard value or inputting another value for the VERB attribute of the new OPERATION tuple to name the smaller operation; using information associated with a parent operation to determine appropriate USE and FUNCTION attribute values for the child operation; assigning the value "ONGOING" to the new OPERATION tuple's KEEP_FLAG attribute; generating an OPERATION PARENT-CHILD tuple to associate the child operation and its associated operation tuple with the parent operation and its associated operation tuple; for each requirement statement associated with the parent operation that the child helps to satisfy: generating an OP_ID-REQ_ID tuple to associate the requirement restatement with the child operation; recharacterizing the parent datum via modification of the parent datum's associated DATA tuple or recharacterizing the parent operation via modification of the parent operation's associated OPERATION tuple by: replacing each required action in the parent operation's FUNCTION attribute value to be performed by a child operation with a name of the child operation consisting of the VERB attribute value of the child operation's associated OPERATION tuple; assigning a value to a PARENT_RELATIONSHIP attribute to indicate a relationship between the parent datum and its child datum or child data or between a parent operation and its child operation or child operations; selecting PARENT_RELATIONSHIP attribute values from a plurality of standard terms comprising "G-S" to indicate a general-to-specific relationship, "W-P" to indicate a whole-part relationship, and other terms; changing the KEEP_FLAG attribute value to "REF" if the parent datum or parent operation will not be needed in the software solution; reducing redundancy through reuse of data and operations within the software solution by: assigning the value "REF" to the KEEP_FLAG attribute of a redundant datum's associated DATA tuple or of a redundant operation's associated OPERATION tuple; replacing each reference to a redundant operation within the FUNCTION attribute value of a referencing operation's associated OPERATION tuple with a name for the operation to be reused in place of the redundant operation.

In some embodiments, the method and system involves enabling recomposition of child data and of child operations by: verifying with respect to a current parent-child and referencing structure within the software solution whether specific data or operations should be recomposed; assigning the value "REC" to indicate recomposed or recombined with parent to the KEEP_FLAG attribute value of each recomposed child's associated DATA tuple or OPERATION tuple; replacing each reference to a recomposed child operation in the FUNCTION attribute value of a parent operation's associated OPERATION tuple by the required action performed by the child operation; assigning the value "ONGOING" to the KEEP_FLAG attribute of the DATA tuple associated with each parent datum of each recomposed child datum; assigning the value "ONGOING" to the KEEP_FLAG attribute of the OPERATION tuple associated with each parent operation of each recomposed child operation.

In some embodiments, the method and system involves describing each EFF change, eliminating redundant EFF changes, and reusing EFF change descriptions across analyses of change and evolution that involve different sets of requirement statements or alternative change likelihood values by: characterizing each EFF change via a plurality of attributes composing the associated CHANGE DETAILS tuple by: generating or inputting a unique CHANGE_ID attribute value to identify the EFF change; inputting a detailed DESCRIPTION attribute value to describe the nature of the EFF change; assigning a LIKELIHOOD attribute value to indicate the current likelihood that the EFF change will be implemented to evolve the software solution; selecting likelihood values from a plurality of standard terms comprising "EXPECTED", "LIKELY", "FEASIBLE", "NOT EXPECTED", and other terms; generating, inputting, or assigning values for other attributes that help the software developer to identify, apply, and reuse change detail descriptions; for each keyword used to search for a specific change and its associated CHANGE DETAILS tuple: preloading or generating a CHANGE-KEYWORD tuple; using CHANGE-KEYWORD tuples to locate and reuse change descriptions; eliminating redundant change descriptions by deleting or archiving the associated CHANGE DETAILS tuples.

In some embodiments, the method and system involves describing each change impact relationship via a plurality of attributes composing the associated CHANGE IMPACT RELATIONSHIP tuple by: assigning the CHANGE_ID attribute value of the CHANGE DETAILS tuple associated with a specific EFF change that would impact a specific solution element to the CHANGE_ID attribute; assigning the DATA_ID attribute value of the DATA tuple or the OP_ID attribute value of the OPERATION tuple associated with the specific solution element that would be impacted by the specific EFF change to the DA_OR_OP_ID attribute; selecting a CHANGE RELATIONSHIP attribute value from a plurality of standard terms comprising "ADD", "MODIFY", "DELETE", "UNCERTAIN", and other terms that describe a type of change that would be needed to the specific solution element that would be impacted by the specific EFF change; generating, inputting, or assigning values for other attributes that help the software developer to understand the impact that EFF changes would have on the solution elements and to make decisions regarding the evolution of the software solution.

In some embodiments, the method and system involves generating a CHANGE IMPACT DECISION tuple for each decision that users identify as needing to be made about whether a specific EFF change would impact a specific solution element and about the nature of the impact; characterizing and tracking change impact decisions to be made via a plurality of attributes comprising the CHANGE IMPACT DECISION tuple associated with each decision by: assigning the CHANGE_ID attribute value of the CHANGE DETAILS tuple associated with the specific EFF change for which a change impact decision is needed to the CHANGE_ID attribute; assigning the DATA_ID attribute value of the DATA tuple or the OP_ID attribute value of the OPERATION tuple associated with the specific solution element for which the change impact decision is needed to the DA_OR_OP_ID attribute; inputting an ISSUE attribute value to describe the issue or decision to be made about the impact of the EFF change; inputting a DECISION attribute value to describe the change impact decision that is made and the rationale for the decision; selecting a STATUS attribute value from a plurality of standard terms comprising "OPEN", "CLOSED", "DISMISSED", and other terms; generating, inputting, or assigning values for other attributes that help the software developer to track and manage change impact decisions.

In some embodiments, the method and system involves specifying the target set of EFF changes via selection from a default set of EFF changes identified in the prerequisite analysis of the EFF changes to RRSS by: enabling users to specify the target EFF changes by directly selecting the associated CHANGE DETAILS tuples or by specifying target LIKELIHOOD attribute values used to select the associated CHANGE DETAILS tuples; generating a TARGET LIKELIHOOD tuple for each valid user-specified likelihood value or for each standard likelihood value; assigning a valid user ID to the USER_ID attribute of the TARGET LIKELIHOOD tuples to designate the target likelihood values for reuse by a specific user.

In some embodiments, the method and system involves specifying the target set of solution elements via selection from a default set of solution elements resulting from the prerequisite analysis of the unique required data and of the unique required operations by: enabling users to specify the target solution elements by directly selecting the associated DATA tuples, DATA tuples and OPERATION tuples, or OPERATION tuples or by specifying target KEEP_FLAG attribute values used to select the associated tuples; generating a TARGET KEEP FLAG tuple for each valid user-specified keep flag value or for each standard keep flag value; assigning a valid user ID to the USER_ID attribute of the TARGET KEEP FLAG tuples to designate the target keep flag values for reuse by a specific user.

In some embodiments, the method and system involves verifying the target EFF changes, target solution elements, and corresponding target change impact relationships to be used in generating the impact partition by: verifying that each EFF change identified in the prerequisite analysis of the EFF changes to RRSS is associated with an existing CHANGE DETAILS tuple that is assigned a valid CHANGE_ID attribute value and a valid LIKELIHOOD attribute value; providing for deletion of EFF changes associated with missing or invalid tuples from the target set of EFF changes; checking the solution elements identified in the prerequisite analysis of the unique required data and of the unique required operations by: verifying that each solution element of type datum is associated with an existing DATA tuple that is assigned a valid DATA_ID attribute value and a valid KEEP_FLAG attribute value; verifying that each solution element of type operation is associated with an existing OPERATION tuple that is assigned a valid OP_ID attribute value and a valid KEEP_FLAG attribute value; providing for deletion of solution elements associated with missing or invalid tuples from the target set of solution elements; using the CHANGE IMPACT DECISION tuples associated with the target EFF changes and the target solution elements to identify corresponding change impact relationships that have not been closed or resolved; providing for exclusion of change impact relationships involving open issues in a subsequent generation of the impact partition by removing the associated CHANGE IMPACT RELATIONSHIP tuples from a target set of CHANGE IMPACT RELATIONSHIP tuples used to generate the impact partition.

In some embodiments, the method and system involves enabling the generation, storage, retrieval, and comparison of alternative impact partitions by: using the IMP_PAR_ID attribute value of the IMPACT PARTITION tuple associated with a specific impact partition to correlate a plurality of tuples associated with parameters and results of the impact partition by: for each target EFF change used to generate the impact partition: generating an IMPACT PARTITION-CHANGE tuple and assigning the IMP_PAR_ID attribute value of the impact partition's associated IMPACT PARTITION tuple to the IMP_PAR_ID attribute of the IMPACT PARTITION-CHANGE tuple; retaining knowledge of the target EFF change's current likelihood by assigning the LIKELIHOOD attribute value of the target EFF change's associated CHANGE DETAILS tuple to the LIKELIHOOD attribute of the IMPACT PARTITION-CHANGE tuple; for each target solution element used to generate the impact partition: generating an IMPACT PARTITION-DATA_OR_OP tuple and assigning the IMP_PAR_ID attribute value of the impact partition's associated IMPACT PARTITION tuple to the IMP_PAR_ID attribute of the IMPACT PARTITION-DATA_OR_OP tuple; retaining knowledge of the target solution element's status by assigning the KEEP_FLAG attribute value of the associated DATA tuple or associated OPERATION tuple to the KEEP_FLAG attribute of the IMPACT PARTITION-DATA_OR_OP tuple; using an IMPACTED attribute of the IMPACT PARTITION-DATA_OR_OP tuple to denote whether the target solution element would be impacted by one or more of the target EFF changes used to generate the impact partition; for each impacted large component composing the impact partition: generating an IMPACT PARTITION-IMPACTED LARGE COMPONENT tuple and assigning the IMP_PAR_ID attribute value of the impact partition's associated IMPACT PARTITION tuple to the IMP_PAR_ID attribute of the IMPACT PARTITION-IMPACTED LARGE COMPONENT tuple; using the IMP_LG_COMP_ID attribute of the IMPACT PARTITION-IMPACTED LARGE COMPONENT tuple to provide a link to the impacted large component's associated IMPACTED LARGE COMPONENT tuple and to corresponding IMPACTED LARGE COMPONENT-IMPACTED SMALL COMPONENT tuples; using IMP_SM_COMP_ID attribute values of corresponding IMPACTED LARGE COMPONENT-IMPACTED SMALL COMPONENT tuples to locate IMPACTED SMALL COMPONENT tuples associated with the impacted small components contained within the impacted large component; using IMP_SM_COMP_ID attribute values of IMPACTED SMALL COMPONENT tuples associated with the impacted small components contained within the impacted large component to locate corresponding IMPACTED SMALL COMPONENT-DATA_OR_OP tuples and using DA_OR_OP_ID attribute values of corresponding IMPACTED SMALL COMPONENT-DA_OR_OR tuples to identify the target solution elements that compose each impacted small component; using the NIMP_PAR_ID attribute value of the NO IMPACT PARTITION tuple associated with a specific no impact partition to correlate a plurality of tuples associated with the results of the no impact partition by: for each not impacted large component composing the no impact partition: generating a NO IMPACT PARTITION-NOT IMPACTED LARGE COMPONENT tuple, whereby a NIMP_LG_COMP_ID attribute of the NO IMPACT PARTITION-NOT IMPACTED LARGE COMPONENT tuple provides a link to the not impacted large component's associated NOT IMPACTED LARGE COMPONENT tuple; using a NIMP_SM_COMP_ID attribute value of the associated NOT IMPACTED LARGE COMPONENT tuple to locate a NOT IMPACTED SMALL COMPONENT tuple associated with the not impacted small component contained within the not impacted large component; using the NOT IMPACTED SMALL COMPONENT tuple's DA_OR_OP_ID attribute value to identify the target solution element contained within the associated not impacted small component; associating each no impact partition with its prerequisite impact partition by correlating the IMP_PAR_ID attribute values of the associated NO IMPACT PARTITION tuple and IMPACT PARTITION tuple.

In some embodiments, the method and system involves generating unique change signature values and a change signature index to facilitate rapid analysis of the scope and nature of the impact of target EFF changes on impacted large components and impacted small components composing an impact partition by: for each impacted large component's associated IMPACTED LARGE COMPONENT tuple: generating and assigning a unique value to an IMP_LG_COMP_CH_SIGNATURE attribute to indicate specific target EFF changes associated with the impacted large component and the scope of the impact of these target EFF changes across the target solution elements contained within the impacted small components that comprise the impacted large component; for each impacted small component's associated IMPACTED SMALL COMPONENT tuple: generating and assigning a unique value to an IMP_SM_COMP_CH_SIGNATURE attribute to indicate specific target EFF changes associated with the impacted small component and the scope of the impact of these target EFF changes across the target solution elements contained within the impacted small component; generating and communicating to users the change signature index that shows the impact of the target EFF changes associated with a specific impact partition by: for each target EFF change associated with the impact partition: indicating the CHANGE_ID attribute value of the CHANGE DETAILS tuple associated with the target EFF change; indicating the IMP_LG_COMP_CH_SIGNATURE attribute value of the IMPACTED LARGE COMPONENT tuple associated with the impacted large component that would be impacted by the target EFF change; indicating the IMP_SM_COMP_CH_SIGNATURE attribute values of the IMPACTED SMALL COMPONENT tuples associated with the impacted small components that are contained within the impacted large component and whose constituent target solution elements would be impacted by the target EFF change.

In some embodiments, the method and system involves facilitating analysis of the scope of the impact of target EFF changes across one or more software solutions designed using impact partition analyses that target specific EFF changes by: for each target EFF change associated with an impact partition analysis: for each impacted small component resulting from the impact partition analysis and impacted by the target EFF change: generating a CHANGE-IMPACTED SMALL COMPONENT tuple to correlate the target EFF change and its associated CHANGE DETAILS tuple with the impacted small component and its associated IMPACTED SMALL COMPONENT tuple; identifying CHANGE-KEYWORD tuples associated with user-specified keywords that describe the target EFF changes and using the CHANGE_ID attribute values of identified CHANGE-KEYWORD tuples to identify CHANGE-IMPACTED SMALL COMPONENT tuples associated with the target EFF changes; using IMP_SM_COMP_ID attribute values of identified CHANGE-IMPACTED SMALL COMPONENT tuples to identify IMPACTED SMALL COMPONENT tuples associated with impacted small components that would be impacted by the target EFF changes; using other impact partition tuples and correlated attribute values to identify impacted large components that contain identified impacted small components and to identify target solution elements contained within identified impacted small components; using IMP_PAR_ID attribute values to selectively identify and review impacted large components, impacted small components, and target solution elements associated with specific impact partitions that result from impact partition analyses associated with the target EFF changes.

In some embodiments, the method and system involves generating an ANALYSIS DECISION tuple for each decision to be made regarding an issue identified by users or automatically; characterizing and tracking each decision to be made via a plurality of attributes comprising the ANALYSIS DECISION tuple associated with the decision by: generating and assigning a unique AN_DEC_ID attribute value to identify the analysis decision and its associated ANALYSIS DECISION tuple; selecting an ANALYSIS attribute value from a plurality of standard terms describing a type of analysis, the standard terms comprising "Phase1: NV", "REVIEW-Phase1: NV", "Phase2:DO", "REVIEW-Phase2:DO", "ChangeID", "REVIEW-ChangeID", "ChangeImpact", "REVIEW-ChangeImpact", "Partition", "REVIEW-Partition", and other terms; inputting an ISSUE attribute value to describe the issue or decision to be made; inputting a DECISION attribute value to describe the decision that is made and the rationale for making the decision; selecting a STATUS attribute value from a plurality of standard terms comprising "OPEN", "CLOSED", "DISMISSED", and other terms; generating, inputting, or assigning values for other attributes that help the software developer to track and manage analysis decisions.

In some embodiments, the method and system involves retaining knowledge of analysis inputs and results to facilitate information reuse and reflection on major aspects of developing a software solution via a plurality of contextual tuples comprising: generating an ANALYSIS CONTEXT tuple for each type of analysis performed within a specified set of correlated analyses; characterizing a context of the analysis via a plurality of attributes by: generating or inputting a unique COR_AN_ID attribute value to identify the specific set of correlated analyses that include prerequisite analyses, generation of an impact partition, generation of a no impact partition, and analysis reviews; assigning a user identifier to a LEAD_USER attribute to specify an authorized user who is a designated lead for managing the performance of a specific analysis within the specified set of correlated analyses; selecting an ANALYSIS attribute value from the plurality of standard terms describing a type of analysis described herein; generating, inputting, or assigning date, time, status, and other types of values for additional attributes that help software developers to track and manage analyses within the context of the specified set of correlated analyses; generating analysis context tuples that each link the specified set of correlated analyses to an input, result, or other type of information related to one or more analyses in the set, comprising: generating an ANALYSIS CONTEXT-REQ_ID tuple for each input RS for an analysis of nouns and verbs in requirements; generating an ANALYSIS CONTEXT-DATA_OR_OP tuple for each datum and for each operation identified during an analysis of unique required data and of unique required operations; generating an ANALYSIS CONTEXT-CHANGE DETAILS tuple for each change identified during an analysis of EFF changes to RRSS; generating an ANALYSIS CONTEXT-IMPACT PARTITION tuple to link the specified set of correlated analyses to an associated impact partition; generating an ANALYSIS CONTEXT-ANALYSIS DECISION tuple for each analysis decision identified during the performance of an analysis in the specified set of correlated analyses; generating other tuples that each link the specified set of correlated analyses to a type of input, result, or related information about an analysis in the specified set of correlated analyses; using the ANALYSIS CONTEXT tuple and other analysis context-related tuples to archive, retrieve, review, and reuse the inputs, results, and other information related to the performance of a specified set of correlated analyses.

In some embodiments, the method and system involves facilitating the use of analysis context information for project management and enabling user access verification by: using the ANALYSIS CONTEXT tuples to track and report a lead authorized user in charge of a specific type of analysis within the specified set of correlated analyses, the total time spent by all authorized users working on the analysis, the start and end dates for all work performed on the analysis, and the status of the analysis selected from a set of standard terms comprising "READY_TO_START", "IN_PROGRESS", "ON_HOLD", "COMPLETED", "CANCELLED", and other terms; generating an ANALYSIS MANAGER tuple for each valid user authorized to manage a specific set of correlated analyses; using the ANALYSIS MANAGER tuples to verify that a specific valid user is authorized to assign other valid users the authority to perform specific types of analyses within the context of the specified set of correlated analyses; generating an ANALYSIS AUTHORIZED USER tuple for each valid user authorized to perform a specific type of analysis within the specified set of correlated analyses; using the ANALYSIS AUTHORIZED USER tuples to verify that a specific valid user is authorized to perform the specific type of analysis within the specified set of correlated analyses; generating a USER PROFILE tuple for each valid user who is authorized to perform a selected type of operational feature; using the USER PROFILE tuples to verify that an input user identifier and password are associated with a valid user; generating a USER SESSION tuple for each interval of time or session in which an authorized user works on an analysis; using the USER SESSION tuples to track and report the total time and specific days on which the authorized user works on a specific analysis of the specified set of correlated analyses.

Other features, methods, and systems will become apparent to one with skill in the art upon examination of the drawings and the detailed description disclosed herein. It is intended that all such additional features, methods, and systems be included within this description, be within the scope of the disclosure, and be protected by the claims which will follow.

BRIEF DESCRIPTION OF DRAWINGS

The invention may be better understood with reference to the drawings and the detailed description. The drawings are not necessarily to scale but are constructed to illustrate the principles of the disclosure. Like referenced labels designate corresponding parts across the drawings.

DETAILED DESCRIPTION

Figure 1:
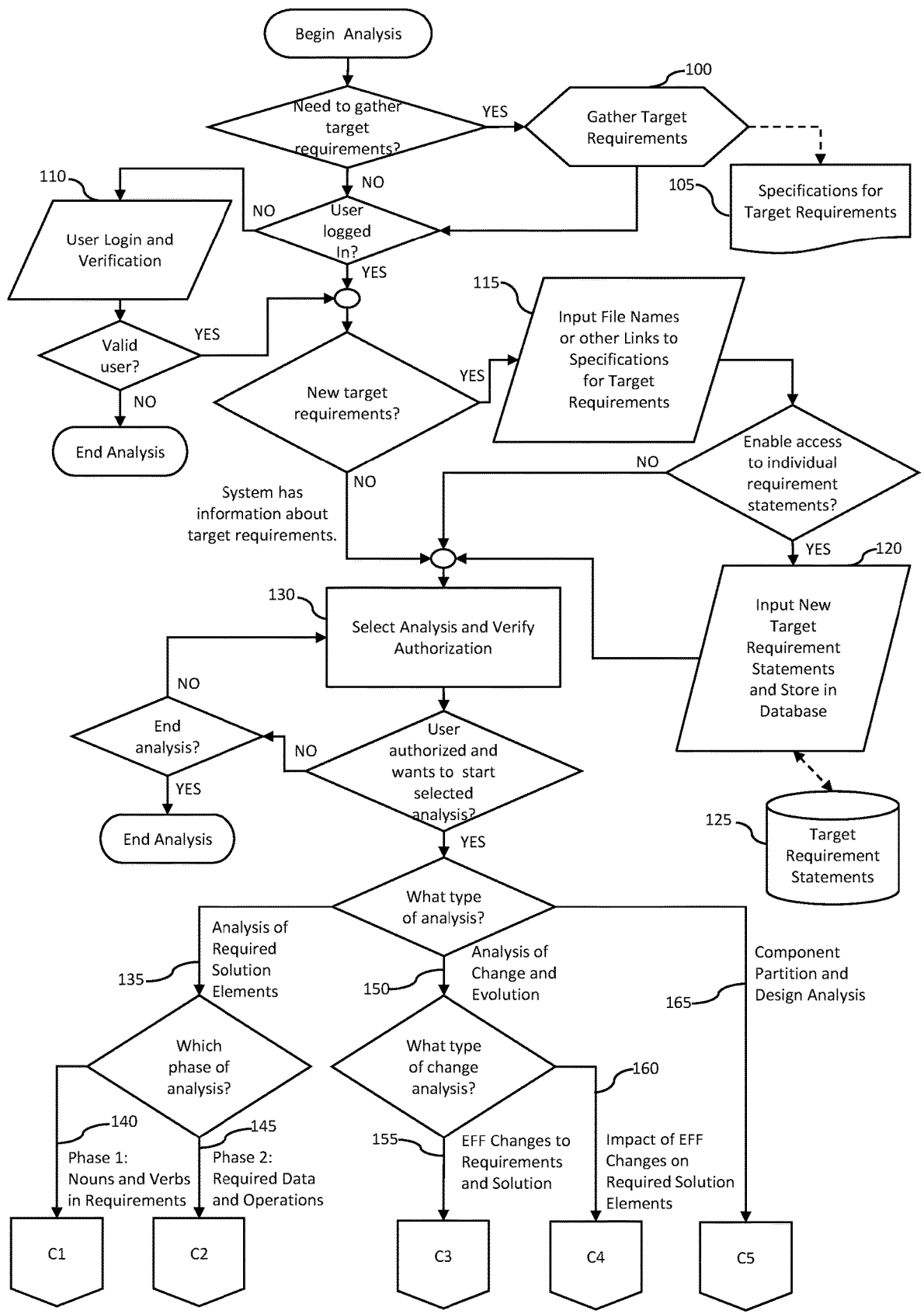
FIG. 1 shows an example of a process model that may be used to prepare for and select an analysis supported by the invention.

Enterprise Objectives.

Enterprises seek to develop solutions composed of individual units or components. The rationale for componentizing solutions is historically accepted knowledge (Parnas 1972, Shaw and Garlan 1996), and the development of componentized solutions is standard practice. Enterprises also strive to maximize the usefulness and minimize the cost of the solutions that they develop. Their business objective is to reduce the development effort and time by reusing parts of existing solutions when doing so is cost effective. Enterprises would like to design and build components that can be reused with minimal modification or easily replaced with components customized to satisfy varying functional and other quality requirements such as performance, reliability, or security. Their goal is to rapidly develop alternative or evolvable solutions by combining different sets of existing components. When the demand for a specific type of component is sufficient, enterprises may cooperate in setting industry standards for the component's basic function and interface so that variant plug-in versions of the component can be commercialized.

To satisfy these business objectives, enterprises face the technical challenge of how to gather and use information about change to design evolvable compositions of reusable components in a cost-effective and reliable way with repeatable results. The innovative method and system and its features described herein provide a systematic, computer-implementable approach for designing solutions that can be evolved with minimal error and human effort to maximize the return on investment. The invention is intended to be used by software developers, analysts, architects, designers, and implementers of componentized software solutions as well as managers, leaders, and other human stakeholders involved in software solution development ("users"), though it is feasible that aspects of the invention could be useful to robotic or other mechanical users.

Required Elements of all Solutions.

The invention focuses on fundamental decisions made by solution developers regardless of the intended use of the solution or enterprise philosophy or approach for developing solutions. Software development decisions are important because they impact the ability of the solutions to satisfy their requirements as well as the development costs. Recognizing important decisions to be made is prerequisite to evaluating and making good ones (Hoover et al. 2010).

Solution developers make critical decisions about the required elements of a solution such as:
(1) What required information (data) and other data should the solution input, manipulate, generate, store, and output?
(2) What required actions (operations) should the solution take on the information? What other operations should the solution perform to satisfy the requirements?
(3) In what order, when, how, and why should the actions on the information occur?
(4) What components should compose the solution, and which required data, required data and required operations, or required operations should be contained in each component?

The invention enables users to answer questions of this type systematically and repeatedly with results that are aligned to the EFF evolution of the solution as well as other information about change. Solution developers can use the invention to help them analyze the requirements for one or more related solutions to determine a baseline set of unique required data, unique required data and unique required operations, or unique required operations (required solution elements) and to automatically generate alternative recommendations based on various input parameters for partitioning required solution elements into an evolvable composition of reusable components. The invention applies to the generation of system-level components that compose a baseline architecture and to the generation of lower-level components that compose a higher-level component.

Analyses to Achieve Enterprise Objectives:

When deciding upon the solutions that it will develop, enterprises gather and study feasible or actual requirements for the solutions. Solution analysts, architects, or developers work with the other people who have an interest in the solution ("stakeholders") to formulate statements of requirements that are sufficiently complete with respect to the desired functions and other qualities for the solutions. Statements of requirements are typically expressed in the natural language that the stakeholders use to communicate with one another.

After the stakeholders formulate a target set of requirements for a specific solution, whether for a study of feasibility or for actual solution development, the solution analysts review the specifications to identify potential problems with respect to completeness, accuracy, compatibility, technical feasibility, and cost effectiveness. The solution architects or designers use the requirements specification to determine and specify the required elements of the target solution and most importantly to decide what components should compose the solution. For longer term business goals, the enterprise will plan a set of solutions, such as a product line, to maximize their benefit from the product. If the enterprise plans to iteratively develop a set of related solutions, the stakeholders must analyze how the requirements are likely to change and how the baseline solution would need to evolve to satisfy the EFF changes to the requirements.

As overviewed in FIG. 1, the invention guides and assists users in performing the following analyses that are fundamental in designing for solution evolution.
(1) Analysis of required solution elements 135
 Phase 1: Nouns and verbs in requirements 140
 Phase 2: Required data and operations 145
(2) Analysis of change and evolution 150
 EFF changes to requirements and solution 155
 Impact of EFF change on required solution elements 160
(3) Component partition and design analysis 165

To prepare for these analyses, users gather a target set of requirements (activity 100). They express requirements using a natural language composed of nouns that represent things or information and verbs that represent actions and typically record the requirements as textual statements in specially formatted word-processing, text, or other files 105. Users login via method 110 to use the invention. In method 115, users input file names or other links to specifications of target requirements that they will use to gather information for the analyses. The invention retains these references to sources of information about target requirements as part of the information that it gathers and archives during an analysis. In general, embodiments of the invention execute in computing environments that enable users to access and review the contents of files that contain information about specifications for target requirements while they are interacting with the invention. These references enable users to readily obtain the specifications as needed.

Users have the option to input information about target requirements as individual requirement statements. To do this, they input via method 120 a textual statement for each target requirement. Users can input individual requirement statements via an input device or from an input file formatted to delineate individual requirement statements. The method stores each target requirement statement in database 125 that is configured to store, search for, and retrieve individual requirement statements. Via this option, the invention automatically can make specific requirement statements available for users to review within the context of analyses supported by the invention. While interacting with users during the performance of an analysis, the invention communicates information to users via a display device or some other electronic output device.

Users select a target analysis via method 130. More is said later about the preparatory methods and context-related information that the invention gathers and tracks.

The analysis of the required elements of the solution 135 consists of two phases. In Phase 1 analysis 140, the invention assists users in analyzing the nouns and verbs contained in the requirements specification to find primary candidates for the data and operations that are required for the target solution or one or more related solutions. In Phase 2 analysis 145, the invention helps users map the primary candidates to required solution elements specified as primary data and primary operations. The invention guides users in the refinement of the primary data and primary operations to promote their reuse across related solutions, to reduce redundancy, and to facilitate ease of change and solution evolution (all of which help to reduce the effort, error, and cost associated with solution development and maintenance).

Analysis of change and evolution 150 includes careful consideration of the ways in which the requirements, required elements of a solution (data, operations, and control flow), and other solution artifacts are likely to change as one or more related solutions evolve. The invention helps users to elicit and capture information that the various stakeholders have about EFF changes from their different perspectives. The invention guides users in the analysis of the impact that the identified EFF changes would have on the required data and on the required operations. The diagram in FIG. 1 groups the analysis of change and evolution into two parts for discussion: (1) analysis of EFF changes to requirements and solution 155 and (2) analysis of impact of EFF changes on required solution elements 160. The invention supports other groupings of the change analysis steps to flexibly align with an enterprise's solution development approach.

Component partition and design analysis method 165 involves the automated generation of a partition of the required solution elements into multi-level components based on the impacts of change and other information. Users can vary the impacts of change in 160 or select different partitioning parameters in 165 to generate alternative partitions for comparison.

Users may perform the different analyses shown in FIG. 1 in various orders so long as the prerequisite information is available to conduct the selected analysis. Users may perform each type of analysis repeatedly and iteratively with variations in the set of nouns and verbs, in the set of required solution elements and their refinements, or in the set of EFF changes and their impacts that are used to generate and compare alternative partitions of solution elements into components. The details of how the invention supports each of the analyses will become clearer in the subsections which follow. Each subsection discusses a type of analysis including an explanation of the target information that the invention uses to support the analysis. The invention checks that the prerequisites for an analysis are satisfied. These checks are represented by decisions (diamond shapes) in the flowchart diagrams.

For conciseness and accuracy, the invention's informational attributes are represented as tuple constructs. Tuples of different types provide the context for the detailed discussion of the invention. Each attribute of a particular type of tuple (tuple type) is associated with a specified type of information. The set of all potential values for an attribute is the domain for the attribute. The formal specification of a tuple type includes two parts: (1) a diagram of the attributes that compose a tuple in the set associated with the type, and (2) a mathematical model of the composition and constraints associated with tuples of a particular type and enforced by the invention. Mathematical variables are shown in italics; and single letter variables such as i, j, k, etc., are of type integer. The formal definition for a construct such as an attribute domain or tuple type is presented only once. Subsequent specifications may include references to previously defined terms.

The analyses 135 through 165 outlined in FIG. 1 provide the information that solution developers need to make key decisions about the content and organization of an evolvable solution. The detailed description of an analysis includes example decisions stated in the form of questions.

Analysis of Required Solution Elements 135:

The invention guides users in making fundamental decisions regarding the required elements of an evolvable solution such as those listed below.

What are the required data (information)?
What are the required operations (actions)?
What are the specific functional and non-functional requirements regarding each required datum or operation?
What should be the flow of control between the operations to support the required behaviors and properties for the solution?
How can solution developers systematically, completely, and efficiently determine the required data and operations?
How can solution developers effectively incorporate the functional and non-functional specifications into the design of the required solution elements?
How can solution developers share their rationale for decisions regarding refinements to required solution elements with others who will implement, maintain, or reuse them?
How should analysis of required solution elements be coordinated and conducted iteratively over the life of the related solution products or applications?

The invention's methods and mechanisms for the Phase 1 and Phase 2 analyses help users to answer these questions. Determining the required elements of a solution starts with the Phase 1 analysis of the nouns and verbs referenced in the target set of requirement statements.

Phase 1: Nouns and Verbs in Requirements 140:

The purpose of the Phase 1 analysis is two-fold: (1) capture, encode, and learn the nouns and verbs associated with each target requirements statement, and (2) develop a set of nouns and a set of verbs that are candidates to be mapped to the required data and operations, respectively, in the Phase 2 analysis. Candidate nouns and verbs are non-trivial, non-repetitive, and standardized as feasible. A candidate set of nouns or verbs should completely and accurately represent the information and actions expressed in the target set of requirements. To this end, the invention aids users in making decisions such as the following.

Which nouns or verbs in the statements of requirements are synonymous because they have the same meaning, purpose, or use?
What should solution analysts do when they encounter nouns or verbs that are synonyms?
What alternative nouns or verbs might be preferable (by industry, company, or other stakeholders) to enhance communication with stakeholders and reuse?
How can solution analysts resolve the use of nouns or verbs that vary from an enterprise's standardized or designated vocabulary?
How can noun or verb synonyms be learned, compared, and reused in the analysis of future requirements for related solutions?

Figure 2:
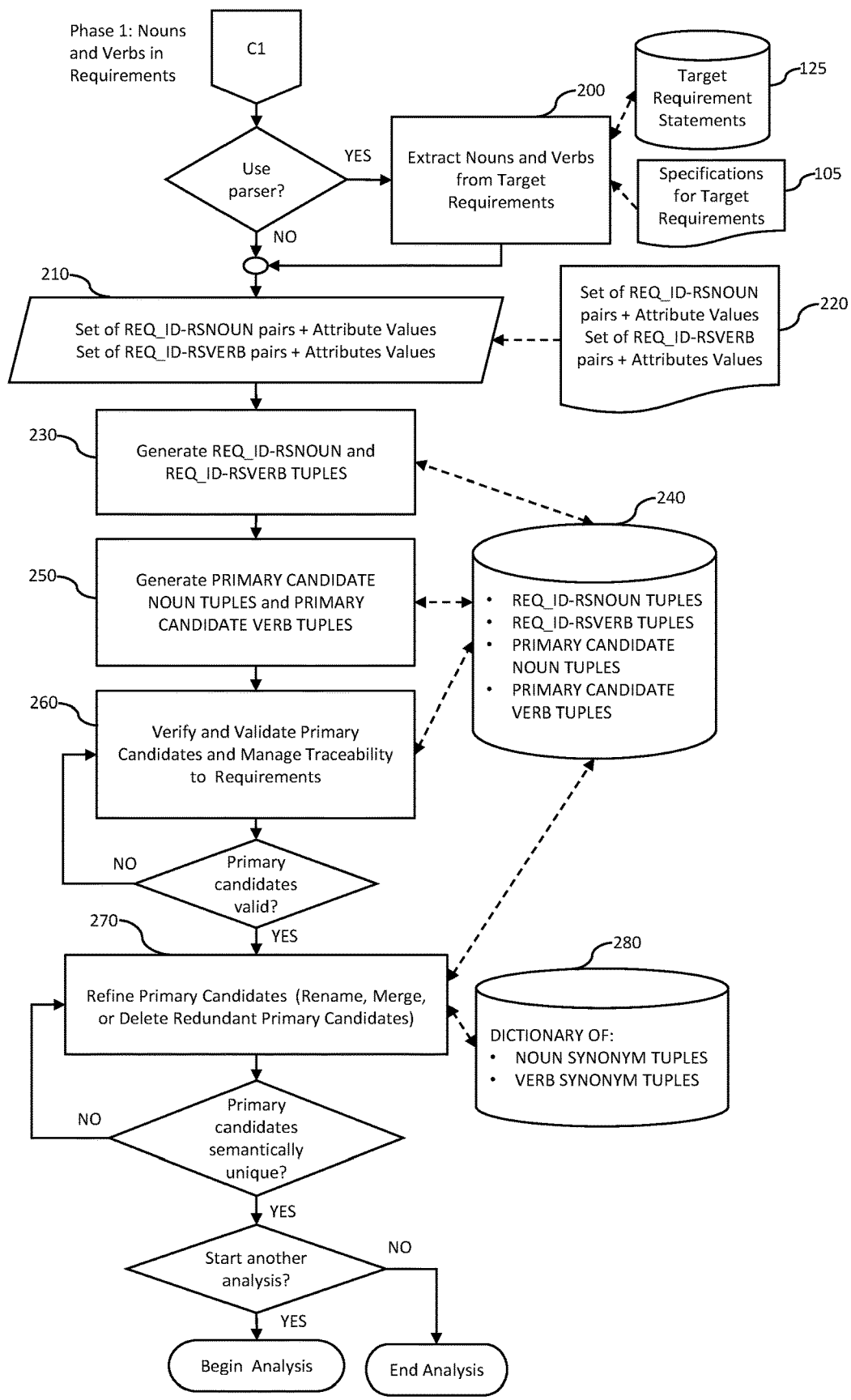
FIG. 2 shows an example of a process model that may be used to identify, analyze, and refine the required elements for a solution with respect to the noun or noun phrases and verb or verb phrases of the requirements.

The diagram in FIG. 2 shows a representative model for the methods and mechanisms by which the invention assists users in capturing, learning, and analyzing the nouns and verbs referenced either explicitly or implicitly in the target requirement statements, which are represented by text strings. A digitized text string ("string") representing a specific noun or verb contains characters that form one or more words in the natural language. Multi-word nouns or verbs may be referred to as noun or verb phrases. The invention processes nouns and nouns phrases ("nouns") in the same way and does so likewise for verbs and verb phrases ("verbs").

The primary input to analysis 140 is a set of text strings representing the identifier of a requirement statement (REQ_ID) paired with a noun or verb referenced in the corresponding statement (RSNOUN or RSVERB). Each different noun or verb used within a requirement statement should be represented in a separate REQ_ID-RSNOUN or REQ_ID-RSVERB pair along with any other attribute values related to the reference of the noun or verb. The nouns used across the target set of requirement statements compose a set of unique REQ_ID-RSNOUN pairs. Likewise, the verbs used across the same requirement statements compose a set of unique REQ_ID-RSVERB pairs. As shown in FIG. 2, the invention inputs via method 210 the target REQ_ID-RSNOUN pairs and REQ_ID-RSVERB pairs along with other attribute values from various sources such as:

- Streams of text strings from a computer-implemented parsing component 200 that extracts the requirement identifiers, nouns, and verbs from target requirement statements stored in database 125 if users have selected this input option or from another source such as a specification of requirements 105.
- User responses to prompts via an input device in method 210.
- Files stored in computer memory or in another type of non-transitory data storage device 220.

The invention does not prescribe the technology for parsing component 220, though a parser that can identify nouns and verbs as single words or as phrases is preferable. The parser should check the completeness and accuracy of its output REQ_ID-RSNOUN and REQ_ID-RSVERB string pairs with respect to the target requirement statements. Embodiments of the invention can be configured to interact with existing systems for parsing textual requirement statements.

In method 230, the invention generates one REQ_ID-RSNOUN tuple for each unique input REQ_ID-RSNOUN pair and one REQ_ID-RSVERB tuple for each unique input REQ_ID-RSVERB pair. The formal specifications related to REQ_ID-RSNOUN TUPLES and REQ_ID-RSVERB TUPLES are shown in Spec. 1 through Spec. 11. Method 230 ensures that new REQ_ID-RSNOUN tuples and REQ_ID-RSVERB tuples satisfy these specifications. The REQ_ID attribute values for these tuples correlate directly to the identifiers used in the statement of requirements to distinguish individual statements. The RSNOUN and RSVERB attribute values reference the nouns and verbs stated explicitly or implicitly in corresponding requirement statements. To facilitate this process, the format of the requirements should have sufficient identity to be related to identifiers in the analysis. If users have chosen the option to input individual target requirement statements, method 120 ensures that each statement is assigned a unique identifier and can be configured to assign standard, unique identifiers to the input requirement statements.

Together, the REQ_ID and RSNOUN or RSVERB attribute values provide traceability between the nouns and verbs in the requirements and the required elements of solution. The DERIVED attribute value indicates whether a reference to a noun or verb is explicit or implicit. A derived noun or verb does not appear explicitly in the corresponding requirement but is derived by the solution analyst or parsing component as a necessary part of the requirement. The PCDELETED, PCNOUN, and PCVERB attributes are explained later. The invention archives the REQ_ID-RSNOUN and REQ_ID-RSVERB tuples in database 240. The invention can reuse the tuples for iterative analysis of requirements and bypass the input and tuple generation steps in method 210 and method 230, respectively, for requirement statements that have been previously processed.

In method 250, the invention generates one PRIMARY CANDIDATE NOUN tuple for each unique RSNOUN attribute value in the target set of REQ_ID-RSNOUN tuples and one PRIMARY CANDIDATE VERB tuple for each unique RSVERB attribute value in the target set of REQ_ID-RSVERB tuples for the set of requirements being analyzed. Each PRIMARY CANDIDATE NOUN tuple correlates to all REQ_ID-RSNOUN tuples that have an RSNOUN attribute value identical to the primary candidate's NOUN attribute value. Likewise, each PRIMARY CANDIDATE VERB tuple correlates to all REQ_ID-RSVERB tuples whose RSVERB attribute value is the same as the primary candidate's VERB attribute value. The formal specifications related to PRIMARY CANDIDATE NOUN TUPLES and PRIMARY CANDIDATE VERB TUPLES are shown in Spec. 12 through Spec. 15. Method 250 ensures that new PRIMARY CANDIDATE NOUN tuples and PRIMARY CANDIDATE VERB tuples satisfy these specifications. The DATA_DELETED and OP_DELETED attributes of these tuples are discussed later. The invention archives the PRIMARY CANDIDATE NOUN tuples and PRIMARY CANDIDATE VERB tuples in database 240. The invention can reuse the tuples for iterative analysis of requirements and primary candidates and bypass tuple generation in method 250 for primary candidates that have been previously generated.

Before assisting users in analyzing the primary candidates, the invention uses method 260 to verify that the target set of PRIMARY CANDIDATE NOUN tuples and PRIMARY CANDIDATE VERB tuples contain no duplicate values for the NOUN attribute or VERB attribute, respectively. Method 260 also verifies and validates that the primary candidates include all the nouns and verbs referenced in the corresponding set of requirement statements. For each unique RSNOUN or RSVERB attribute value, there is precisely one corresponding PRIMARY CANDIDATE NOUN tuple or PRIMARY CANDIDATE VERB tuple, respectively. Likewise, each PRIMARY CANDIDATE NOUN tuple and each PRIMARY CANDIDATE VERB tuple has at least one or more corresponding REQ_ID-RSNOUN or REQ_ID-RSVERB tuples. A REQ_ID-RSNOUN tuple corresponds to a PRIMARY CANDIDATE NOUN tuple if the NOUN attribute value of the primary candidate is the same as the RSNOUN attribute value or as the PCNOUN attribute value (but not both) of the REQ_ID-RSNOUN tuple. This holds similarly for the correspondence between a REQ_ID-RSVERB tuple and a PRIMARY CANDIDATE VERB tuple. More is said later about the use of the PCNOUN and PCVERB attributes.

The invention uses the PRIMARY CANDIDATE NOUN tuples and PRIMARY CANDIDATE VERB tuples to capture and encode any changes that users decide to make to the names of the nouns and verbs that are primary candidates for the design of the required solution elements. For instance, to reduce semantic redundancy, users may select a single primary candidate noun to represent different nouns that have synonymous meanings in the requirements. Method 270 helps users refine the primary candidate nouns and primary candidate verbs so that they represent unique concepts and are terms that best convey the semantics of the requirements to the stakeholders. Method 270 scans the PRIMARY CANDIDATE NOUN tuples and PRIMARY CANDIDATE VERB tuples to find NOUN or VERB attribute values that represent synonymous concepts. The invention then displays each group of PRIMARY CANDIDATE NOUN tuples or PRIMARY CANDIDATE VERB tuples that have synonymous NOUN or VERB attribute values. The invention guides users in deciding how to handle each group of noun or verb synonyms. To help users compare nouns or verbs, the invention provides the identifiers of the requirements in which the nouns or verbs are referenced. If the correlated requirements are available, the invention presents them for review.

The invention looks for the synonyms in database 280 with the capability to store, search for, and retrieve synonyms for target nouns or verbs encoded as NOUN SYN- ONYM tuples or VERB SYNONYM tuples. These tuples are not necessarily dependent on the nouns and verbs referenced in a target set of requirements being analyzed. Users can preload sets of previously referenced or standardized noun or verb synonyms used by the solution development organization for comparison to nouns or verbs referenced in current or future requirement statements. Method 270 creates new NOUN SYNONYM tuples and VERB SYNONYM tuples for preloaded synonyms as well as for new noun or verb synonyms identified by users during the process of analyzing and refining the primary candidates. The formal specifications for NOUN SYNONYM TUPLES and VERB SYNONYM TUPLES are shown in Spec. 16 through Spec. 18. Method 270 ensures that new NOUN SYNONYM tuples and VERB SYNONYM tuples satisfy these specifications.

The structure of the NOUN SYNONYM tuples and VERB SYNONYM tuples enable the invention not only to find and retrieve the synonyms of target nouns or verbs but also to discover other synonyms by transitively exploring synonyms of synonyms. Method 270 can create new NOUN SYNONYM or VERB SYNONYM tuples when it finds a synonym of a synonym that is not yet associated with the target noun or verb. This action increases the codification and reuse of potential synonyms. The STANDARD attribute of a NOUN SYNONYM or VERB SYNONYM tuple indicates that the corresponding value for the NOUN or VERB attribute is a standard term. This attribute enables the invention to advise users on the selection of terms as they refine the primary candidate nouns and primary candidate verbs. In addition, it should be noted that, as subsets of RL, the domains NRL and VRL may intersect. Therefore, it is possible that the value for the NOUN or NSYNONYM attribute of a NOUN SYNONYM tuple is syntactically identical to the value for the VERB or VSYNONYM attribute of a VERB SYNONYM tuple. Though the requirements may reference a specific term both as a noun and as a verb, the meaning of the noun is not synonymous with the meaning of a homophonous verb.

Users may select one of the following options for handling a set of PRIMARY CANDIDATE NOUN or PRIMARY CANDIDATE VERB tuples whose NOUN or VERB attribute values are synonyms.

1) Select one of the synonyms to represent the noun or verb concept,
2) Select a standard term to represent the noun or verb concept,
3) Introduce a new term agreed upon by the stakeholders, or
4) Remove a noun or verb concept completely.

To implement the first three options, method 270 refines the tuples in the set to satisfy the conditions described formally in Spec. 19. The invention's tuple refinement effectively removes all tuples in the set except for one tuple whose NOUN or VERB attribute value is the nTerm or vTerm in Spec. 19 chosen by the users to go forward in the design of the required data and operations. As an exception, the invention retains those tuples whose DATA_DELETED or OP_DELETED attribute has the value true. This exception is explained further later. 'In addition, the invention archives the information about the substitution of designated terms for synonym nouns or verbs by setting the PCNOUN or PCVERB attribute value in the corresponding REQ_ID-RSNOUN or REQ_ID-RSVERB tuples to nTerm or vTerm. This feature maintains traceability between the nouns and verbs referenced in the requirement statements and the primary candidate nouns and primary candidate verbs. After the refinement of primary candidate tuples with synonymous nouns or verbs, there will be at least one REQ_ID-RSNOUN tuple with the same RSNOUN or PCNOUN attribute value as the NOUN attribute value for each PRIMARY CANDIDATE NOUN and one REQ_ID-RSVERB tuple with the same RSVERB or PCVERB attribute value as the VERB attribute value for each PRIMARY CANDIDATE VERB tuple.

To implement the fourth option, method 270 deletes all PRIMARY CANDIDATE NOUN tuples associated with synonymous nouns and PRIMARY CANDIDATE VERB tuples associated with synonymous verbs that users decide will not be needed in the solution. The invention archives the information about the deletion of synonymous primary candidates from the ongoing solution by setting the PCDELETED attribute value true in all REQ_ID-RSNOUN or REQ_ID-RSVERB tuples that correspond to the deleted primary candidates. The formal specification for the requisite tuple transformations to implement the fourth option is shown in Spec. 20. The invention uses the RSNOUN attribute values and PCNOUN attribute values of REQ_ID-RSNOUN tuples with a PCDELETED attribute value of true to help recreate or retrieve deleted primary candidate nouns if users decide to do this later. Likewise, the invention uses the RSVERB attribute values and PCVERB attribute values of REQ_ID-RSVERB tuples with a PCDELETED value of true to help recreate or retrieve deleted primary candidate verbs.

Figure 3:
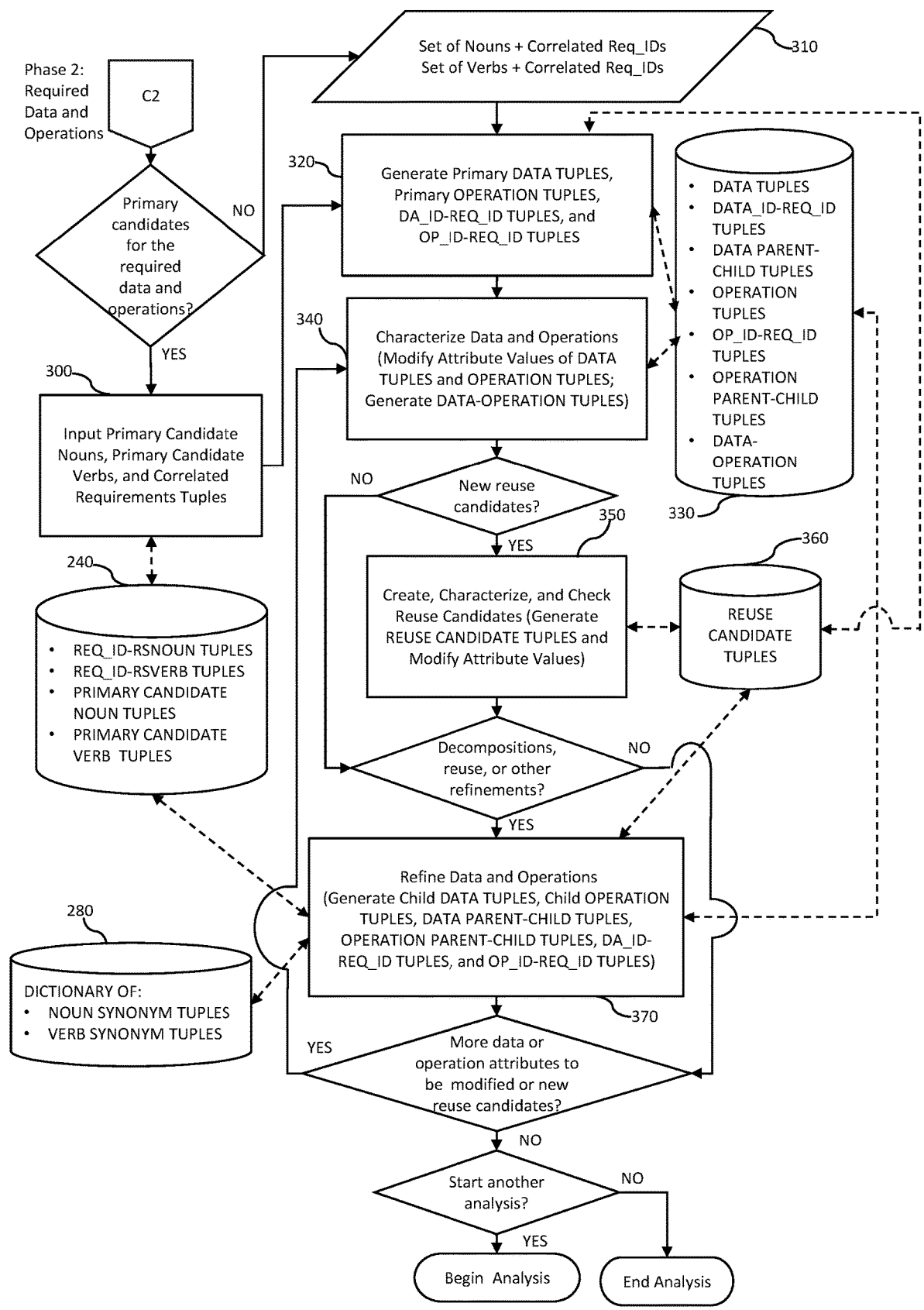
FIG. 3 shows an example of a process model that may be used to characterize, refine, and reuse the required data and operations for a solution.

Phase 2: Required Data and Operations 145:

The purpose of the Phase 2 analysis is multi-purpose: (1) map primary candidate nouns to primary data and primary candidate verbs to primary operations or input them directly, (2) refine the primary and other data and primary and other operations to promote reuse, solution evolution, and other required qualities or properties, (3) eliminate redundancy in the solution by reusing data and operations as much as is feasible, and (4) denote and remember those data and operations that are candidates for reuse within the target solution as well as across related solutions. Via the Phase 2 methods shown in FIG. 3, the invention assists users in determining required data and operations that are non-trivial, non-repetitive, reusable, and decomposed to promote solution evolution. The invention aids users in making decisions such as the following.

Which primary data and which primary operations are candidates for reuse across similar solutions?
Which primary data and which primary operations can be replaced by others that have the same use?
Which primary data and which primary operations have existing designs that are applicable?
How can solution designers find good candidates for solution refinement?
What decompositions of the solution accomplish the following objectives?
    Localization to promote adaptation, change, or customization of the solution for qualities such as performance, reliability, or security
    Reuse of existing solution pieces
    Simplification to make it easier to design, implement, and maintain the solution
What is the rationale for decomposition and the relationship between the primary solution elements (parents) and decomposed solution elements (children)?
Which solution elements will:
    Go forward in the design and implementation,
    Be archived as part of the rationale for the decision,
    Be replaced by other solution elements, Be recomposed into larger solution elements, or
Be reused or denoted as candidates for reuse.

The primary candidate nouns and primary candidate verbs are the most reliable and expedient input to the Phase 2 analysis. Via methods shown in FIG. 2 and discussed previously, the invention verifies that the primary candidates correspond to the nouns and verbs in the target requirement statements and are syntactically unique (method 260) as well as helps users ensure that the primary candidates are semantically non-redundant and non-trivial (method 270). In method 300, the invention inputs from a database 240 the PRIMARY CANDIDATE NOUN tuples and PRIMARY CANDIDATE VERB tuples that correspond to the target requirements. These tuples provide the nouns and verbs that the invention will map to the primary data and primary operations required in the target solution. Alternatively, via method 310, users can submit text strings containing the requisite information. Each input string would include a noun or verb to be mapped to a primary datum or primary operation, respectively, along with the identifiers of the corresponding requirement statements. This approach does not benefit from the Phase 1 analysis and refinement of the nouns and verbs referenced in the target requirements but may enhance integration of the invention into a wider range of solution development methods.

In method 320, the invention creates one DATA tuple for each primary candidate noun or for each noun that is input directly. Likewise, method 320 creates one OPERATION tuple for each primary candidate verb or directly input verb. The formal specifications related to DATA TUPLES and OPERATION TUPLES are shown in Spec. 21 through Spec. 28. Method 320 ensures that new DATA tuples and OPERATION tuples satisfy these specifications. The invention uses the DATA tuples and the OPERATION tuples to capture and encode decisions that users make about the design of the data and operations that will compose the target solution. The invention generates a default DATA_ID or OP_ID attribute value for a new DATA or OPERATION tuple that also identifies the datum or operation represented by the tuple. Alternative schemes for generating data identifiers or operation identifiers may be plugged into the invention, or users may interact with the invention to assign custom values. The values of the NOUN and VERB attributes provide traceability to PRIMARY CANDIDATE NOUN or PRIMARY CANDIDATE VERB tuples that were used to generate the primary data and primary operations. The USE KEEP_FLAG, and PARENT_RELATIONSHIP attributes will be discussed later.

The invention archives the information it acquires about data and operations in database 330 of DATA tuples and OPERATION tuples. The invention can reuse the tuples for iterative analysis of requirements and bypass the input steps in methods 300 or 310 and tuple generation in method 320 for requirement statements or nouns and verbs that have been previously processed. Method 320 can also use database 360 to locate applicable reuse candidates that link to existing DATA and OPERATION tuples that have been marked as potential candidates for reuse. More will be said later about reuse candidates.

In method 340, the invention guides users in making decisions about the characteristics of the data and operations that will compose the solution. The invention prompts users to provide key information that is needed by solution developers to implement the required solution elements. The invention then organizes and records in the attributes of the DATA tuples or OPERATION tuples the information that users input about the required properties of the data and operations. The USE attribute retains a description of the purpose of a datum or an operation. If the target requirements are available and searchable, the invention can display the correlated statement(s) of requirements for each datum or operation to assist users in determining the use and non-functional qualities such as performance and security that a datum or operation should support. The DATA and OPERATION tuples may include other attributes to describe the non-functional properties of a datum or operation. The FUNCTION attribute of an OPERATION tuple provides a place for users to specify the required actions of an operation and the order in which the actions should be performed. FUNCTION attribute values may be described using mathematical formulae, logic statements, or natural language expressions (whatever textual notation the organization adopts as suitable for RLUDL). Operations control the flow of execution of a computerized or mechanized process, so the functional description of an operation should include references to the names of data (or to the corresponding DATA tuple identifiers) that it manipulates as well as to the names (or to the corresponding OPERATION tuple identifiers) of other operations that it activates. The FUNCTION attribute values provide important instructions for solution implementers. More is said later about them as well as about the KEEP_FLAG and PARENT_RELATIONSHIP attributes.

Data requirements often include references to actions that should be taken on data. Frequently, the required actions are specific to a specific datum or scenario of use and require in-depth information about the datum's structure. In such cases, the design and implementation of the corresponding operation(s) for the datum will be dependent on the design and implementation of the datum. This creates a cohesive coupling between the datum and the required operations to manipulate the datum. Method 340 enables users to specify the operations that have a tight coupling with or are dependent on a specific datum. If the verbs corresponding to these operations were input previously (via methods 300 or 310), then the invention would have already generated OPERATION tuples for the dependent operations in method 320. Otherwise, method 340 creates OPERATION tuples as needed for new dependent operations that users specify.

Method 340 encodes the information about the dependency between an operation and a datum in a DATA-OPERATION tuple. The method creates one tuple for each operation that is dependent on a datum and stores it in the database 330. The formal specification for DATA-OPERATION TUPLES is shown in Spec. 29. Method 340 ensures that new DATA-OPERATION tuples satisfy the specification. The invention can find operations that are dependent on a specific datum by using the DATA_ID of the target DATA tuple to search for and retrieve the correlated DATA-OPERATION tuples from the database 330. Likewise, the invention can determine if a target operation is dependent on a datum by using the OP_ID of the target OPERATION tuple to search for and retrieve a corresponding DATA-OPERATION tuple and DATA_ID attribute value, if they exist. The importance of this feature will become clearer later.

Once the invention has generated and assisted users in characterizing the core sets of DATA tuples and OPERATION tuples to represent the primary data and primary operations of the design, it can help users refine these solution elements to make them more suitable for reuse, change or adaptability, solution evolution, or customization. During the analysis of the USE, FUNCTION, and other data or operational attributes, users may identify solution elements that are candidates for reuse. Method 350 guides users in the characterization of data and operations that are candidates for reuse. The method generates one REUSE CANDIDATE tuple for each datum or operation that users indicate is a candidate for reuse. The formal specifications for REUSE CANDIDATE TUPLES are shown in Spec. 30 through Spec. 32, and method 350 ensures that new REUSE CANDIDATE tuples satisfy these specifications. Each reuse candidate must correspond to a datum or operation that has been specified. The DA_OR_OP_ID attribute provides the link between a REUSE CANDIDATE tuple and its corresponding DATA tuple or OPERATION tuple. The REUSE_SCOPE attribute value indicates whether the reuse candidate is expected to be reused within the target solution or across related solutions. Design specifications for software applications are likely to be stored in multiple databases. The LIBRARY_REFERENCE attribute provides a link to the specific database that contains a reuse candidate's corresponding DATA tuple or OPERATION tuple. The invention may employ additional attributes with other information for locating and using solution artifacts related to a reuse candidate. Method 350 archives the information that the invention acquires about reuse candidates in database 360 that stores REUSE CANDIDATE tuples. Method 350 also checks the validity of a specific reuse candidate when method 370 requests its retrieval.

The invention's method 370 supports the following data and operational refinements.

(4) Decomposition of large-effect data and large-effect operations into smaller-effect entities to support:
  Change and solution evolution
  Reuse and redundancy reduction
  Customization and adaptation
  Simplified implementation and maintenance
(5) Combination or recomposition of small-effect data and combination or recomposition of small-effect operations to promote:
  Coupling of dependent or highly cohesive solution elements
  Minimization of trivial solution elements
(6) Reuse of data and operations within the target solution and across related solutions
(7) Removal of solution elements that are not required or no longer needed In the first refinement, users identify opportunities for decomposing primary data into sub-data and opportunities for decomposing primary operations into sub-operations to accomplish the objectives listed for this type of refinement. Method 370 displays the characterizations of the primary data and primary operations and queries users to consider decompositions of the required elements that would promote ease of change, reuse via redundancy reduction, customization or adaptation, and other qualities such as ease of implementation and maintenance, security, and performance. The invention remembers and can retrieve information regarding the decomposition decisions that users make about primary data, primary operations, and other solution elements being analyzed. To do this, method 370 generates new DATA tuples for smaller-effect data that users decide are needed to decompose a larger-effect datum and new OPERATION tuples for smaller-effect operations that users decide are needed to decompose a larger-effect operation. Method 370 prompts users to specify a name for a new smaller-effect solution element and retains this value in the NOUN attribute of a new associated DATA tuple or in the VERB attribute of a new associated OPERATION tuple. The invention also prompts users to review and update as needed the FUNCTION attribute values of the OPERATION tuples associated with decomposed operations. The invention advises users to replace the logic that is to be performed by sub-operations with references to the sub-operations. Method 340 can assist in moving logic being replaced from the FUNCTION attribute of a decomposed operation's OPERATION tuple into the FUNCTION attribute of the OPERATION tuple associated with the sub-operation that will encapsulate the logic. Method 340 perform modifications to the characterizations of DATA tuples and OPERATION tuples on behalf of other methods.

The invention can display the hierarchical decomposition of a specific datum or operation. For this purpose, method 370 encodes the hierarchical relationship between a larger-effect parent datum and its smaller-effect child data by generating one DATA PARENT-CHILD tuple for each child datum and its corresponding parent datum. Likewise, method 370 generates one OPERATION PARENT-CHILD tuple for each child operation and its corresponding parent operation. There are multiple parent-child tuples for a parent datum that has been decomposed into multiple child data and likewise for parents operations decomposed into multiple child operations. The formal specifications for DATA PARENT-CHILD TUPLES and OPERATION PARENT-CHILD TUPLES are shown in Spec. 33 and Spec. 34. Method 370 ensures that new DATA PARENT-CHILD tuples and new OPERATION PARENT-CHILD tuples satisfy these specifications. The specification for DATA PARENT-CHILD TUPLES defines the hierarchy between parent and child data as well as between ancestral and descendant data. Likewise, the specification for OPERATION PARENT-CHILD TUPLES defines the hierarchy between parent and child operations as well as between ancestral and descendant operations. A solution element can be neither its own child or descendent nor its own parent or ancestor. Parents can have multiple children, and children can have multiple parents. There are no circuits in the directed acyclic graph of a target family of data and likewise none in a target family of operations.

The children of a parent datum or of a parent operation collectively help to satisfy the required purpose of the parent. In this respect, a parent may retain its large-effect or more general purpose; while the information or logic to accomplish its purpose may be encoded within smaller-effect or more detailed children. Method 370 can use the DATA PARENT-CHILD to locate the DATA tuples associated with the child data that compose a parent datum and can use the OPERATION PARENT-CHILD tuples to locate the OPERATION tuples associated with the child operations that compose a parent operation. Vice versa, the invention can use the DATA PARENT-CHILD tuples to locate the DATA tuples of parent data related to a specific child datum and can use the OPERATION PARENT-CHILD tuples to find the OPERATION tuples associated with parent operations related to a particular child operation. The discussion of the third method of refinement says more about this.

Method 340 iteratively helps users to specify the USE attribute values of the DATA tuples for new child data and of the OPERATION tuples for new child operations. Method 340 also assists with the iterative specification of FUNCTION attribute values of OPERATION tuples associated with new child operations. The method prompts users to specify the nature of the relationship between a parent datum or operation and its children as a value for the PARENT_RELATIONSHIP attribute in the parent's DATA or in the parent's OPERATION tuple. Users can select from standard values such as general-specific ("G-S") or whole-part ("W-

P") provided by the invention or load custom values that the invention will then display as options. A general-specific relationship means that a parent provides a more generic purpose, while each child satisfies the generic purpose in a more specific way. A whole-part relationship signifies that the parent embodies a collection of parts (children). The PARENT_RELATIONSHIP attribute retains the users' rationale for decomposing a parent datum or operation. Users can review the rationale before deciding later whether to recompose the parent (the second type of refinement).

Like the PARENT_RELATIONSHIP attribute, the KEEP_ FLAG attribute of DATA tuples and of OPERATION tuples encodes information that is important for the design and implementation of the solution. The KEEP_ FLAG attribute indicates the status of a solution element with respect to the ongoing design of the solution. For instance, the DATA tuple associated with a parent datum often provides information needed in the solution regarding the composition of the corresponding child data; and the OPERATION tuple associated with a parent often provides information about the composition and flow of control of the corresponding child operations that is essential for the solution. In this case, users select the value "ONGOING" to indicate that the parent will be part of the solution. Parents that will not be part of the ongoing solution are designated for reference only ("REF"). Unless directed otherwise, the invention retains tuples whose KEEP_FLAG attribute value is "REF" to provide information about user rationale. The KEEP_ FLAG attribute value for a DATA or OPERATION tuple associated with a child usually is marked as "ONGOING" or to be decided ("TBD"). Users can specify custom KEEP_ FLAG attribute values to be used by the invention. Systematic use of the KEEP_FLAG attribute is important for automated and iterative selection of target solution elements that are considered when designing the target solution. More is said later about this innovative attribute.

In the second type of refinement, users recompose a parent solution element from its children. In this case, method 370 retrieves the DATA tuples or OPERATION tuples associated with the parent's children and requests method 340 to append the USE attribute values of the children's associated tuples to the corresponding attribute value of the tuple associated with the target parent (if users select this option). For child operations, method 340 also appends the FUNCTION attribute of the OPERATION tuples associated with the children to the FUNCTION attribute of the OPERATION tuple associated with the parent. Method 340 changes the KEEP_FLAG attribute values of the child tuples to recomposed ("REC"). Similarly, users may decide to combine small-effect data that are currently not children into larger-effect data or small-effect operations that are not children into larger-effect operations. Method 370 creates new tuples for the larger-effect solution elements if they do not already exist. Users specify the values for the USE, FUNCTION, PARENT_RELATIONSHIP, KEEP_FLAG, and other attributes of tuples associated with smaller-effect solution elements being combined as well as of tuples associated with the larger-effect elements via method 340. The KEEP_FLAG attribute value for the tuple associated with a recombined parent or combined larger-effect solution element must be "ONGOING" or "TBD". The invention adapts logically and automatically to support customized KEEP_FLAG attribute values provided by users.

The third type of refinement involves the reuse of solution elements within the target solution. Via method 370, the invention assists users in finding solution elements that have similar purposes or uses. This search is like the analysis of synonymous or redundant primary candidates. If the analysis of nouns or verbs was done previously, primary data and primary operations are less likely to be redundant. In this case, users are looking for redundancy among the smaller-effect or child data and smaller-effect or child operations. Method 370 can use the NOUN attribute values of the DATA tuples and VERB attribute values of the OPERATION tuples as well as keywords from the other attributes to find synonyms in database 280 that stimulate further search for tuples associated with redundant solution elements. The method also searches database 360 that stores REUSE CANDIDATES tuples to find other applicable data and operations that can be reused.

Users review the characterizations of the DATA tuples, OPERATION tuples, or REUSE CANDIDATE tuples resulting from the search and decide whether the target design contains redundant solution elements that should be replaced by data, by data and operations, or by operations existing within the target design or from across related designs. To reuse functionality that is contained within large-effect solution elements, users may need to decompose the large-effect solution elements to extract the reusable smaller-effect data or smaller-effect operations. If two or more smaller-effect data are redundant, then users should decide which one offers the best potential for reuse within the target solution. Method 370 assists users in finding and modifying all larger-effect solution elements that reference the redundant smaller-effect elements so that the larger-effect solution elements subsequently reference the solution element that users decide to reuse.

The invention retains the tuples associated with redundant solution elements but modifies the KEEP_FLAG attribute values of the associated tuples to indicate that the redundant solution elements are being replaced ("REP"). The KEEP_ FLAG attribute value of the tuple associated with a datum or operation targeted for reuse must be "ONGOING" or "TBD". The "TBD" status value is useful for situations in which users have not finalized a decision about the use of a solution element. Method 340 assists users in modifying the USE, FUNCTION, and KEEP_FLAG attribute values of the tuples involved in the reuse refinement. Users may identify new candidates for reuse while they iteratively refine existing solution elements and instruct the invention to designate them for reuse via method 350.

The fourth type of refinement is the removal of solution elements that are not needed from the ongoing solution. Unless directed otherwise, the invention retains information about solution elements that have been removed in their associated DATA tuples or OPERATION tuples. At the request of method 370, method 340 assists users in marking the KEEP_FLAG attribute values of the tuples associated with removed solution elements as "REF". Alternatively, users can direct the invention in method 370 to delete DATA tuples and OPERATION tuples that are associated with eliminated solution elements from the database storing the target solution. If a solution element whose associated tuple is being deleted is a primary datum mapped from a primary candidate noun or is a primary operation mapped from a primary candidate verb, the invention assigns the value of true to the PCDELETED attribute of the corresponding PRIMARY CANDIDATE NOUN tuple or PRIMARY CANDIDATE VERB tuple.

Subsequently, method 370 can reconstruct primary data whose associated DATA tuples have been deleted by identifying PRIMARY CANDIDATE NOUN tuples whose PCDELETED attribute value is true and then using the NOUN attribute values of these tuples to create new DATA tuples with corresponding NOUN attribute values. Method 370 can reconstruct primary operations associated with deleted OPERATION tuples in a similar way by using the PCDELETED and VERB attribute values of PRIMARY CANDIDATE VERB tuples. Method 370 adds a solution element that has been removed from the target solution but not deleted from the archive back into the target solution by changing the KEEP_FLAG attribute value of its associated DATA tuple or OPERATION tuple from "REF" to "ONGOING" or "TBD".

In method 320 and method 370, the invention provides linkages between the data and operations in the target solution and their correlated requirements. The invention generates one DATA_ID-REQ_ID tuple for each unique pair of datum and correlated requirement in the target solution. Similarly, the invention generates one OP_ID-REQ_ID tuple for each unique pair of operation and correlated requirement in the target solution. The invention does this even if the KEEP_FLAG attribute value of the associated DATA tuple or of the associated OPERATION tuple is "REF", "REC", or "REP". The formal specifications of the DATA_ID-REQ_ID TUPLES and OP_ID-REQ_ID TUPLES are shown in Spec. 35 and Spec. 36. Method 320 and method 370 ensure that DATA_ID-REQ_ID tuples and OP_ID-REQ_ID tuples satisfy these specifications.

The invention obtains the identifiers of the corresponding requirements from:
(8) REQ_ID-RSNOUN tuples that are correlated to primary candidate nouns and REQ_ID-RSVERB tuples that are correlated to primary candidate verbs (method 300),
(9) Input streams with corresponding nouns and verbs (method 310),
(10) Parent data and parent operations for which linkages have already been created (method 370), or
(11) Directed input from users (method 370).

In the first case, method 300 uses the NOUN attribute values of the target PRIMARY CANDIDATE NOUN tuples to find the correlated REQ_ID-RSNOUN tuples that have the same values stored in their RSNOUN or PCNOUN attributes. Method 300 uses the VERB attribute values of the target PRIMARY CANDIDATE VERB tuples to find the correlated REQ_ID-RSVERB tuples that have the same values stored in their RSVERB or PCVERB attributes. Method 300 passes each primary candidate noun or primary candidate verb along with the REQ_ID attribute values of the correlated REQ_ID-RSNOUN tuples or of the REQ_ID-RSVERB tuples to method 320. The invention in method 320 stores the DATA_ID attribute values resulting from the mapping of primary candidate nouns to primary data along with the correlated requirements identifiers in the DATA_ID-REQ_ID tuples. Method 320 stores the OP_ID attribute values resulting from the mapping of primary candidate verbs to primary operations along with the correlated requirements identifiers in the OP_ID-REQ_ID tuples. These linking tuples simplify future references to the correlated requirements for the required data or operations in the solution. In the second and fourth cases, the invention obtains the identifiers of the correlated requirements from automated input streams or via user prompted input. In the third case, the invention uses the requirements correlated to parent data or operations to determine the correlated requirements for child data or operations. To do this, method 370 uses the DATA_ID or OP_ID attribute values of parent DATA or OPERATION tuples to locate DATA_ID-REQ_ID or OP_ID-REQ_ID tuples that correspond to all parent data or operations of a child. The invention uses the REQ_ID attribute values of the resulting DATA_ID-REQ_ID or OP_ID-REQ_ID tuples to locate all potential correlated requirements that the child helps to satisfy. Users can review the resulting requirements and confirm the ones that correspond to the child datum or operation. When the invention generates new DATA or OPERATION tuples for child data or operations, it also generates DATA_ID-REQ_ID or OP_ID-REQ_ID tuples to link the new DATA or OPERATION tuples to the correlated requirements. The DATA_ID-REQ_ID tuples and OP_ID-REQ_ID tuples are stored in database 330. The invention can reuse the tuples and bypass their generation in method 320 and method 370 for requirements that have been previously analyzed.

Methods 320 and 370 require the information stored in the DATA tuples, OPERATION tuples, DATA_ID-REQ_ID tuples, and OP_ID-REQ_ID tuples. They also share the functional steps of generating and storing structures to remember this information. For simplification, the diagram in FIG. 3 does not show these shared steps within a separate method box.

Analysis of Change and Evolution 150:

The analysis of change and evolution has dual and complementary purposes: (1) capture, encode, and learn about the expected, feasible, or actual changes to target or related requirements and solution artifacts, and (2) analyze and record the impacts that these changes would have or have had on the required elements of the target solution or related solutions. A change would impact a required element if the solution developers would need to review and potentially alter the required element to enact the change. The analysis of changes to requirements and solution should start with the conceptual or feasibility analysis of the solution and continue iteratively throughout the life of the solution. Analysis of the EFF impact on the required solution elements can be done once users have developed an initial set of required data and operations or have started the design of the target solution.

The invention aids users in making decisions about change such as the following.
  How are the requirements expected to change or feasibly could change?
  What stakeholders will decide or implement a specific EFF change?
  Which solution artifacts would be impacted by the EFF changes?
  How is change likely to affect (impact) the data requirements, and how is change likely to impact the operational requirements?
  Which required solution elements would be impacted by the EFF changes?
  For each required solution element that would be impacted by a specific change, what exactly is the EFF impact? How would the solution element be changed?
  Are there EFF changes for which there is currently not enough information to decide what their impact on the requirements or solution would be?
  When and how should stakeholders share their decisions and rationale for how requirements, required solution elements, and solution artifacts are expected to or feasibly could change?
  How can change analyses for related requirements and solutions be reused?
  How can unknowns about the impact of change be tracked and decided upon when relevant information is acquired?

How can change analysis be coordinated and conducted iteratively over the life of related solution products or applications?

EFF Changes to Requirements and Solution 155.

Figure 4:
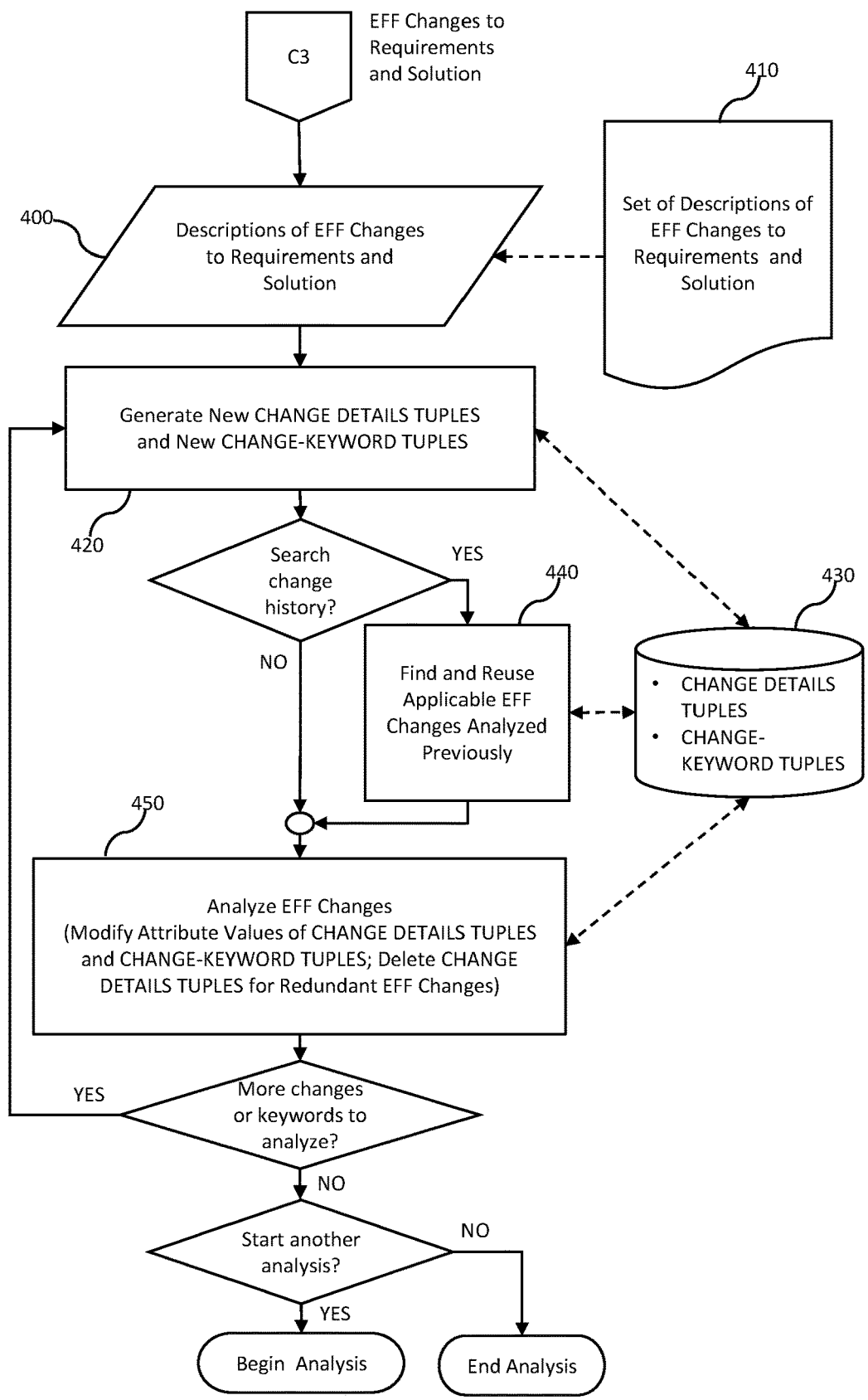
FIG. 4 shows an example of a process model that may be used to gather, analyze, and reuse information about EFF changes to the requirements and solution.

Via the methods shown in FIG. 4, the invention assists users in analyzing changes to the requirements and solution that are expected or likely to affect the evolution of the target solution as well as variant solutions for product-line development. Method 400 inputs textual descriptions of changes that users expect, or think are feasible, to the target requirements, to the required solution elements, or to existing or expected types of solution artifacts such as design or implementation specifications, test plans, materials lists, and other work products that compose a solution. Method 400 may prompt users for change descriptions or input them directly from an electronic unit such as a file stored in a database 410.

In method 420, the invention generates one CHANGE DETAILS tuple for each change description that is input. The formal specifications related to CHANGE DETAILS TUPLES are shown in Spec. 37 through Spec. 40. Method 420 ensures that new CHANGE DETAILS tuples satisfy these specifications. The invention generates a default identifier to identify a new CHANGE DETAILS tuple as well as the change corresponding to the tuple. Alternatively, users may specify custom change identifiers and interact with the invention to assign these values. The DESCRIPTION attribute provides information about the nature of potential changes to target requirements and solution(s) as well as of changes that have occurred to similar or related solutions in the past. The Likelihood attribute is discussed later.

With the entry of new change descriptions, the invention prompts users to think about keywords that would help in locating relevant changes in future analyses. Method 420 captures and encodes keywords identified by users for new and existing changes that have been codified within CHANGE DETAILS tuples. The invention creates one CHANGE-KEYWORD tuple for each keyword related to a specific change. The formal specifications related to CHANGE-KEYWORD TUPLES are shown in Spec. 41 and Spec. 42. Method 420 ensures that new CHANGE-KEYWORD tuples satisfy these specifications. The CHANGE_ID attribute provides links to the CHANGE DETAILS tuples associated with changes that are related to the keywords specified in the KEYWORD attribute. Multiple CHANGE-KEYWORD tuples may have the same CHANGE_ID attribute value because a specific change may be identified by different keywords stored as KEYWORD attribute values. Likewise, multiple CHANGE-KEYWORD tuples may have the same KEYWORD attribute value because a keyword may be used to reference different changes distinguished by their CHANGE_ID attribute values.

Method 440 assists users in finding existing change descriptions that are related to the target set of requirements and solution artifacts and helps users expand their working knowledge of relevant as well as related EFF changes. In addition, the specifications for CHANGE-KEYWORD TUPLES support the potential standardization of a language (RLUDL) for describing change keywords and other concepts consistently throughout the life of the solution. A language to describe change facilitates and potentially increases the reuse of information about change across subsequent iterations of a target solution as well as across related but variant solutions. Reuse of change information can help simplify and therefore reduce the time needed for analysis and design. Method 440 can perform keyword related searches of change descriptions because the CHANGE DETAILS tuples and CHANGE-KEYWORD tuples are stored in database 430. The invention can locate and reuse applicable CHANGE DETAILS tuples for iterative analysis and bypass tuple generation in method 420 for changes that have been previously analyzed.

In method 450, the invention guides users in the analysis of EFF changes related to the target set of requirements. The invention prompts users to specify the likelihood that a specific EFF change will occur and retains this value in the LIKELIHOOD attribute of the corresponding CHANGE DETAILS tuple. The LIKELIHOOD attribute domain provides a set of prescribed but customizable values to express the likelihood of the changes represented by CHANGE DETAILS tuples. For changes that have already occurred, the likelihood is certain for the existing solution(s) but still needs to be estimated for a new target solution. The systematic and decisive use of likelihood is novel and important for automated and prioritized selection of changes to be considered when designing the target solution. More is said later about this innovative attribute.

Method 450 also prompts users to think in more depth about the motivation for change, the stakeholders who would be involved in change, and the types of solution artifacts that would be affected by change. This information can be encoded within other attributes of the CHANGE DETAILS tuples. In addition, method 450 enables users to identify changes and keyword associations that are redundant. The invention automatically combines and deletes changes to remove redundancies that users detect. The invention retains an archive of the CHANGE DETAILS and CHANGE-KEYWORD tuples that it generates in the event users want to reconsider the changes represented by deleted tuples.

Impact of EFF Changes on Required Solution Elements 160.

Figure 5:
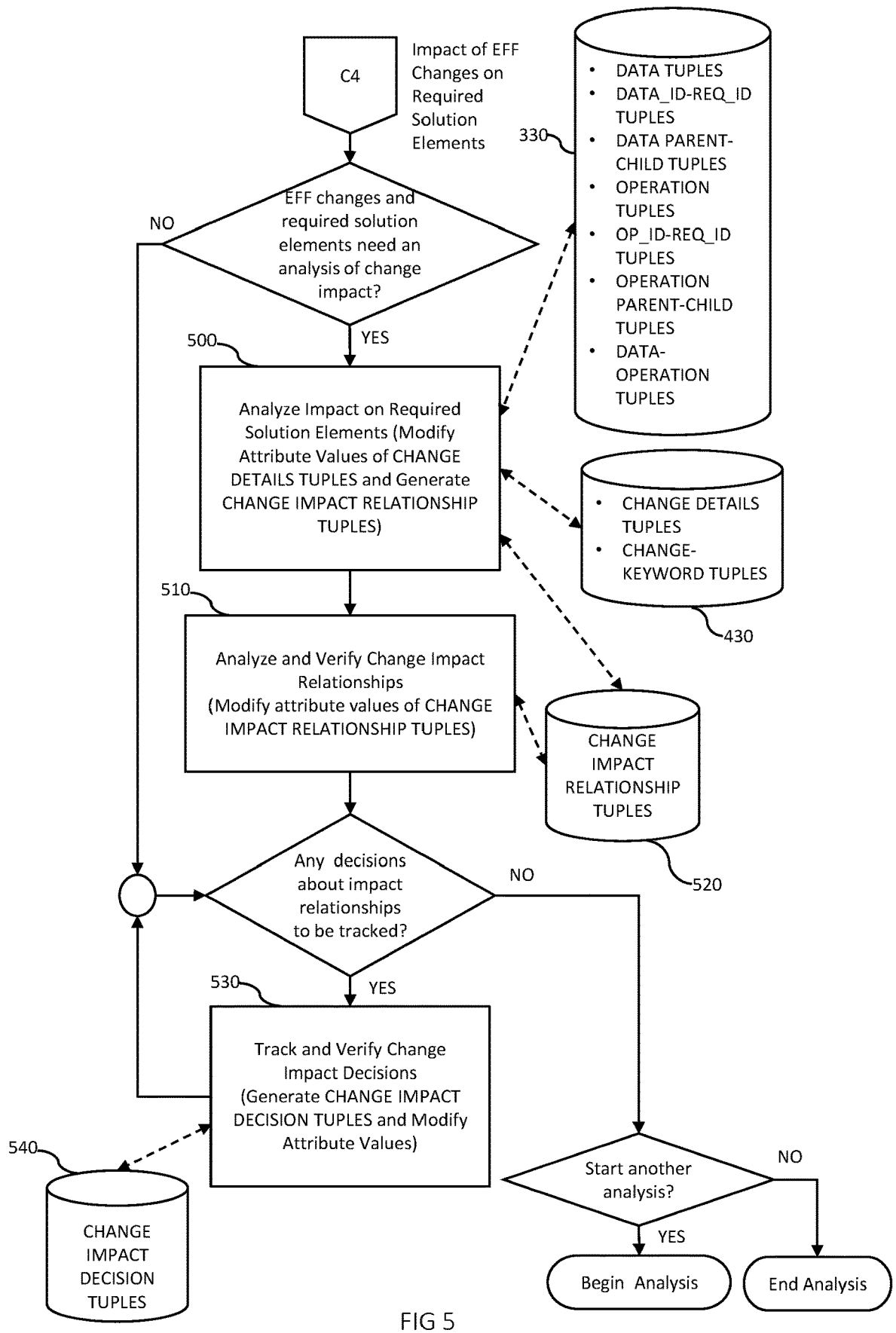
FIG. 5 shows an example of a process model that may be used to analyze the impact that the EFF changes would have on the required solution elements and to encode this information for use in generating partitions based on target EFF changes and target solution elements.

The purpose of change analysis is to understand how change is expected or likely to impact the target and related solutions. This information enables users to design solutions that localize and isolate the impact of change, thereby making solution evolution easier, less error prone, and less costly. To accomplish this objective, this analysis involves analyzing the potential impact of change on the required solution elements. FIG. 5 provides an overview of the methods and databases that the invention uses to assist users in analyzing the impact of change.

Method 500 prompts users to identify the required solution elements that would be impacted by each EFF change. In general, an EFF change to the requirements or to the related solution has an impact on a datum or on an operation required for the solution if implementing the EFF change would require or did require (for EFF changes already implemented) users to review and potentially modify the design or the implementation of the solution element. A change impact exists regardless of whether the modification can be done by machine or by human effort, as both require time and cost for implementation and test. A mathematical specification for the change impact relationship is shown in Spec. 43. Users may customize the definition or application of the change impact concept.

For each EFF change and each datum or operation that users identify as having a change impact relationship, method 500 generates one CHANGE IMPACT RELATIONSHIP tuple. The formal specifications related to CHANGE_RELATIONSHIP_VALUES and CHANGE IMPACT RELATIONSHIP TUPLES are shown in Spec. 44 and Spec. 45. Method 500 ensures that new CHANGE IMPACT RELATIONSHIP tuples satisfy these specifications. The specification for CHANGE IMPACT RELATIONSHIP TUPLES ensures that a change impact relationship satisfies the following conditions.
(12) A referenced EFF change has a corresponding CHANGE DETAILS tuple (stored in database 430),
(13) The datum or operation targeted for impact has a corresponding DATA or OPERATION tuple (stored in database 330), and
(14) The EFF change does or potentially impacts the target datum or operation.

The CHANGE IMPACT RELATIONSHIP tuples are stored in database 520. The invention can locate and reuse related CHANGE IMPACT RELATIONSHIP tuples for iterative analysis and bypass tuple generation in method 500 for change impacts that have been previously considered.

Method 500 can use the DATA PARENT-CHILD tuples, OPERATION PARENT-CHILD tuples, and DATA-OPERATION tuples stored in database 330 to suggest the following solution elements as possibilities for a change impact relationship with a specific EFF change:
   Children of parents that have change impact relationships with the EFF change.
   Operations coupled to data that have change impact relationships with the EFF change.
   Data coupled to operations that have change impact relationships with the EFF change.

Additionally, method 500 can use the CHANGE-KEYWORD tuples stored in database 430 to find EFF changes that share common keywords. Related EFF changes may impact the same data or operations. The invention then retrieves the CHANGE IMPACT RELATIONSHIP tuples stored in database 520 associated with EFF changes related to the specific EFF change being investigated.

The invention method 500 presents the data and operations that have a change impact relationship with the related changes and prompts users to decide whether the specified EFF change would also impact them. The invention does not present data and operations that have already been designated, via existing CHANGE IMPACT RELATIONSHIP tuples, as having a change impact relationship with a specific change. For completeness, the invention can optionally help users exhaustively explore the impact that each change may have with respect to each datum or operation that has not yet been reviewed. For all potential change impact relationships being considered, users review and decide whether the potential change impact is accurate with respect to the target requirements, change, and solution element. The method generates new CHANGE IMPACT RELATIONSHIP tuples for all change impacts that users confirm are valid. Users may decide to modify the likelihood value associated with a specific change after evaluating the impact of the change on the required solution elements. Method 450 assists method 500 with modifications to the LIKELIHOOD attribute value of CHANGE DETAILS tuples.

Once users have established a base set of change impact relationships for the target EFF changes and required solution elements, they can analyze these relationships and specify the nature of the impacts by selecting a descriptor for each change relationship. Users can customize the allowable descriptors. As directed by users, method 510 makes alterations to the attributes of the CHANGE IMPACT RELATIONSHIP tuples. Method 510 also verifies that the CHANGE IMPACT RELATIONSHIP tuples are valid with respect to their specification conditions. The verification includes a check of the CHANGE_RELATIONSHIP attribute values. The invention notifies users of any errors that it detects and assists users in making corrections as needed.

The invention uses method 510 in the processing order shown in FIG. 5 but also can use it to verify the change impact relationships before generating a component recommendation. More is said later about this.

Users may need to gather more information to determine the potential impact of a change on a datum or operation. Before specifying a change impact relationship, users can interact with method 530 of the invention to log and track a decision that they need to make about the relationship. Method 530 generates one CHANGE IMPACT DECISION tuple for each change impact decision that users need to make. The formal specifications related to CHANGE IMPACT DECISION TUPLES are shown in Spec. 46 through Spec. 49. Method 530 ensures that new CHANGE IMPACT RELATIONSHIP tuples satisfy these specifications. The ISSUES attribute records the open issue that needs to be resolved before users can decide upon the existence and type of change impact relationship. The DECISIONS attribute archives the resolution that users make regarding the issue. The STATUS attribute provides a means of tracking the progress that users make in resolving a change impact relationship issue. The invention allows users to develop and apply standard terminology for describing issues and decisions. The CHANGE IMPACT DECISION tuples are stored in database 540.

Component Partition and Design Analysis 165:
The decisions that users make about the organization of the required solution elements into components are critical to the design of evolvable solutions. Compositions that facilitate ease of evolution achieve the following design objectives.
   Localization of solution elements that would be impacted by the same EFF changes within the same components
   Isolation of solution elements that would not be impacted by EFF change within separate components
   Simplification of processes to search for and modify solution elements that would be impacted by a specific change.

Figure 6:
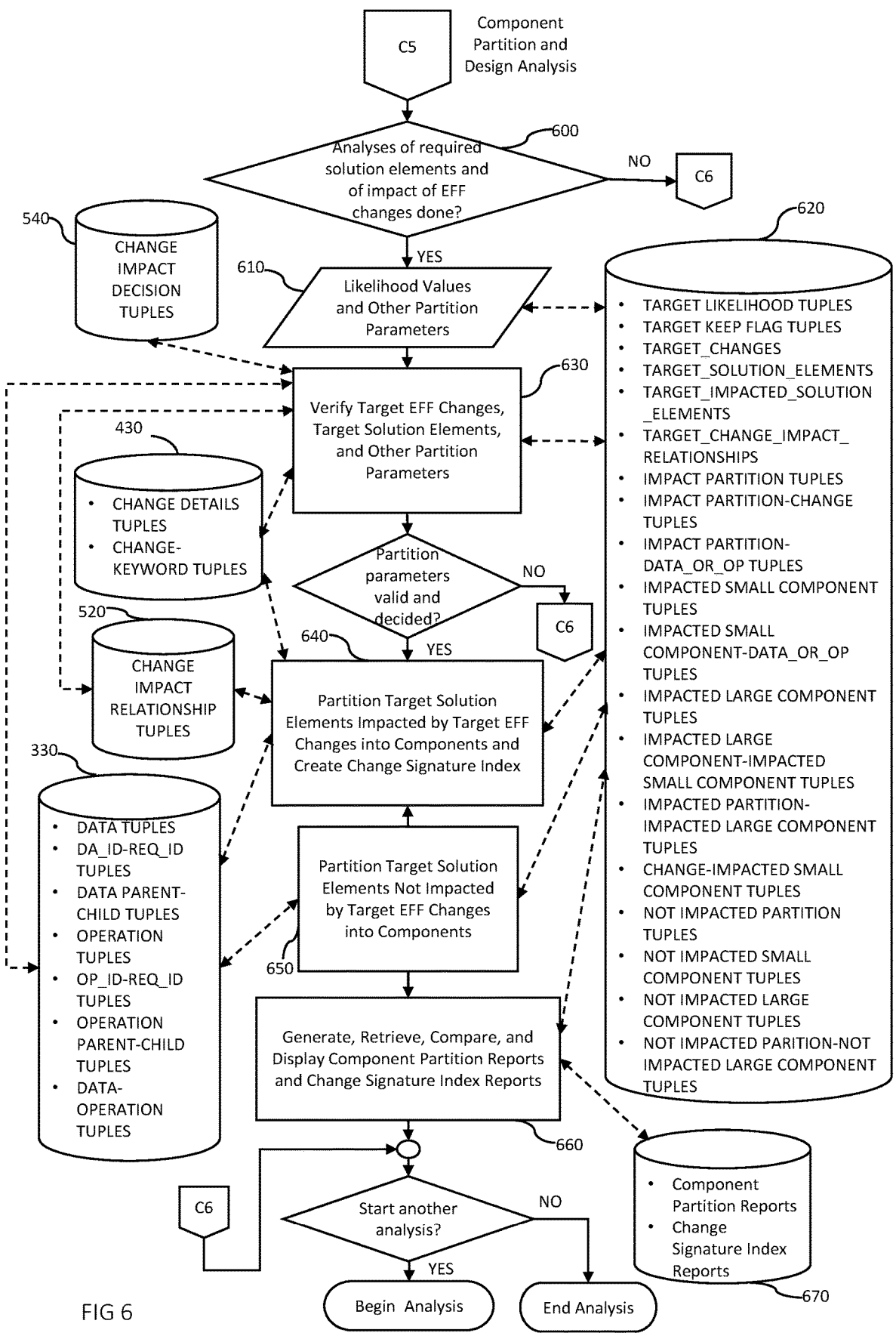
FIG. 6 shows an example of a process model that may be used to apply the information about target EFF changes and other factors to generate a partition of target solution elements into hierarchically organized components that are reusable and resilient to change.

Via the methods shown in FIG. 6, the invention aids users in making architectural and component design decisions such as the following.
   What components are needed in the solution and why?
   What partition of the required solution elements into components minimizes the impact that EFF change would have on the resulting solution?
   How might smaller components be grouped into larger components to promote evolution and maintenance of the solution?
   How can solution designers systematically partition a numerous set of required solution elements into small and large components that minimize the impact of the EFF changes?
   How can solution designers systematically experiment with different sets of required solution elements and change impacts to compare alternative partitions?
   How can solution designers automatically determine EFF changes that would impact each component?
   How can solution designers automatically find the components that would be impacted by EFF changes?

The invention uses the information gathered previously about the required data and operations and the EFF changes to automatically generate a partition of the target solution elements into multi-level components that facilitate evolution of the solution. The partition process is fully automatable. The number of solution elements that can be partitioned into components within a given amount of time depends on the available processing power and memory.

Users can generate and compare alternative partitions by varying the target EFF changes and target solution elements.

The invention performs two types of partitions:

(15) Partition of target solution elements that would be impacted by target EFF changes into small and large components ("impact partition").

(16) Partition of target solution elements that would not be impacted by target EFF changes into small and large components ("no impact partition").

The distinguishing characteristics of an impact partition are the following.

Impact partition identifier
Date and time stamps
ID of user interacting with the invention to generate the impact partition
Target EFF changes (specific EFF changes selected for a partition analysis)
Target solution elements (specific required solution elements selected for a partition analysis)
Target impacted solution elements (target solution elements that have change impact relationships with the target EFF changes)
Partition of target impacted solution elements into impacted small components that localize the parts of the solution that would be impacted by the target EFF changes (first level of partition)
Partition of the impacted small components into impacted large components (second level of partition)

The invention inputs or generates and stores the information related to an impact partition in tuples such as the following.

IMPACT PARTITION TUPLES
IMPACT PARTITION-CHANGE TUPLES
IMPACT PARTITION-DATA_OR_OP TUPLES
IMPACTED SMALL COMPONENT TUPLES
IMPACTED SMALL COMPONENT-DATA_OR_OP TUPLES
IMPACTED LARGE COMPONENT TUPLES
IMPACTED LARGE COMPONENT-IMPACTED SMALL COMPONENT TUPLES
IMPACT PARTITION-IMPACTED LARGE COMPONENT TUPLES

The information stored in the tuples related to an impact partition provides users with a recommendation for how to partition the required solution elements that would be impacted by the target EFF changes into impacted small components and how to group the small components into larger components for packaging, storage, and retrieval.

The purpose of the no impact partition analysis is to identify and isolate the target solution elements associated with a corresponding impact partition analysis that would not be impacted by the target EFF changes used to generate the impact partition. By default, the invention uses the most recent impact partition analysis, but users can specify other impact partition analyses, which the invention has stored. The invention requires that the corresponding impact partition analysis be done first. The distinguishing characteristics of a no impact partition are the following.

No impact partition identifier
Related impact partition identifier
Date and time stamps
ID of user interacting with the invention to generate the no impact partition
Target EFF changes for the prerequisite impact partition analysis
Target solution elements associated with a corresponding impact partition analysis that do not have change impact relationships with the target EFF changes used to generate the impact partition
Partition of not impacted target and optionally other required solution elements into not impacted small components (first level of partition)
Partition of not impacted small components into not impacted large components (second level of partition)

The invention captures or generates and stores the information related to a no impact partition in tuples such as the following.

NO IMPACT PARTITION TUPLES
NOT IMPACTED SMALL COMPONENT TUPLES
NOT IMPACTED LARGE COMPONENT TUPLES
NO IMPACT PARTITION-NOT IMPACTED LARGE COMPONENT TUPLES

The information stored in the tuples related to a no impact partition provides users with a recommendation for how to partition the required solution elements that would not be impacted by the target EFF changes into small components encapsulated within large components for packaging, storage, and retrieval.

Before starting an impact partition analysis, the invention checks that the prerequisite analyses of the required data and operations and the impact of change on the required solution elements (analyses 145 and 160 in FIG. 1) have been done. More is said later about verifying the completion of prerequisite analyses. The decision indicator 600 in FIG. 6 indicates the check.

The invention in method 610 enables users to specify key parameters for generating an impact partition, such as the scope of the target EFF changes and of the target solution elements. The default scope includes the set of EFF changes and the set of required solution elements that result from the preparatory analyses. Alternatively, users may select a part of the default scope to be used in an impact partition analysis. They can decide to: (1) use the default scope, (2) directly select specific EFF changes, specific EFF changes and specific solution elements, or specific solution elements in the default scope, or (3) specify the values for one or more attributes of the tuples associated with the default scope of EFF changes and solution elements that will be used to select the parameters for an impact partition. For instance, users can specify LIKELIHOOD attribute values that the invention then uses to select CHANGE DETAILS tuples whose associated EFF changes will be considered in a particular impact partitioning analysis. Users can generate alternative impact partitions by varying the scope of the analyses with respect to the likelihood of change by specifying different LIKELIHOOD attribute values and compare the results. Designing for a broader range of changes may result in grouping together more required solution elements. This reduces the risk of a solution not being able to support feasible changes, but it may increase the risk that more solution elements than necessary are retrieved, examined, and potentially exposed to error to implement an EFF change.

Method 610 creates one TARGET LIKELIHOOD tuple for each user-specified likelihood value and records values for the LIKELIHOOD and USER_ID attributes. If the active user decides to use the default scope of changes or to select the target EFF changes directly rather than to specify target likelihood values, the method creates a TARGET LIKELIHOOD tuple for each standard likelihood value. The formal specifications related to TARGET LIKELIHOOD TUPLES are shown in Spec. 50 and Spec. 51. Method 610 ensures that new TARGET LIKELIHOOD tuples satisfy these specifications. The invention stores these tuples in database 620, shown in FIG. 6, that has the capability to store, search for, and retrieve the tuples. The LIKELIHOOD and USER_ID attributes of TARGET LIKELIHOOD tuples are key fields by which the invention remembers and enables reuse of the last set of target likelihood values associated with a specific USER_ID attribute value.

A user can specify the target likelihood values for a new impact partition analysis in the following ways.

(17) Use the values currently associated with the user's identifier
(18) Use a default set that includes all standard likelihood values
(19) Specify a new set of values
(20) Request a set of target likelihood values from a previous impact partition analysis In the first case, method 610 retrieves existing TARGET LIKELIHOOD tuples with USER_ID attribute values that correspond to the user's identifier. In the second and third cases, the method deletes existing TARGET LIKELIHOOD tuples associated with the user and creates new TARGET LIKELIHOOD tuples as needed so that the final set of TARGET LIKELIHOOD tuples include either all standard likelihood values (second case) or a new set of values selected by the user (third case). For the last case, the method presents the user with a list of impact partition analyses performed by the user within a specified time period along with the target likelihood values that were applied for each analysis. The method deletes TARGET LIKELIHOOD tuples associated with the user that do not correspond to the target likelihood values applied in the impact partition analysis selected by the user and creates new tuples as needed.

Similarly, method 610 provides users with the option to directly select the target solution elements or to specify KEEP_FLAG attribute values that will be used to select DATA tuples and OPERATION tuples associated with the target solution elements. In general, there is no need to include solution elements that are retained for reference only or that are children that have been recomposed because users already have decided that they should not go forward in the design; but the invention can be configured to allow user organizations to include solution elements in these states in partitioning analyses. Method 610 archives the target keep flag values selected by users or a default set that includes all standard keep flag values except for "REF" (for reference only) and "REC" (recomposed) within TARGET KEEP FLAG tuples. The invention creates one tuple for each target keep flag value and records KEEP_FLAG and USER_ID attribute values. The formal specification for TARGET KEEP FLAG TUPLES appears in Spec. 52. Method 610 ensures that new TARGET KEEP FLAG tuples satisfy the specification and stores these tuples in database 620. The KEEP_FLAG and USER_ID attributes of TARGET KEEP FLAG tuples are key fields that enable the selection of target keep flag values that can be used in an impact partitioning associated with a specific user identifier (only one set of target keep flag values per user identifier exists at any given time). Method 610 enables users to specify target keep flag values in ways similar to those for the selection of target likelihood values and similarly creates and deletes new TARGET KEEP FLAG tuples as needed.

In method 630, the invention checks the attribute values that are relevant to partitioning (such as identifiers, names, likelihood values, and keep flag values) of the tuples that correspond to the parameters for an impact partition analysis. The invention first determines whether each default EFF change is associated with a valid CHANGE DETAILS tuple and whether each default solution element is associated with a valid DATA tuple or with a valid OPERATION tuple. Method 630 assists users in correcting, as feasible, problems that it detects. Deletion of invalid tuples is an option, but users must approve this approach. Users may choose to exclude EFF changes associated with missing or invalid CHANGE DETAILS tuples from the target set. Likewise, users have the option to exclude solution elements associated with missing or invalid DATA tuples or OPERATION tuples. Method 630 locates the tuples associated with the target parameters needed to conduct the partition analysis in databases 330 (DATA tuples and OPERATION tuples), 430 (CHANGE DETAILS tuples), and 620 (TARGET LIKELIHOOD tuples and TARGET KEEP FLAG tuples).

Method 630 then determines which of the remaining default EFF changes and default solution elements are targets to be used in the subsequent impact partition analysis and corresponding no impact partition analysis. If the invention is configured to support direct selection by users of target EFF changes and target solution elements and the user has selected this option, method 630 does not use the TARGET LIKELIHOOD tuples and TARGET KEEP FLAG tuples associated with the user's identifier. If the invention is not configured for the direct selection of target EFF changes and target solution elements or if the user has not selected this option when it is available, the method uses the likelihood values stored in the TARGET LIKELIHOOD tuples corresponding to the user to select CHANGE DETAILS tuple associated with EFF changes to be included in the target set. In this case, the method also uses the keep flag values stored in the TARGET KEEP FLAG tuples corresponding to the user to select DATA tuples, DATA tuples and OPERATION tuples, or OPERATION tuples associated with solution elements to be included in the target set. The specification in Spec. 53 formally describes the target set of CHANGE DETAILS tuples (TARGET_CHANGES), and Spec. 54 formally describes the target set of DATA tuples, DATA tuples and OPERATION tuples, or OPERATION tuples (TARGET_SOLUTION_ELEMENTS). Method 630 ensures that these specifications are satisfied and stores the specified TARGET_CHANGES and TARGET_SOLUTION_ELEMENTS in database 620 for use in a subsequent impact partition analysis and no impact partition analysis.

Method 630 locates the CHANGE IMPACT RELATIONSHIP tuples in database 520 that are associated with change impact relationships between the target EFF changes and target solution elements. The method also locates the CHANGE IMPACT DECISION tuples in database 540 (not shown in FIG. 6) to help users review issues associated with the change impact relationships between the target EFF changes and target solution elements that are unresolved. Users may resolve open issues or exclude unresolved change impact relationships from the target set. The method uses the target CHANGE IMPACT RELATIONSHIP tuples to determine which of the target solution elements would be impacted by the target EFF changes. The formal specification for the target impacted solution elements is in Spec. 54, and the formal specification for the target change impact relationships is in Spec. 55. Method 630 ensures that these specification are satisfied and stores these sets of tuples in database 620 in preparation for the subsequent impact partition analysis.

The invention in method 640 generates tuples that encode the partition parameters and partition results that distinguish one impact partition analysis from another. The method generates a new IMPACT PARTITION tuple and unique identifier for each partition analysis. It records the impact partition identifier, date and time stamps, and the identifier of the user as attribute values in the tuple. The invention uses a default scheme for generating IMP_PAR_ID attribute values. Alternatively, users can develop their own scheme for identifying impact partitions and interact with the invention to assign a custom identifier to a new IMPACT PARTITION tuple. The formal specifications related to IMPACT PARTITION TUPLES are shown in Spec. 56 through Spec. 59. Method 640 ensures that new IMPACT PARTITION tuples satisfy these specifications. The method stores these and all other tuples that it creates to support an impact partition analysis and a related no impact partition analysis in database 620.

In future analyses, users may modify the likelihood values of the target EFF changes or select different target likelihood values and thereby alter the corresponding CHANGE DETAILS tuples and TARGET LIKELIHOOD tuples. Therefore method 640 preserves a history of the target EFF changes and their current likelihood values for the impact partition analysis being performed by generating one IMPACT PARTITION-CHANGE tuple for each target EFF change. The formal specification for IMPACT PARTITION-CHANGE TUPLES is shown in Spec. 60. Method 640 ensures that new IMPACT PARTITION-CHANGE tuples satisfy the specification. The LIKELIHOOD attribute of the IMPACT PARTITION-CHANGE tuples archives the likelihood value assigned to the target EFF changes at the time of the impact partition analysis.

Method 640 also archives information about the target solution elements and their current keep flag value assignments within IMPACT PARTITION-DATA_OR_OP tuples. The method generates one tuple for each target datum and for each target operation. If a target datum or a target operation is also a member of the impacted solution elements, then the method records the logical value true for the IMPACTED attribute and false otherwise. The formal specification for IMPACT PARTITION-DATA_OR_OP TUPLES is shown in Spec. 61. The method ensures that new IMPACT PARTITION-DATA_OR_OP tuples satisfy the specification. By archiving the context of an impact partition analysis, the invention enables users to generate alternative partitions by varying the partition parameters. Users can compare multiple impact partition compositions before making decisions about the componentization of the target solution elements with respect to the target EFF changes.

The primary purpose of an impact partition analysis and correlated no impact partition analysis is to partition the target solution elements into components that localize the impact of the target EFF changes. To accomplish this, method 640 first performs an impact partition analysis to partition the target solution elements that have target change impact relationships with the target EFF changes into impacted small components. The target solution elements within an impacted small component have target change impact relationships with the exact same target EFF changes. For each impacted small component resulting from an impact partition analysis, method 640 generates an IMPACTED SMALL COMPONENT tuple. The formal specifications related to IMPACTED SMALL COMPONENT TUPLES are shown in Spec. 62 through Spec. 64. Method 640 ensures that new IMPACTED SMALL COMPONENT tuples satisfy these specifications. The method generates values for the IMP_SM_COMP_ID and IMP_SM_COMP_CH_SIGNATURE attributes for each new IMPACTED SMALL COMPONENT tuple. The IMP_SM_COMP_ID attribute provides a way to identify each IMPACTED SMALL COMPONENT tuple associated with an impacted small component. The change signature for an impacted small component is an innovation that is discussed later. Alternatively, users can interact with the invention to assign a custom IMP_SM_COMP_ID attribute value. Method 640 also enables users to provide their own names for impacted small components. Optionally, the invention can concatenate the names of the target solution elements contained within an impacted small component with separators between the names and assign the resulting string as the name for the impacted small component.

The impact partition process groups target solution elements that would be impacted by the same target EFF changes into impacted small components. For all pairs of different target solution elements, if two target solution elements are in the same impacted small component: then for all target EFF changes, if a specific target EFF change has a target change impact relationship with one of the two target solution elements, it has a target change impact relationship with the other target solution element. The automated impact partitioning process in method 640 generates a partition of the target impacted solution elements into impacted small components that satisfy the "In Same Impacted Small Component Property", as defined in Spec. 66 with a definition of the requisite function TargetImpact in Spec. 65. The corollary to this property also holds. Method 640 archives the contents of each impacted small component via IMPACTED SMALL COMPONENT-DATA_OR_OP tuples. The method generates one tuple for each target solution element contained within a specific impacted small component. A specific target solution element is contained within precisely one impacted small component and therefore is associated with precisely one IMPACTED SMALL COMPONENT-DATA_OR_OP tuple. The formal specification for IMPACTED SMALL COMPONENT-DATA_OR_OP TUPLES is shown in Spec. 67. Method 640 ensures that new IMPACTED SMALL COMPONENT-DATA_OR_OP tuples satisfy the specification.

Solution developers frequently make decisions about how to group smaller components into larger components for packaging, archival, retrieval, and reuse. As part of an impact partition analysis, method 640 automatically generates a recommendation for partitioning the impacted small components into larger components that make it easier to locate the impacted small components that would be impacted by a specific EFF change and to minimize the risk of introducing errors into parts of the solution that would not be impacted by the target EFF change. A target EFF change impacts a small component if there is a target change impact relationship between the target EFF change and each of the target solution elements contained within the impacted small component. The formal definition of the impact of a target EFF change on an impacted small component is described in Spec. 68. Method 640 groups the impacted small components that would be impacted by a unique subset of the target EFF changes within the same impacted large component. Each impacted small component within an impacted large component would be impacted by one or more of the target EFF changes associated with the impacted large component. An impacted small component encapsulated within a particular impacted large component would be impacted by at least one target EFF change that would impact another impacted small component within the same impacted large component. The exception is an impacted large component containing only one impacted small component.

Two impacted small components have a shared impact relationship if they would be impacted by at least one change in common. The SharedImpact relation, by definition, is binary but not transitive. A target EFF change that establishes a shared impact relationship between a pair of impacted small components may be different from a target EFF change that establishes a shared impact relationship with another pair of impacted small components, even though the two pairs may share a common impacted small component. The transitive closure of the SharedImpact relation, SharedImpact$^+$, establishes a relationship between impacted small components that collectively are impacted by a unique subset of the target EFF changes and that individually have a SharedImpact relation with at least one other impacted small component in the group. The formal specifications for the SharedImpact and SharedImpact$^+$ relations as well as the "In Same Impacted Large Component Property" and its corollary are presented in Spec. 69. Each impacted large component contains one or more impacted small components related through the SharedImpact$^+$ relation over a unique subset of the target EFF changes. By the "In Same Large Component Property", if a target EFF change would impact one or more small components contained within an impacted large component, it would not impact small components contained within other impacted large components. In an impact partition, impacted large components encapsulate impacted small components that are impacted through transitive closure by a unique subset of the target EFF changes. An impacted large component localizes the impact of the target EFF changes associated with it to the impacted small components that it encapsulates and to the target solution elements contained within these impacted small components. The unique subsets of target EFF changes associated with the impacted large components form a partition of the target EFF changes. Method 640 ensures that an impact partition satisfies "In Same Impacted Small Component Property" and "In Same Impacted Large Component Property".

For each impacted large component, method 640 generates an IMPACTED LARGE COMPONENT tuple. The formal specifications related to IMPACTED LARGE COMPONENT TUPLES are shown in Spec. 70 through Spec. 72. The method ensures that new IMPACTED LARGE COMPONENT tuples satisfy these specifications. The invention generates values for the IMP_LG_COMP_ID and IMP_LG_COMP_CH_SIGNATURE attributes for each new IMPACTED LARGE COMPONENT tuple. The IMP_LG_COMP_ID attribute value provides a way to identify the IMPACTED LARGE COMPONENT tuple and its associated impacted large component. The change signature for an impacted large component is an innovation that is discussed later. Alternatively, users can interact with the invention to assign custom IMP_LG_COMP_ID attribute values to the impacted large component tuples.

The invention in method 640 remembers the contents of each impacted large component via IMPACTED LARGE COMPONENT-IMPACTED SMALL COMPONENT tuples. The method generates one tuple for each small component contained within a specific impacted large component. The formal specification for IMPACTED LARGE COMPONENT-IMPACTED SMALL COMPONENT TUPLES is shown in Spec. 73. Method 640 ensures that new IMPACTED LARGE COMPONENT-IMPACTED SMALL COMPONENT tuples satisfy the specification. These tuples link the impacted large components resulting from an impact partition analysis with the impacted small components that they encapsulate. The invention in method 640 also provides links between an impact partition and the resulting large components within IMPACT PARTITION-IMPACTED LARGE COMPONENT tuples. The formal specification of IMPACT PARTITION-IMPACTED LARGE COMPONENT TUPLES is shown in Spec. 74. Method 640 ensures that new tuples of this type satisfy the specification. Via the IMPACT PARTITION-IMPACTED LARGE COMPONENT tuples and IMPACTED LARGE COMPONENT-IMPACTED SMALL COMPONENT tuples, users can retrieve information regarding the impacted large components and impacted small components resulting from an impact partition analysis.

The IMP_LG_COMP_CH_SIGNATURE and IMP_SM_COMP_CH_SIGNATURE attributes of the IMPACTED SMALL COMPONENT tuples and IMPACTED LARGE COMPONENT tuples, respectively, help users to quickly determine the target EFF changes that would impact the contents of the impacted large components and impacted small components associated with an impact partition. Method 640 generates textual change signatures that comprise the identifiers of the target EFF changes that would impact the contents of an impact large component or impacted small component along with a symbolic representation of the extent of the impact. By the "In Same Impacted Small Component Property" (Spec. 66), all target solution elements contained within an impacted small component would be impacted by the same set of changes. Therefore, to represent the impact of change on an impacted small component, the invention concatenates the identifiers of all target EFF changes that would impact the contents of the impacted small component and inserts the Boolean operator "Λ" between each pair of identifiers. The logical "and" operator indicates that each solution element contained within the impacted small component would be impacted by every change whose identifier is included in the impacted small component's change signature. Spec. 75 shows a function to automatically generate the change signature for an impacted small component. The output of the function exemplifies the structure of the change signatures for impacted small components generated by method 640.

By the "In Same Impacted Large Component Property" (Spec. 69), each small component contained within an impacted large component would be impacted by one or more changes of a set that is related through transitive closure. To represent the impact of change on the impacted large component, the invention concatenates the identifiers of the target EFF changes that would impact the impacted small components contained within the impacted large component and inserts the Boolean operator "V" between each pair of identifiers. The logical "or" operator indicates that each impacted small component contained within the impacted large component would be impacted by one or more of the target EFF changes whose identifiers are included in the impacted large component's change signature. Spec. 76 shows a function to automatically generate the change signature for an impacted large component. The output of the function exemplifies the structure of the change signatures for impacted large components generated by method 640.

The invention generates and communicates to users an index of the change signatures associated with the impacted large components and impacted small components resulting from an impact partition analysis. The change signature index cross references the identifiers of the target EFF changes for an impact partition analysis with the change signatures of the impacted large components and impacted small components that would be impacted by the target EFF changes. Target EFF changes that would have no impact on any of the target solution elements are not included in the change signature index for the impact partition (though they are associated with the impact partition analysis via the IMPACT PARTITION-CHANGE tuples). To facilitate construction of the change signature index for an impact partition, method 640 generates a CHANGE-IMPACTED SMALL COMPONENT tuple for each target EFF change and each small component that it would impact. The formal specification of CHANGE-IMPACTED SMALL COMPONENT TUPLES is shown in Spec. 77. Method 640 ensures that new tuples of this type satisfy the specification.

To help solution developers implement a target EFF change, the invention can use the CHANGE-IMPACTED SMALL COMPONENT tuples to retrieve the IMPACTED SMALL COMPONENT tuples, IMPACTED LARGE COMPONENT-IMPACTED SMALL COMPONENT tuples, and IMPACTED LARGE COMPONENT tuple associated with the impacted small components that would be impacted by the target EFF change and the impacted large component that encapsulates them. The NAME attributes of the IMPACTED LARGE COMPONENT and IMPACTED SMALL COMPONENT tuples provide links to the solution artifacts associated with the impacted large and small components. The solution developer would then examine and modify the solution as needed. The search and retrieval of solution artifacts for implementing a change is not shown in FIG. 6. Retrieval of solution artifacts outside the scope of the invention may be done by a configuration management tool.

Upon request by users, the invention in method 640 displays the change signature index for a specified impact partition analysis. The displayed information may include minimally the identifier of the partition, the identifiers of the target EFF changes that impact one or more of the target solution elements, and for each target EFF change the change signature of the corresponding impacted large component along with the change signatures of the impacted small components contained within the impacted large component. The IMPACT PARTITION-CHANGE tuples, CHANGE-IMPACTED SMALL COMPONENT tuples, IMPACTED LARGE COMPONENT-IMPACTED SMALL COMPONENT tuples, and IMPACTED LARGE COMPONENT tuples associated with a specific impact partition analysis contain the information that the invention needs to construct the change signature index. Method 640 retrieves the requisite tuples for the partition and then constructs and displays the index. Optionally, the invention can display other partition-related information such as the identifiers of the target solution elements contained within each impacted small component, the date or time of the impact partition analysis, and the identifier of the user associated with the analysis. Method 640 locates this information from the IMPACT PARTITION tuple for the impact partition analysis selected by the users. The corresponding IMPACTED SMALL COMPONENT-DATA_OR_OP tuples provide the identifiers of the target solution elements contained within each impacted small component.

Among other formats, the invention can display a change signature index as a table. Each row of the table shows the impact of a target EFF change on one or more impacted small components contained within an impacted large component. The first column contains the identifiers of the target EFF changes, the second column contains the change signatures of the impacted large components whose contents would be impacted by the corresponding target EFF changes, and the right-most columns contain the change signatures of the impacted small components that are encapsulated by the corresponding large component and would be impacted by the corresponding target EFF changes. Since a target EFF change may impact at most one impacted large component, the change identifiers in the left-most column are unique. A target EFF change listed in the table impacts one or more impacted small components contained within an impacted large component but may not impact all of impacted small components within the impacted large component. Therefore, the change signatures shown in the same row and in the cells to the right of an impacted large component change signature may not include the change signatures of all impacted small components contained within the impacted large component.

There are likely to be some target solution elements that would not be impacted by the target EFF changes of an impact partition analysis and therefore not included in impacted small components. For convenience to users, the invention in method 650 partitions the target solution elements that would not be impacted by the target EFF changes into separate components with one solution element per not impacted small component. The invention can be configured to include required solution elements that were not targets for the correlated impact analysis in the no impact partition process. Method 650 then encapsulates each not impacted small component within its own not impacted large component. The resulting no impact partition is one way to package target solution elements that were analyzed but not impacted by the target EFF changes and therefore not partitioned into impacted small components. Based on experiential knowledge, design objectives other than solution evolution, or other information, users may combine target solution elements not impacted by the target EFF changes and optionally other required solution elements that were not targets into alternative small and large components.

If users decide upon the default no impact partition design, method 650 generates a NO IMPACT PARTITION tuple to archive information about the corresponding analysis such as the identifier of the no impact partition, identifier of the correlated impact partition, date, time, and user performing the analysis. The formal specifications for the NO IMPACT PARTITION tuples are shown in Spec. 78 and Spec. 79. Method 650 ensures that new NO IMPACT PARTITION tuples satisfy these specifications. The method automatically generates the identifier for a no impact partition as well as the date and time. Method 650 uses the IMP_PAR_ID attribute value from the most recent IMPACT PARTITION tuple generated for the user to specify the identifier of the correlated impact partition analysis. The invention also can prompt the user to select an archived impact partition and conduct the no impact partition analysis with respect to this partition. In this case, the invention retrieves the IMPACT PARTITION-DATA_OR_OP tuples associated with the selected impact partition analysis and examines the values of the DA_OR_OP_ID attribute and IMPACTED attribute of these tuples to determine the target solution elements that were not impacted by the target EFF changes.

The invention in method 650 generates a NOT IMPACTED SMALL COMPONENT tuple for each target solution element that would not be impacted by the target EFF changes and, if configured to do so, for each required solution element that was not a target for the correlated impact partition analysis. The formal specifications related to NOT IMPACTED SMALL COMPONENT TUPLES are shown in Spec. 80 and Spec. 81. Method 650 ensures that new tuples of this type satisfy these specifications. The invention automatically generates the NIMP_SM_COM- P_ID attribute value for a NOT IMPACTED SMALL COMPONENT tuple. The DA_OR_OP_ID attribute value is a link to the tuple representing the target or other required solution element to be encapsulated within the not impacted small component. Method 650 also generates a NOT IMPACTED LARGE COMPONENT tuple to represent the packaging of each small component in a separate larger component. The formal specifications related to NOT IMPACTED LARGE COMPONENT TUPLES are shown in Spec. 82 and Spec. 83. Method 650 ensures that new tuples of this type satisfy these specifications. The invention automatically generates the NIMP_LG_COMP_ID attribute value for a NOT IMPACTED LARGE COMPONENT tuple. The NIMP_SM_COMP_ID attribute value provides a link to the tuple of the smaller component encapsulated within the not impacted large component. Users may decide to forego using this extra layer of componentization, but large component designs are available to provide packaging options for small components not impacted by change that parallel the packaging of small components impacted by change. Method 650 provides links to remember the not impacted large components associated with a no impact partition analysis. For each large component not impacted by change, the invention generates a NO IMPACT PARTITION-NOT IMPACTED LARGE COMPONENT tuple. The formal specification for the NO IMPACT PARTITION-NOT IMPACTED LARGE COMPONENT TUPLES is shown in Spec. 84. Method 650 ensures that new tuples of this type satisfy the specification.

The NAME attributes of IMPACTED SMALL COMPONENT TUPLES, IMPACTED LARGE COMPONENT TUPLES, NOT IMPACTED SMALL COMPONENT TUPLES, and NOT IMPACTED LARGE COMPONENT TUPLES enable users to reference components via names that are semantically meaningful to the stakeholders and to link component tuples to other related solution artifacts. Methods 640 and 650 can assign default names or support user-specified component names. While the partitioning analyses can be done without name assignment, the invention queries users about unassigned component names before preparing a partition report.

To facilitate user review, the invention in method 660 reports the results of an impact partition analysis as well as the corresponding change signature index and no impact partition analysis. These reports provide a textual or graphical representation of the target EFF changes, target solution elements, impacted and not impacted large and small components, and change signature index resulting from correlated impact partition and no impact partition analyses. The invention can use the results of the most recent correlated impact partition analysis and no impact partition analysis that the user has performed or can prompt the user to select a specific impact partition analysis that was done previously. In the latter case, the invention retrieves the corresponding tuples to obtain the information needed for a report. The invention supports the selection and simultaneous display of multiple reports, thus enabling users to iteratively generate and compare alternative partitions. Reports of partition results and change signature index reports are stored in and retrieved from database 670 shown in FIG. 6, that has the capability to store, search for, and retrieve the reports.

Figure 7:
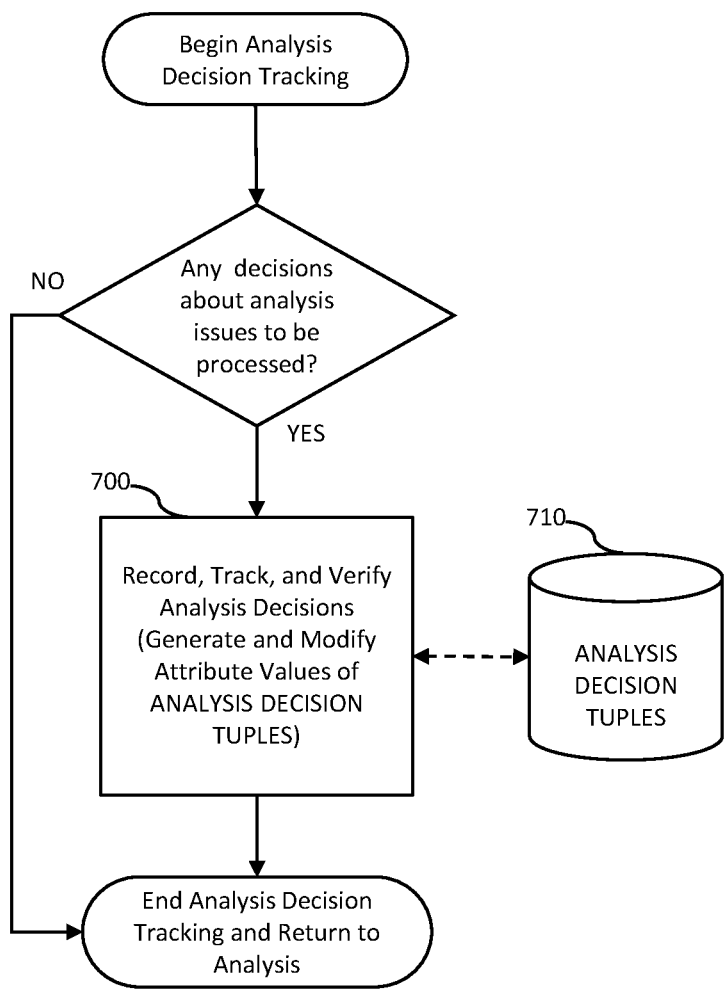
FIG. 7 shows an example of a process model that may be used to track decisions that users need to make regarding issues they encounter while performing the analyses supported by the invention.

The development of solutions for evolution involves decision making and issue resolution related to the analyses enabled by the invention. Users are likely to gather the information that they need to make decisions about issues over time as they incrementally and iteratively perform the various analyses. The invention enables users to automatically record, track, and verify issues and decisions (or resolutions) regarding specific analyses. On demand by users, the invention activates method 700 depicted in FIG. 7 to open, track, and close or dismiss an issue or decision to be made. Method 700 generates an ANALYSIS DECISION tuple to record information about the target issue or decision. The formal specifications related to ANALYSIS DECISION TUPLES are shown in Spec. 85 through Spec. 87. Method 700 ensures that new tuples of this type satisfy these specifications. The invention uses database 710, shown in FIG. 7, to store, search for, and retrieve ANALYSIS DECISION tuples.

Method 700 automatically generates an AN_DEC_ID attribute value for each ANALYSIS DECISION tuple. By default, the invention records the ANALYSIS attribute value that corresponds to the analysis currently being performed by the active user. Alternatively, users can select a value from a programmed list, as specified in Spec. 86, that includes the primary types of analyses outlined in FIG. 1 as well as their corresponding review activities. The invention tracks the review of information resulting from a specific type of primary analysis as another type of analysis, thereby enabling users to identify issues or questions that need to be resolved or made about the information that they review. The invention allows authorized users to customize the ANALYSIS attribute values to support alternative approaches to solution development and issue tracking. Uses may request the invention to record other attributes about an issue or decision to be made such as the following.

Date issue or decision to be made is opened
Date issue or decision to be made is closed or dismissed The invention comprehensively retains the context and status of each analysis that it helps users to perform. Via contextual memory, the invention ensures the completion of prerequisite analyses the availability and correctness of required information for an analysis. The invention automatically tracks and reports the status of prerequisite analyses and their results. The invention can operate as a stand-alone method and system or as part of another solution development environment. Though different implementations of the invention may vary in how they ensure the requisite flow of information between analyses, the invention automatically retains and verifies prerequisite information for the analyses that it enables.

The invention ensures the flow of information across correlated analyses by eliciting and remembering context, decisions, and other information as it interacts with users performing the analyses. In addition to solution-oriented information stored in tuples that it creates for each analysis as previously discussed, the invention archives process-oriented information such as the following for each analysis in a set of correlated analyses.

Figure 8:
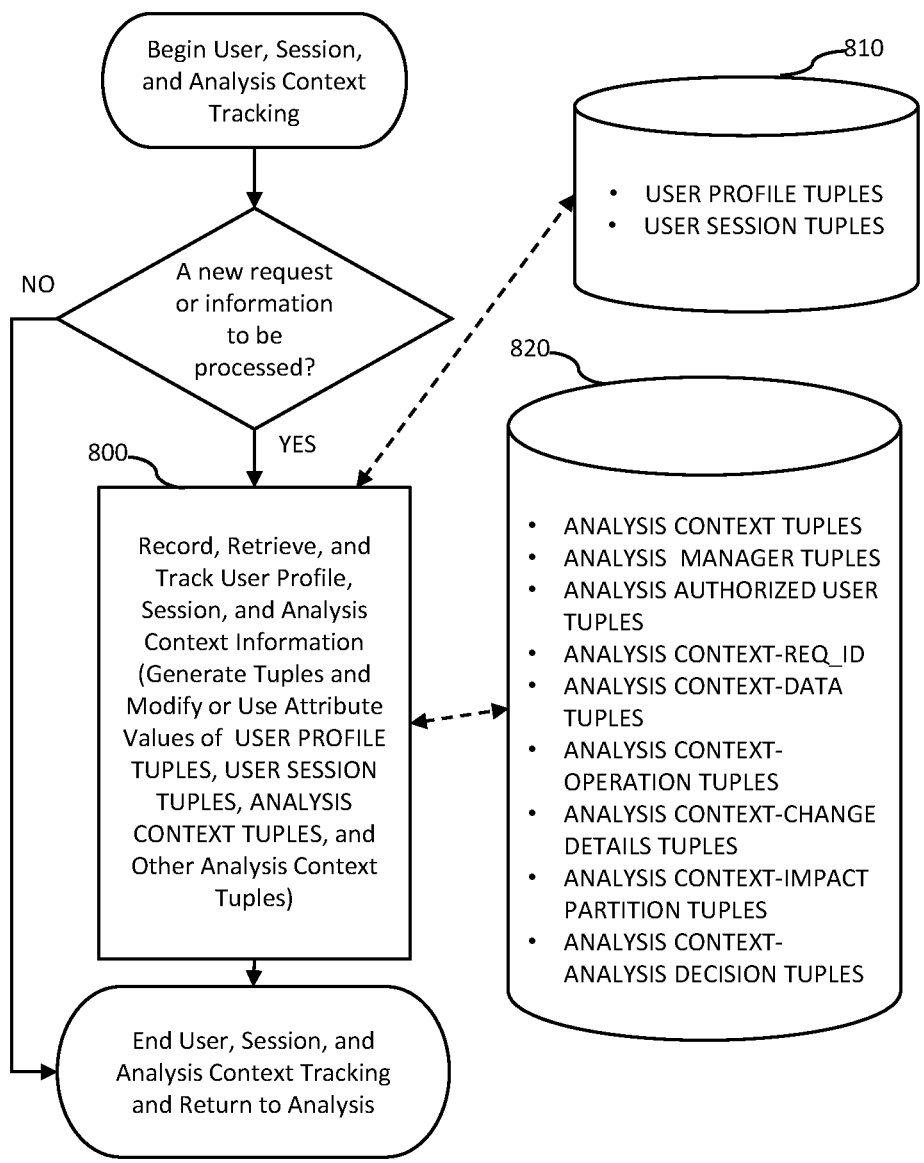
FIG. 8 shows an example of a process model that may be used to record, track, retrieve, and use analysis context information.

ID for a set of correlated analyses
Type of analysis being performed
ID for a user who is the lead contact for the analysis
Start date of the analysis
End date of the analysis
Total time to conduct the analysis
Status of the analysis If configured to do so, the invention via method 800, shown in FIG. 8, creates an ANALYSIS CONTEXT tuple for each analysis that users perform within a set of correlated analyses composed of the analyses discussed previously. The formal specifications related to ANALYSIS CONTEXT TUPLES are shown in Spec. 88 through Spec. 91. Method 800 ensures that new tuples of this type satisfy these specifications. The method generates an identifier for each new set of correlated analyses and records it in the COR_AN_ID attribute of the ANALYSIS CONTEXT tuples associated with the set. This identifier enables the invention to locate these tuples when users perform the correlated analyses in the set.

The ANALYSIS attribute value of an ANALYSIS CONTEXT tuple indicates the type of analysis whose context is being represented by the tuple. The invention automatically assigns the value corresponding to the analysis selected by the user. As discussed earlier, the default values for the ANALYSES domain (Spec. 86) include separate designations for review activities. This feature enables solution development teams to track the time to perform an analysis separate from the time used to review the analysis results. The review-related values for the ANALYSIS attribute value also indicate activities for which the invention provides users with read-only access to the information stored in the tuples associated with an analysis being reviewed, as opposed to read and write access when users are performing the analysis.

When an ANALYSIS CONTEXT tuple is created for a new analysis or review of analysis results, method 800 saves the identifier of a designated user in the LEAD_USER attribute. The LEAD_USER attribute value indicates the person who is the lead contact for the analysis or review. The invention can support the designation of analysis managers who have permission to electronically (1) change the LEAD_USER attribute values of the ANALYSIS CONTEXT tuples for specific sets of correlated analyses and (2) authorize users to access or work on specific analyses or reviews for which they are not the lead contacts. The analysis manager feature enables solution developers to work jointly on analyses or reviews and to flexibly adjust team member assignments as needed. More is said later about specialized tuples for analysis manager and authorized user designations. Method 800 does not change the LEAD_USER attribute value when different authorized users work on an analysis. Only one authorized user at any given time can add, modify, or delete information about a specific analysis with first-come first-serve access by default.

The STDATE, ENDATE, and TOTIME attributes of an ANALYSIS CONTEXT tuple provide information about the start and end dates for the period in which an analysis or review is conducted and the total execution time, respectively. The TOTIME attribute provides a running tally of the total time in which users interact with the invention to jointly conduct the analysis or review. The TOTIME value does not include time intervals between the start and end dates when there are no users working on the analysis or review. These attribute values can enable users to track their collective progress on an analysis or review via the STATUS attribute of the corresponding ANALYSIS CONTEXT tuple. The default values for the ANALYSIS_STATUS_VALUES domain range from "READY_TO_START" to "COMPLETED" or "CANCELLED".

As discussed previously, users may perform and compare alternative partitions by modifying the values in the LIKELIHOOD attribute of the target CHANGE DETAILS tuples or in the KEEP_FLAG attribute of the target DATA or OPERATION tuples as well as by selecting different target EFF change likelihood or keep flag values. The total time to conduct the partition phase includes the time spent on generating and analyzing alternative partitions as well as adding any design modifications to the partitioned components. Therefore, the TOTIME attribute of an ANALYSIS CONTEXT tuple for a partition analysis includes the time spent performing alternative impact partition and no impact partition analyses. Once the STATUS attribute value of an ANALYSIS CONTEXT tuple indicates the completion of the analysis, the invention no longer increments the value of the tuple's TOTIME attribute. The attributes of an ANALYSIS CONTEXT tuple enable the invention to automatically track and report user progress and effort on the supported analyses and to help solution development teams manage their projects.

When the analysis manager feature is configured and active, the invention generates tuples to designate users who are analysis managers for specific sets of correlated analyses (ANALYSIS MANAGER tuples) and users who are authorized to access specific analyses in a set (ANALYSIS AUTHORIZED USER tuples). At the request of a project manager or other person in charge of assigning analysis managers, the invention via method 800 generates the identifier for a new set of correlated analyses and generates ANALYSIS MANAGER tuples that specify user managers for the new set. An analysis manager can interact with the invention to create ANALYSIS AUTHORIZED USER tuples that specify users who are authorized to work on designated analyses for the new set of correlated analyses. An analysis manager also can interact with the invention to create ANALYSIS CONTEXT tuples for the analyses in the set. Users are permitted read and write access rights to the information stored in tuples associated with the analyses for which they are authorized. Spec. 92 through Spec. 94 show the formal specifications related to ANALYSIS MANAGER tuples and ANALYSIS AUTHORIZED USER tuples. Method 800 can generate these tuples and ensures that new instances satisfy the specifications.

The COR_AN_ID and MANAGER attributes jointly ensure uniqueness across ANALYSIS MANAGER tuples. Therefore, a user can be a designated manager for multiple sets of correlated analyses; and each set of correlated analyses may have multiple managers. The invention may include other attributes in the ANALYSIS MANAGER tuple such as an ANALYSIS field that would enable the designation of managers for specific types of analyzes or reviews. Likewise, the COR_AN_ID, USER, and ANALYSIS attributes jointly ensure uniqueness across ANALYSIS AUTHORIZED USER tuples. Therefore, a user may be authorized to perform specified analyses within and across various correlated sets; and a specific analysis within a specified correlated set may be performed by multiple authorized users. The TOTIME attribute of an ANALYSIS AUTHORIZED USER tuple tracks the total time that a designated user works on a specific analysis or review for a specified set of correlated analyses.

Method 800 creates special tuples to facilitate the retrieval of information used to conduct an analysis as well as the information generated by the analysis. Contextual tuples, such as the following, provide links to the tuples related to a set of correlated analyses.

ANALYSIS CONTEXT-REQ_ID TUPLES
ANALYSIS CONTEXT-DATA_OR_OP TUPLES
ANALYSIS CONTEXT-CHANGE DETAILS TUPLES
ANALYSIS CONTEXT-IMPACT PARTITION TUPLES
ANALYSIS CONTEXT-ANALYSIS DECISION TUPLES

The formal specifications for these contextual linking tuples are shown in Spec. 96 through Spec. 99. Method 800 ensures that new instances of these tuples satisfy these specifications. The invention stores all tuples related to analysis context and contextual linking in database 820 (FIG. 8) that has the capability to store, search for, and retrieve the tuples.

A contextual linking tuple includes attributes for the identifier of the set of correlated analyses being conducted and for the identifier or key used to locate the tuples containing information related to each analysis in the set. For example, ANALYSIS CONTEXT-REQ_ID tuples are composed of two attributes: the identifier of a set of correlated analyses (COR_AN_ID) and a requirements identifier (REQ_ID), as shown in Spec. 95 and verified by method 800.

The following retrievals show how method 800 can use ANALYSIS CONTEXT-REQ_ID tuples to find the context for a specific Phase 1 analysis of required elements.

(21) Retrieve the ANALYSIS CONTEXT-REQ_ID tuples whose COR_AN_ID attribute values match the value for the target set of correlated analyses.
(22) Retrieve the REQ_ID-RSNOUN and REQ_ID-RSVERB tuples whose REQ_ID attribute values belong to the set of REQ_ID attribute values of the ANALYSIS CONTEXT-REQ_ID tuples retrieved in step 1.
(23) Retrieve the PRIMARY CANDIDATE NOUN and PRIMARY CANDIDATE VERB tuples whose NOUN or VERB attribute values belong to the set of RSNOUN, PCNOUN, RSVERB, and PCVERB attribute values of the REQ_ID-RSNOUN and REQ_ID-RSVERB tuples retrieved in step 2.
(24) Retrieve the NOUN SYNONYM and VERB SYNONYM tuples whose NOUN or VERB attribute values belong to the set of NOUN and VERB attribute values of the PRIMARY CANDIDATE NOUN and PRIMARY CANDIDATE VERB tuples retrieved in step 3.

The invention can archive user profile and session information such as the following.
User identifier
User password
User name
Identifier of set of correlated analyses on which the user is or was working
Analysis or review on which the user is or was working
Start date of user session
End date of user session
Start time of user session
End time of user session
Total time of user session The invention's method 800 can generate USER PROFILE tuples and USER SESSION tuples to retain authorization and session information for each valid user of the invention. The formal specifications for USER PROFILE TUPLES and USER SESSION TUPLES are shown in Spec. 100 through Spec. 103. Method 800 ensures that new instances of these tuples satisfy these specifications and stores them in database 810 (FIG. 8) that has the capability to store, search for, and retrieve USER PROFILE tuples and USER SESSION tuples.

When a user inputs a user identifier and password to log in to the invention, method 110 (FIG. 1) activates method 800 to determine the correct password associated with the user. Method 800 first determines whether the input user identifier has a corresponding USER PROFILE tuple. If this tuple exists, method 800 retrieves and reports the value of the tuple's PASSWORD attribute. Method 110 verifies that the user login information is correct and, for valid users, activates method 800 to generate a new USER SESSION tuple for the user. Method 800 archives the user identifier, start date, and start time in the new USER SESSION tuple's USER_ID, SDATE, and STIME attributes, respectively. When the user logs out or when the user's session times out (END ANALYSIS symbol on FIG. 1 through FIG. 8), the invention activates method 800 to record the end date, end time, and total time in the EDATE, ETIME, and TOTIME attributes, respectively, of the USER SESSION tuple corresponding to the user's active session.

The invention's method 130 (FIG. 1) can provide the user with options to start or continue a correlated set of analyses and to start or continue an analysis. When the analysis manager feature is active, method 130 activates method 800 to determine whether the user is authorized to perform the selected analysis within a specified set of correlated analyses. To do this method 800 searches for an ANALYSIS AUTHORIZED USER tuple associated with the user and selected analysis within the specified correlated set (as discussed previously, authorized users are specified by an analysis manager). Method 130 verifies that the user is authorized for the selected analysis and wants to continue with the analysis. If the user is not authorized or does not want to continue with the selected analysis, the user may select another analysis or stop using the invention. If the analysis manager feature is not active and the user wants to start a new analysis, then method 130 activates method 800 to generate a new ANALYSIS CONTEXT tuple for the analysis and will generate an identifier for the correlated set of analyses if this is the first analysis to be performed in the set. Method 130 activates method 800 to assign the appropriate value to the ANALYSIS attribute of the USER SESSION tuple before a selected analysis is started or resumed.

Figure 9:
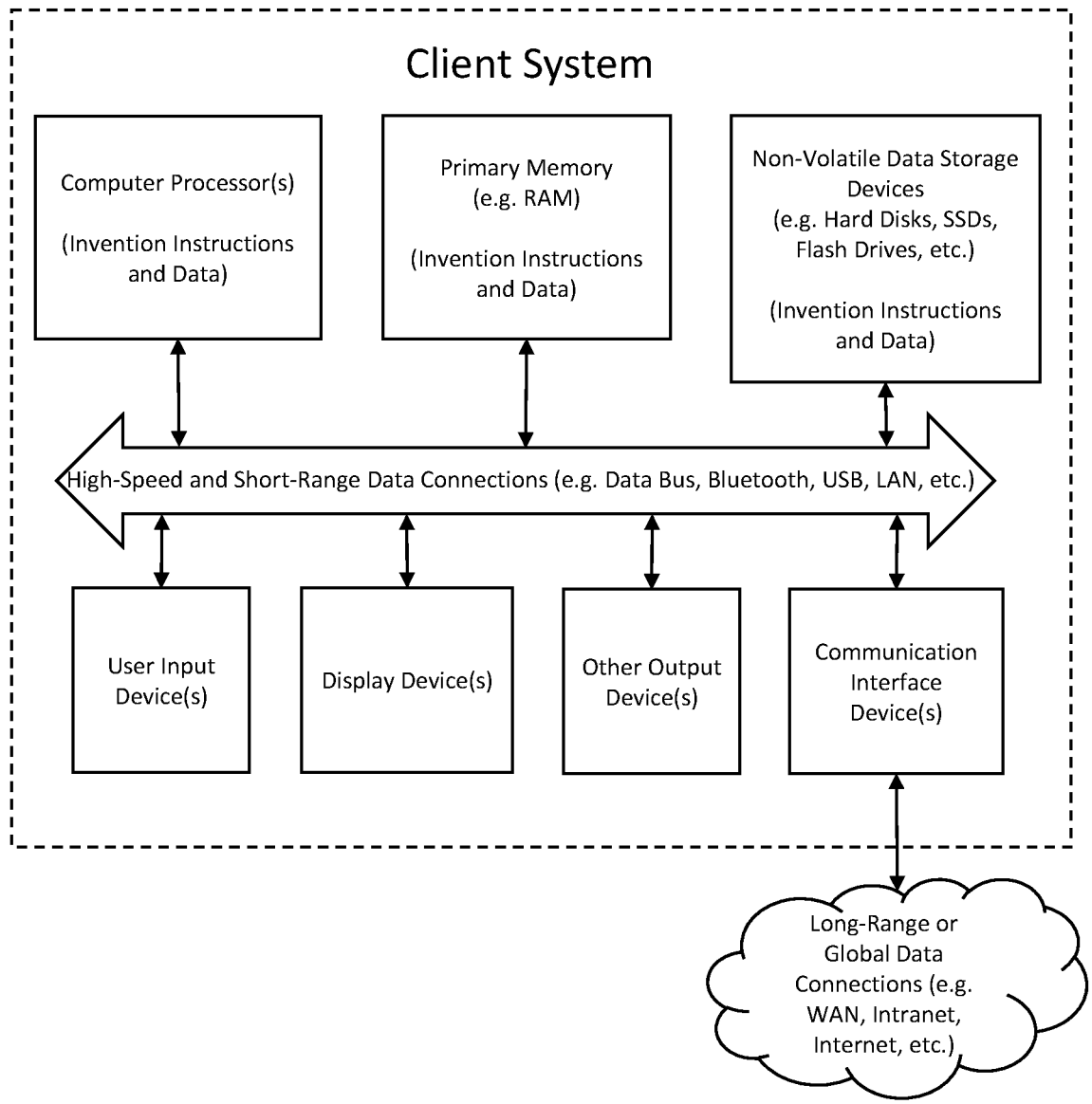
FIG. 9 shows an example of a client system in which an implementation of the invention is embedded and processed as electronic instructions and data. In this example, the invention resides and executes solely within a client's local computing system.

When implemented and installed, the invention resides and operates within an electronic system composed of physical components such as those shown in FIG. 9. The implemented invention exists as electronically encoded instructions and data embedded within the following electronic components of a representative client system.
One or more computer processors
Primary, volatile memory components such as random-access memory (RAM)
Secondary or non-volatile data storage devices such as hard drives, solid state devices (SSD), flash drives and other non-volatile memory chips, sticks, or cards The specific instructions, encodings, and data formats for an implementation of the invention may vary depending on the type of computer processor(s), memory, and other electronic devices that process, execute, interpret, store, or transmit the invention. Likewise, the operating environment (operating systems, device drivers, communication protocols, databases, application servers, etc.) that directs the execution, storage, and transmission of the implemented invention will vary to be compatible with the electronic components and applications that operate in conjunction with the invention in a locally or globally networked system. As shown in FIG. 9, users interact with the invention via electronic input devices (such as braille readers, keyboards, computer mice, microphones, touch screens, trackpads, etc.) connected to processors. In response, the invention produces electronic data that can be converted as needed to other forms of transmission and communicated to users via output devices such as braille embossers, computer printers, flat screens, headphones, monitors, etc.

The techniques and tools used to develop an implementation of the invention may vary to support the underlying electronic system in which the invention will be embedded and operate as well as to further the technical or business objectives of the solution development organization and other invention stakeholders. For instance, to build the invention for use as a desktop or enterprise application, solution developers may choose programming languages such as C, C++, C #, Go, Java, Swift, some form of SQL, etc., for which there are compilers to generate instructions that are able to be processed by the underlying processor and operating environment. Alternatively, to embed the implemented invention within a host application, developers may use a host-specific language such as Visual Basic for Applications. (Visual Basic is a registered trademark of Microsoft® Corporation in the United States or other countries.)

Figure 10:
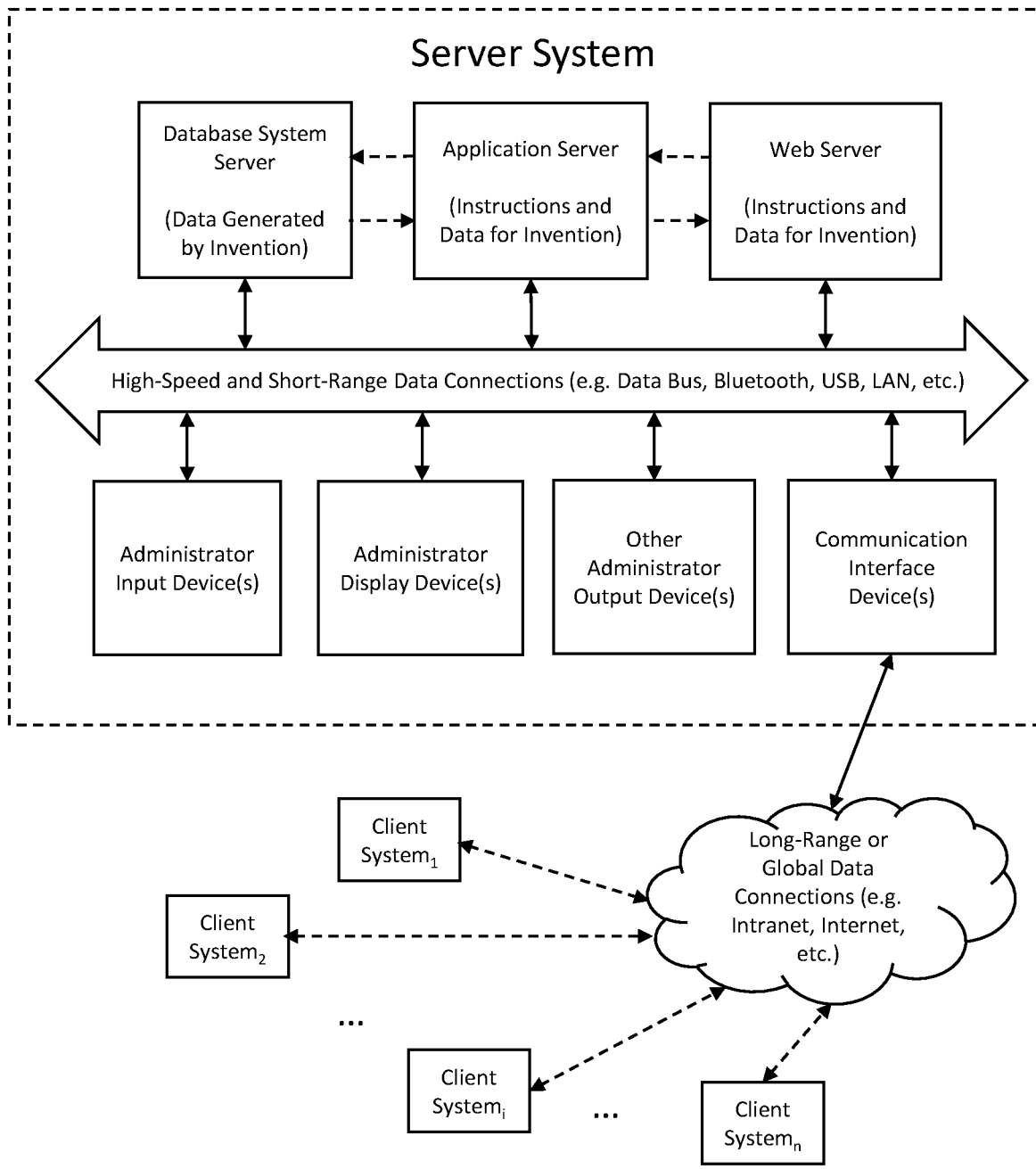
FIG. 10 shows an example of a server system in which an implementation of the invention is an electronic, Web-based application in a server system designed to process user requests received via a long-distance network, such as the Internet.

To build an open source, Web-based version of the invention, solution developers may use programming languages such as HTML, XML, Java, JavaScript, Perl, PHP, Python, Ruby or Ruby on Rails, or SQL (to communicate with an open source database system such as relational MySQL or object-relational PostgreSQL). In this use scenario, the invention would reside as instructions and data within Web, application, or database servers that are part of a server system, such as the one shown in FIG. 10. Similarly, the client-side system would contain invention instructions and data received from the server that are processed, stored, or displayed within the client's operating environment. A client system would connect to a server system via a long-range network as shown in FIG. 10. Other system architectures and implementations of the invention are feasible.

The invention's method includes default naming conventions for key attributes and default mechanisms to generate identifiers for constructs such as changes, data, operations, impact partitions, etc. The invention can support user-specified names and identifiers for key constructs. Likewise, the tuples described herein are models of information that the invention inputs, generates, remembers, applies, and reuses. The data models and structures used to build an implementation of the invention may not necessarily map exactly to these tuples. For instance, the underlying database for archiving information may or may not be organized with records that replicate the tuple models. The invention can support add-on features, alternative means of interaction with the user, as well as enhancements to the analytical, context, and decision-making information used to design componentized software systems. The invention is an innovation for systematic, information-rich, and machine-assisted design of baseline or reference architectures for evolvable, componentized software systems.

Formal Specifications Referenced in Detailed Description

SPEC. 1:
Let RL be a set of strings that represents the statements, sub-statements, or other recognizable constructs in the written language chosen for expressing requirements.

SPEC. 2:
RS={req∈RL|ReqForAnalysis(req)=true}, where ReqForAnalysis is a function that returns true if req is a requirement statement or false otherwise.

SPEC. 3:
REQ_IDS={reqID∈RL|(∃ req∈RS s.t. (reqID=ReqID(req))∧(∀ req∈RS: ∃ reqID∈RL s.t. reqID=ReqID(req))∧(∀ $req_i$, $req_{k≠i}$∈RS: ReqID($req_i$)≠ReqID($req_k$))}, where ReqID is a function that returns the identifier of the requirement statement req.

SPEC. 4:
Let NRL be the set of strings that represent nouns or noun phrases ("nouns") in RL. For example, each noun of NRL may represent one or more persons, places, entities, events, substances, qualities, states, or other "data" concept.

SPEC. 5:
RSNOUNS={noun∈NRL|∃ req∈RS s.t. NSubstring(req, noun)=true}, where NSubstring is a function that returns true if noun is a substring of req or false otherwise.

SPEC. 6:
Let VRL be the set of strings that represent verbs or verb phrases ("verbs") in RL. For example, each verb of VRL may represent an action, condition, experience, or other "operational" concept.

SPEC. 7:
RSVERBS={verb∈VRL|∃ req∈RS s.t. VSubstring(req, verb)=true}, where VSubstring is a function that returns true if verb is a substring of req or false otherwise.

SPEC. 8:
RSDERIVED_VALUES={true, false}

SPEC. 9:
PCDELETED_VALUES={true, false}

SPEC. 10:

| REQ_ID-RSNOUN TUPLE ATTRIBUTES | | | | |
|---|---|---|---|---|
| REQ_ID | RSNOUN | DERIVED | PCDELETED | PCNOUN |

+ other attributes

REQ_ID-RSNOUN TUPLES = {(REQ_ID: $v_{i1}$), (RSNOUN: $v_{i2}$), (DERIVED: $v_{i3}$), (PCDELETED: $v_{i4}$), (PCNOUN: $v_{i5}$), . . . , ($Attribute_j$: $v_{ij}$), . . . , ($Attribute_n$: $v_{in}$)}, where:

1 ≤ i ≤ m is the number of tuples in the set,

5 ≤ j ≤ n is the number of attributes that define the relation, $v_{i1}$ ∈ REQ_IDS, $v_{i2}$ ∈ RSNOUNS, $v_{i3}$ ∈ RSDERIVED_VALUES, $v_{i4}$ ∈ PCDELETED_VALUES, $v_{i5}$ ∈ NRL, $v_{ij}$ ∈ $Domain_j$, $v_{in}$ ∈ $Domain_n$, and ∀ $reqIDrsnTuple_i$, $reqIDrsnTuple_{k≠i}$ ∈ REQ_ID-RSNOUN TUPLES: ($reqIDrsnTuple_i$.REQ_ID ≠ $reqIDrsnTuple_k$.REQ_ID) ∨ ($reqIDrsnTuple_i$.RSNOUN ≠ $reqIDrsnTuple_k$.RSNOUN). [REQ_ID and RSNOUN are key attributes that jointly ensure uniqueness across the tuples with respect to the pair of values in these fields.]

SPEC. 11:

| REQ_ID-RSVERB TUPLE ATTRIBUTES | | | | |
|---|---|---|---|---|
| REQ_ID | RSVERB | DERIVED | PCDELETED | PCVERB |

+ other attributes

REQ_ID-RSVERB TUPLES = {(REQ_ID: $v_{i1}$), (RSVERB: $v_{i2}$), (DERIVED: $v_{i3}$), (PCDELETED: $v_{i4}$),
(PCVERB: $v_{i5}$), . . . , (Attribute$_j$: $v_{ij}$), . . . , (Attribute$_n$: $v_{in}$)}, where:
$1 \leq i \leq m$ is the number of tuples in the set,
$5 \leq j \leq n$ is the number of attributes that define the relation,
$v_{i1} \in$ REQ_IDS,
$v_{i2} \in$ RSVERBS,
$v_{i3} \in$ RSDERIVED_VALUES,
$v_{i4} \in$ PCDELETED_VALUES,
$v_{i5} \in$ VRL,
$v_{ij} \in$ Domain$_j$,
$v_{in} \in$ Domain$_n$, and
$\forall$ reqIDrsvTuple$_i$, reqIDrsvTuple$_{k \neq i} \in$ REQ_ID-RSVERB TUPLES: (reqIDrsvTuple$_i$.REQ_ID $\neq$
reqIDrsvTuple$_k$.REQ_ID) $\vee$ (reqIDrsvTuple$_i$.RSVERB $\neq$ reqIDrsvTuple$_k$.RSVERB). [REQ_ID
and RSVERB are key attributes that jointly ensure uniqueness across the tuples with respect
to the pair of values in these fields.]

SPEC. 12:
   DATA_DELETED_VALUES={true, false}
SPEC. 13:
   OP_DELETED_VALUES={true, false}
SPEC. 14:

| PRIMARY CANDIDATE NOUN TUPLE ATTRIBUTES | |
|---|---|
| NOUN | DATA_DELETED |

+ other attributes

PRIMARY CANDIDATE NOUN TUPLES = {(NOUN: $v_{i1}$), (DATA_DELETED: $v_{i2}$), . . . ,
(Attribute$_j$: $v_{ij}$), . . . , (Attribute$_n$: $v_{in}$)}, where:
$1 \leq i \leq m$ is the number of tuples in the set,
$2 \leq j \leq n$ is the number of attributes that define the relation,
$v_{i1} \in$ NRL, ($\exists$ reqIDrsnTuple $\in$ REQ_ID-RSNOUN TUPLES | (reqIDrsnTuple.RSNOUN = $v_{i1}$) $\vee$
(reqIDrsnTuple.PCNOUN = $v_{i1}$)),
$v_{i2} \in$ DATA_DELETED_VALUES,
$v_{ij} \in$ Domain$_j$,
$v_{in} \in$ Domain$_n$, and
$\forall$ pcNounTuple$_i$, pcNounTuple$_{k \neq i} \in$ PRIMARY CANDIDATE NOUN TUPLES:
pcNounTuple$_i$.NOUN $\neq$ pcNounTuple$_k$.NOUN. [NOUN is a key attribute that ensures
uniqueness across the tuples with respect to the values in this field.]

SPEC. 15:

| PRIMARY CANDIDATE VERB TUPLE ATTRIBUTES | |
|---|---|
| VERB | OP_DELETED |

+ other attributes

PRIMARY CANDIDATE VERB TUPLES = {(VERB: $v_{i1}$), (OP_DELETED: $v_{i2}$), . . . ,
(Attribute$_j$: $v_{ij}$), . . . , (Attribute$_n$: $v_{in}$)}, where:
$1 \leq i \leq m$ is the number of tuples in the set,
$2 \leq j \leq n$ is the number of attributes that define the relation,
$v_{i1} \in$ VRL, ($\exists$ reqIDrsvTuple $\in$ REQ_ID-RSVERB TUPLES s.t. (reqIDrsvTuple.RSVERB = $v_{i1}$) $\vee$
(reqIDrsvTuple.PCVERB = $v_{i1}$)),
$v_{i2} \in$ OP_DELETED_VALUES,
$v_{ij} \in$ Domain$_j$,
$v_{in} \in$ Domain$_n$, and
$\forall$ pcVerbTuple$_i$, pcVerbTuple$_{k \neq i} \in$ PRIMARY CANDIDATE VERB TUPLES: pcVerbTuple$_i$.
VERB $\neq$ pcVerbTuple$_k$.VERB. [VERB is a key attribute that ensures uniqueness across the tuples
with respect to the values in this field.]

SPEC. 16:
STANDARDTERM={true, false}

SPEC. 17:

| NOUN SYNONYM TUPLE ATTRIBUTES | | |
|---|---|---|
| NOUN | NSYNONYM | STANDARD |

+ other attributes

NOUN SYNONYM TUPLES = {(NOUN: $v_{i1}$), (NSYNONYM: $v_{i2}$), (STANDARD: $v_{i3}$), ...,
(Attribute$_j$: $v_{ij}$), ..., (Attribute$_n$: $v_{in}$)}, where:
$1 \leq i \leq m$ is the number of tuples in the set,
$3 \leq j \leq n$ is the number of attributes that define the relation,
$v_{i1} \in$ NRL,
$v_{i2} \in$ NRL $\wedge$ (NSynonym($v_{i1}$, $v_{i2}$) = true), where NSynonym is a function that returns true if
(($v_{i2} \neq v_{i1}$) $\wedge$ ($v_{i1}$, $v_{i2} \in$ NRL) $\wedge$ ($v_{i1}$ and $v_{i2}$ are synonyms)), or false otherwise,
$v_{i3} \in$ STANDARDTERM,
$v_{ij} \in$ Domain$_j$,
$v_{in} \in$ Domain$_n$, and
$\forall$ nSynTuple$_i$, nSynTuple$_{k \neq i}$ $\in$ NOUN SYNONYM TUPLES: ((nSynTuple$_i$.NOUN $\neq$
nSynTuple$_k$.NOUN) $\vee$ (nSynTuple$_i$.NSYNONYM $\neq$ nSynTuple$_k$.NSYNONYM)). [NOUN and
NSYNONYM are key attributes that jointly ensure uniqueness across the tuples with respect
to the pair of values in these fields.]

SPEC. 18:

| VERB SYNONYM TUPLE ATTRIBUTES | | |
|---|---|---|
| VERB | VSYNONYM | STANDARD |

+ other attributes

VERB SYNONYM TUPLES = {(VERB: $v_{i1}$), (VSYNONYM: $v_{i2}$), (STANDARD: $v_{i3}$), ...,
(Attribute$_j$: $v_{ij}$), ..., (Attribute$_n$: $v_{in}$)}, where:
$1 \leq i \leq m$ is the number of tuples in the set,
$3 \leq j \leq n$ is the number of attributes that define the relation,
$v_{i1} \in$ VRL,
$v_{i2} \in$ VRL $\wedge$ ($v_{i2} \neq v_{i1}$) $\wedge$ (VSynonym($vi_1$, $v_{i2}$) = true), where VSynonym is a function that
returns true if (($v_{i2} \neq v_{i1}$) $\wedge$ ($v_{i1}$, $v_{i2} \in$ VRL) $\wedge$ ($v_{i1}$ and $v_{i2}$ are synonyms)), or false otherwise,
$v_{i3} \in$ STANDARDTERM,
$v_{ij} \in$ Domain$_j$,
$v_{in} \in$ Domain$_n$, and
$\forall$ vSynTuple$_i$, vSynTuple$_{k \neq i}$ $\in$ VERB SYNONYM TUPLES: ((vSynTuple$_i$.VERB $\neq$
vSynTuple$_k$.VERB) $\vee$ (vSynTuple$_i$.VSYNONYM $\neq$ vSynTuple$_k$.VSYNONYM)). [VERB and
VSYNONYM are key attributes that jointly ensure uniqueness across the tuples with respect
to the pair of values in these fields.]

SPEC. 19:

For Noun Synonyms:
Let nTerm∈NRL represent the name selected by the users for a noun concept expressed by synonymous nouns across two or more PRIMARY CANDIDATE NOUN tuples.

Let nSynonyms(nTerm)={pcNoun∈NRL|∃ pcnTuple∈PRIMARY CANDIDATE NOUN TUPLES s.t. (pcnTuple.NOUN=pcNoun)∧ (pcnTuple.DATA_DELETED=false)∧((NSynonym (nTerm, pcNoun)=true)∨(nTerm=pcNoun)), where NSynonym is the function as defined in Spec. 17.}

Pre-condition:
$\forall$ pcnTuple∈PRIMARY CANDIDATE NOUN TUPLES s.t. pcnTuple.NOUN∈nSynonyms (nTerm): (∃ reqIDrsnTuple: REQ_ID-RSNOUN TUPLES s.t. reqIDrsnTuple.RSNOUN=pcnTuple.NOUN).

Post Conditions:
($\forall$ reqIDrsnTuple∈REQ_ID-RSNOUN TUPLES s.t. reqIDrsnTuple.RSNOUN∈nSynonyms(nTerm): (reqIDrsnTuple.RSNOUN=nTerm)∨ (reqIDrsnTuple.PCNOUN=nTerm))∨
(∃ pcnTuple∈PRIMARY CANDIDATE NOUN TUPLES s.t. pcnTuple.NOUN=nTerm)∧

($\forall$ pcnTuple∈PRIMARY CANDIDATE NOUN TUPLES: (pcnTuple.NOUN≠nTerm)→(pcnTuple.NOUN∉nSynonyms (nTerms))∧

($\forall$ pcnTuple$_i$, pcnTuple$_{j \neq i}$∈PRIMARY CANDIDATE NOUN TUPLES: (pcnTuple$_i$.NOUN≠pcnTuple$_{j \neq i}$.NOUN)).

For Verb Synonyms:
Let vTerm∈VRL represent the name selected by the users for the verb concept expressed by synonymous verbs across two or more PRIMARY CANDIDATE VERB tuples.

Let vSynonyms(vTerm) ={pcVerb∈VRL|∃pcvTuple∈PRIMARY CANDIDATE VERB TUPLES s.t. (pcvTuple.VERB=pcVerb)∧ (pcvTuple.OP_DELETED=false)∧((VSynonym (vTerm, pcVerb)=true)∨(vTerm=pcVerb)), where VSynonym is a function as defined in Spec. 18.}

Pre-condition:
$\forall$ pcvTuple∈PRIMARY CANDIDATE VERB TUPLES s.t. pcvTuple.VERB∈vSynonyms(vTerm): ∃ reqIDrsvTuple∈REQ_ID-RSVERB TUPLES s.t. reqIDrsvTuple.RSVERB=pcvTuple.VERB.

Post Conditions:
  ($\forall$ reqIDrsvTuple$\in$REQ_ID-RSVERB TUPLES s.t. reqIDrsvTuple.RSVERB$\in$vSynonyms(vTerm): (reqIDrsvTuple.RSVERB=vTerm)$\land$ (reqIDrsvTuple.PCVERB=vTerm))$\land$
  ($\exists$ pcvTuple$\in$PRIMARY CANDIDATE VERB TUPLES s.t. pcvTuple.VERB=vTerm)$\land$
  ($\forall$ pcvTuple$\in$PRIMARY CANDIDATE VERB TUPLES: (pcvTuple.VERB$\neq$vTerm)$\rightarrow$(pcvTuple.VERB$\notin$vSynonyms (vTerm))$\land$
  ($\forall$ pcvTuple$_i$, pcvTuple$_{j \neq i}$$\in$PRIMARY CANDIDATE VERB TUPLES: (pcvTuple$_i$.VERB$\neq$pcvTuple$_{j \neq i}$.VERB)).

SPEC. 20:
  Let nTerm$\in$NRL represent the name selected by the users for a noun concept expressed by synonymous nouns across two or more PRIMARY CANDIDATE NOUN tuples.
  For Noun Synonyms:
    Pre-condition:
      $\forall$ pcnTuple$\in$PRIMARY CANDIDATE NOUN TUPLES s.t. pcnTuple.NOUN$\in$nSynonyms (nTerm): $\exists$ reqIDrsnTuple$\in$REQ_ID-RSNOUN TUPLES s.t. reqIDrsnTuple.RSNOUN=pcnTuple.NOUN, where nSynonyms is a function as defined in Spec. 19.
    Post Conditions:
      ($\forall$ reqIDrsnTuple$\in$REQ_ID-RSNOUN TUPLES s.t. reqIDrsnTuple.RSNOUN$\in$nSynonyms (nTerm): reqIDrsnTuple.PCDELETED=true)$\land$
      ($\forall$ pcnTuple$\in$PRIMARY CANDIDATE NOUN TUPLES: pcnTuple.NOUN$\notin$nSynonyms).
  For Verb Synonyms:
    Let vTerm$\in$VRL represent the name selected by the users for the verb concept expressed by synonymous verbs across two or more PRIMARY CANDIDATE VERB tuples.
    Pre-condition:
      $\forall$ pcvTuple$\in$PRIMARY CANDIDATE VERB TUPLES s.t. pcvTuple.VERB$\in$vSynonyms: $\exists$ reqIDrsvTuple$\in$REQ_ID-RSVERB TUPLES s.t. reqIDrsvTuple.RSVERB=pcvTuple.VERB, where vSynonyms is a function as defined in Spec. 19.
    Post Conditions:
      ($\forall$ reqIDrsvTuple$\in$REQ_ID-RSVERB TUPLES s.t. reqIDrsvTuple.RSVERB$\in$vSynonyms: reqIDrsvTuple.PCDELETED=true)$\land$
      ($\exists$ pcvTuple$\in$PRIMARY CANDIDATE VERB TUPLES: pcvTupleVERB$\notin$vSynonyms).

SPEC. 21:
  Let DL be a set of strings that represents the statements, sub-statements, or other recognizable terms in the written language chosen for expressing the design of the target application or product.

SPEC. 22:
  DATA_IDS={dataID$\in$DL|$\exists$ daTuple$\in$DATA TUPLES s.t. daTuple.DATA_ID=dataID}, where each member of DATA_IDS is the identifier of a DATA tuple.

SPEC. 23:
  OP_IDS={opID$\in$DL|$\exists$ opTuple$\in$OPERATION TUPLES s.t. opTuple.OP_ID=opID}, where each member of OP_IDS is the identifier of an OPERATION tuple.

SPEC. 24:
  USES={use$\in$(RL$\cup$DL)|use describes the purpose of a required datum or operation.}
  FUNCTIONS={function$\in$(RL$\cup$DL)|function is a pseudocode representation of the primary actions and flow of control for a required operation.}

SPEC. 25:
  KEEP_FLAG_VALUES={" ", "*", "ONGOING", "REF", "REP", "REC", "TBD", ... , keepStatus, ... , keepStatus}, where KEEP_FLAG_VALUES$\subset$DL, and 1$\leq$i$\leq$n, the number of strings in the set.

SPEC. 26:
  PARENT_RELATIONSHIP_VALUES={" ", "*", "G-S", "W-P", ... , parentRel$_i$, ... , parentRel$_n$}, where PARENT_RELATIONSHIP_VALUES$\subset$DL, and 1$\leq$i$\leq$n, the number of strings in the set.

SPEC. 27:

| DATA TUPLE ATTRIBUTES | | | | |
| --- | --- | --- | --- | --- |
| DATA_ID | NOUN | USE | KEEP_FLAG | PARENT_RELATIONSHIP |

+ other attributes

DATA TUPLES = {(DATA_ID: $v_{i1}$), (NOUN: $v_{i2}$), USE: $v_{i3}$), KEEP_FLAG: $v_{i4}$), (PARENT_RELATIONSHIP: $v_{i5}$), ... , (Attribute$_j$: $v_{ij}$), ... , (Attribute$_n$: $v_{in}$)}, where:

1 $\leq$ i $\leq$ m is the number of tuples in the set,

5 $\leq$ j $\leq$ n is the number of attributes that define the relation, $v_{i1}$ $\in$ DATA_IDS, $v_{i2}$ $\in$ NOUNS, $v_{i3}$ $\in$ USES, $v_{i4}$ $\in$ KEEP_FLAG_VALUES, $v_{i5}$ $\in$ PARENT_RELATIONSHIP_VALUES, $v_{ij}$ $\in$ Domain$_j$, $v_{in}$ $\in$ Domain$_n$, and $\forall$ daTuple$_i$, daTuple$_{k \neq i}$ $\in$ DATA TUPLES: (daTuple$_i$.DATA_ID $\neq$ daTuple$_k$.DATA_ID) $\land$ (daTuple$_i$.NOUN $\neq$ daTuple$_k$.NOUN). [DATA_ID and NOUN are key attributes that ensure uniqueness across the tuples with respect to the pair of values in these fields.]

SPEC. 28:

| OPERATION TUPLE ATTRIBUTES | | | | | |
|---|---|---|---|---|---|
| OP_ID | VERB | USE | FUNCTION | KEEP_FLAG | PARENT_RELATIONSHIP |

+ other attributes

OPERATION TUPLES = {(OP_ID: $v_{i1}$), (VERB: $v_{i2}$), USE: $v_{i3}$), FUNCTION: $v_{i4}$, KEEP_FLAG: $v_{i5}$), (PARENT_RELATIONSHIP: $v_{i6}$), . . . , (Attribute$_j$: $v_{ij}$), . . . , (Attribute$_n$: $v_{in}$)}, where:
1 ≤ i ≤ m is the number of tuples in the set,
6 ≤ j ≤ n is the number of attributes that define the relation,
$v_{i1}$ ∈ OP_IDS,
$v_{i2}$ ∈ VERBS,
$v_{i3}$ ∈ USES,
$v_{i4}$ ∈ FUNCTIONS,
$v_{i5}$ ∈ KEEP_FLAG_VALUES,
$v_{i6}$ ∈ PARENT_RELATIONSHIP_VALUES,
$v_{ij}$ ∈ Domain$_j$,
$v_{in}$ ∈ Domain$_n$, and
∀ opTuple$_i$, opTuple$_{k \neq i}$ ∈ OPERATION TUPLES: (opTuple$_i$.OP_ID ≠ opTuple$_k$.OP_ID) ∧ (opTuple$_i$.VERB ≠ opTuple$_k$.VERB). [OP_ID and VERB are key attributes that ensure uniqueness across the tuples with respect the values in these fields.]

SPEC. 29:

| DATA-OPERATION TUPLE ATTRIBUTES | |
|---|---|
| DATA_ID | OP_ID |

+ other attributes

DATA-OPERATION TUPLES = {(DATA_ID: $v_{i1}$), (OP_ID: $v_{i2}$), . . . , (Attribute$_j$: $v_{ij}$), . . . , (Attribute$_n$: $v_{in}$)}, where:
1 ≤ i ≤ m is the number of tuples in the set,
2 ≤ j ≤ n is the number of attributes that define the relation,
$v_{i1}$ ∈ DATA_IDS,
$v_{i2}$ ∈ OP_IDS,
OperateOn($v_{i1}$, $v_{i2}$) = true, where OperateOn is a function that returns true if the operation associated with $v_{i2}$ acts solely on the datum associated with $v_{i1}$,
$v_{ij}$ ∈ Domain$_j$,
$v_{in}$ ∈ Domain$_n$, and
∀ daOpTuple$_i$, daOpTuple$_{k \neq i}$ ∈ DATA-OPERATION TUPLES: daOpTuple$_i$.OP_ID ≠ daOpTuple$_k$.OP_ID. [OP_ID is a key attribute that ensures uniqueness across the tuples with respect to the values in this field.]

SPEC. 30:
DATA_OR_OPERATION_IDS=DATA_ID∪OP_ID

SPEC. 31:
REUSE_SCOPE_VALUES={" ", "*", "WITHIN", "ACROSS", . . . , reuseScope$_i$, . . . , reuseScope$_n$}, where REUSE_SCOPE_VALUES ⊂ DL, and 1≤i≤n, the number of strings in the set.

LIBRARY_REFERENCES={reference∈DL|reference provides a link to the database that contains a design specification for a datum or operation that has been designated as a candidate for reuse}.

SPEC. 32:

| REUSE CANDIDATE TUPLE ATTRIBUTES | | | |
|---|---|---|---|
| DA_OR_OP_ID | NAME | REUSE_SCOPE | LIBRARY_REFERENCE |

+ other attributes

REUSE CANDIDATE TUPLES = {(DA_OR_OP_ID: $v_{i1}$), (REUSE_SCOPE: $v_{i2}$), . . . , (Attribute$_j$: $v_{ij}$), . . . , (Attribute$_n$: $v_{in}$)}, where:
1 ≤ i ≤ m is the number of tuples in the set.
4 ≤ j ≤ n is the number of attributes that define the relation.
$v_{i1}$ ∈ DATA_OR_OPERATION_IDS,
$v_{i2}$ ∈ NOUNS ∪ VERBS,
$v_{i3}$ ∈ REUSE_SCOPE_VALUES,
$v_{i4}$ ∈ LIBRARY_REFERENCES,
$v_{ij}$ ∈ Domain$_j$,
$v_{in}$ ∈ Domain$_n$,
∀ rcTuple ∈ REUSE CANDIDATE TUPLES: (∃ daTuple ∈ DATA TUPLES s.t. daTuple.DATA_ID = rcTuple.DA_OR_OP_ID) ∨ (∃ opTuple ∈ OPERATION TUPLES s.t. opTuple.OP_ID = rcTuple.DA_OR_OP_ID), and
∀ rcTuple$_i$, rcTuple$_{k \neq i}$ ∈ REUSE CANDIDATE TUPLES: rcTuple$_i$.DA_OR_OP_ID ≠ rcTuple$_k$.DA_OR_OP_ID. [DA_OR_OP_ID is a key attribute that ensures uniqueness across the tuples with respect to the values in this field.]

SPEC. 33:

| DATA PARENT-CHILD TUPLE ATTRIBUTES | |
|---|---|
| PARENT_DATA_ID | CHILD_DATA_ID |

+ other attributes

DATA PARENT-CHILD TUPLES = {(PARENT_DATA_ID: $v_{i1}$), (CHILD_DATA_ID: $v_{i2}$), . . . , (Attribute$_j$: $v_{ij}$), . . . , (Attribute$_n$: $v_{in}$)}, where:
1 ≤ i ≤ m is the number of tuples in the set,
2 ≤ j ≤ n is the number of attributes that define the relation,
$v_{i1}$ ∈ DATA_IDS,
$v_{i2}$ ∈ DATA_IDS,
$v_{ij}$ ∈ Domain$_j$,
$v_{in}$ ∈ Domain$_n$,
$v_{i2}$ ≠ $v_{i1}$ ∧ ChildData($v_{i2}$, $v_{i1}$) = true, where ChildData is a function that returns true if (∃ daTuple$_i$, daTuple$_j$ ∈ DATA TUPLES s.t. daTuple$_i$.DATA_ID = $v_{i1}$, daTuple$_j$.DATA_ID = $v_{i2}$, and daTuple$_j$ is a child of daTuple$_i$), or false otherwise.
∀ daParChildTuple$_i$, daParChildTuple$_{k≠i}$ ∈ DATA_PARENT-CHILD TUPLES:
((daParTuple$_i$.PARENT_DATA_ID ≠ daParTuple$_k$.PARENT_DATA_ID) ∨
(daParChildTuple$_i$.CHILD_DATA_ID ≠ daParChildTuple$_k$.CHILD_DATA_ID)
[PARENT_DATA_ID and CHILD_DATA_ID are key attributes that jointly ensure uniqueness across the tuples with respect to the pair of values in these fields.]) ∧
((DataAncestor(daParChildTuple$_i$, daParChildTuple$_k$) = true) →
((DataAncestor(daParChildTuple$_k$, daParChildTuple$_i$) = false), where DataAncestor is a function that returns true if (∃ daTuple$_l$, daTuple$_m$ ∈ DATA TUPLES s.t. daTuple$_l$.DATA_ID = daParChildTuple$_i$.PARENT_DATA_ID, daTuple$_m$.DATA_ID = daParChildTuple$_k$.CHILD_DATA_ID, and daTuple$_l$ is an ancestor of daTuple$_k$), or false otherwise.))

SPEC. 34:

| OPERATION PARENT-CHILD TUPLE ATTRIBUTES | |
|---|---|
| PARENT_OP_ID | CHILD_OP_ID |

+ other attributes

OPERATION PARENT-CHILD TUPLES = {(PARENT_OP_ID: $v_{i1}$), (CHILD_OP_ID: $v_{i2}$), . . . , (Attribute$_j$: $v_{ij}$), . . . , (Attribute$_n$: $v_{in}$)}, where:
1 ≤ i ≤ m is the number of tuples in the set.
2 ≤ j ≤ n is the number of attributes that define the relation.
$v_{i1}$ ∈ OP_IDS,
$v_{i2}$ ∈ OP_IDS,
$v_{ij}$ ∈ Domain$_j$,
$v_{in}$ ∈ Domain$_n$,
$v_{i2}$ ≠ $v_{i1}$ ∧ ChildOp ($v_{i2}$, $v_{i1}$) = true, where ChildOp is a function that returns true if (∃ opTuple$_i$, opTuple$_j$ ∈ OPERATION TUPLES s.t. opTuple$_i$.OP_ID = $v_{i1}$, opTuple.OP_ID = $v_{i2}$, and opTuple$_j$ is a child of opTuple$_i$), or false otherwise.
∀ OpParChildTuple$_i$, OpParChildTuple$_{k≠i}$ ∈ OPERATION_PARENT-CHILD TUPLES:
((OpParChildTuple$_i$.PARENT_OP_ID ≠ OpParChildTuple$_j$.PARENT_OP_ID) ∨
(OpParChildTuple$_i$.CHILD_OP_ID ≠ OpParChildTuple$_k$.CHILD_OP_ID) [PARENT_OP_ID and CHILD_OP_ID are key attributes that jointly ensure uniqueness across the tuples with respect to the pair of values in these fields.]) ∧
((OpAncestor(OpParChildTuple$_i$, OpParChildTuple$_k$) = true) → (OpAncestor (OpParChildTuple$_k$, OpParChildTuple$_i$) = false), where OpAncestor is a function that returns true if (∃ opTuple$_l$, opTuple$_m$ ∈ OPERATION TUPLES s.t. opTuple$_l$.OP_ID = OpParChildTuple$_i$.PARENT_OP_ID, opTuple$_m$.OP_ID = OpParChildTuple$_k$.CHILD_OP_ID, and opTuple$_i$ is an ancestor of opTuple$_k$), or returns false otherwise.))

SPEC. 35:

| DATA_ID-REQ_ID TUPLE ATTRIBUTES | |
|---|---|
| DATA_ID | REQ_ID |

+ other attributes

DATA_ID-REQ_ID TUPLES = {(DATA_ID: $v_{i1}$), (REQ_ID: $v_{i2}$), . . . , (Attribute$_j$: $v_{ij}$), . . . , (Attribute$_n$: $v_{in}$)}, where:
1 ≤ i ≤ m is the number of tuples in the set,
2 ≤ j ≤ n is the number of attributes that define the relation,
$v_{i1}$ ∈ DATA _IDS,
$v_{i2}$ ∈ REQ_IDS,
$v_{ij}$ ∈ Domain$_j$,
$v_{in}$ ∈ Domain$_n$, and

DATA_ID-REQ_ID TUPLE ATTRIBUTES $\forall$ daIDreqIDTuple$_i$, daIDreqIDTuple$_{k \neq i}$ $\in$ DATA_ID-REQ_ID TUPLES: (daIDreqIDTuple$_i$.DATA_ID $\neq$ daIDreqIDTuple$_k$.DATA_ID) $\lor$ (daIDreqIDTuple$_i$.REQ_ID $\neq$ daIDreqIDTuple$_k$.REQ_ID). [DATA_ID and REQ_ID are key attributes that jointly ensure uniqueness across the tuples with respect to the pair of values in these fields.]

SPEC. 36:

OP_ID-REQ_ID TUPLE ATTRIBUTES

| OP_ID | REQ_ID |
|-------|--------|

+ other attributes

OP_ID-REQ_ID TUPLES = [(OP_ID: $v_{i1}$), (REQ_ID: $v_{i2}$), ..., (Attribute$_j$: $v_{ij}$), ..., (Attribute$_n$: $v_{in}$)],
where:
$1 \leq i \leq m$ is the number of tuples in the set,
$2 \leq j \leq n$ is the number of attributes that define the relation,
$v_{i1} \in$ OP_IDS,
$v_{i2} \in$ REQ_IDS,
$v_{ij} \in$ Domain$_j$,
$v_{in} \in$ Domain$_n$, and
$\forall$ opIDreqIDTuple$_i$, opIDreqIDTuple$_{k \neq i}$ $\in$ OP_ID-REQ_ID TUPLES: (opIDreqIDTuple$_i$.OP_ID $\neq$ opIDreqIDTuple$_k$.OP_ID) $\lor$ (opIDreqIDTuple$_i$.REQ_ID $\neq$ opIDreqIDTuple$_k$.REQ_ID). [OP_ID and REQ_ID are key attributes that jointly ensure uniqueness across the tuples with respect to the pair of values in these fields.]

SPEC. 37:
CHANGE_IDS={chID$\in$DL|$\exists$ chDeTuple$\in$CHANGE DETAILS TUPLES s.t. chDeTuple.CHANGE_ID=chID}, where each member of CHANGE_IDS is the identifier of a CHANGE DETAILS tuple.

SPEC. 38:
DESCRIPTIONS={des$\in$(RL$\cup$DL)|des is a description of a change.}

SPEC. 39:
LIKELIHOOD_VALUES={" ", "Expected", "Likely", "Feasible", "Not Expected", ..., likelihood$_i$, ..., likelihood$_n$}, where likelihood$_i \in$DL, and $1 \leq i \leq n$, the number of strings in the set.

SPEC. 40:

CHANGE DETAILS TUPLE ATTRIBUTES

| CHANGE_ID | DESCRIPTION | LIKELIHOOD |
|-----------|-------------|------------|

+ other attributes

CHANGE DETAILS TUPLES = {(CHANGE_ID: $v_{i1}$), (DESCRIPTION: $v_{i2}$), (LIKELIHOOD: $v_{i3}$), ..., (Attribute$_j$, $v_{ij}$), ..., (Attribute$_n$: $v_{in}$)}, where:
$1 \leq i \leq m$ is the number of tuples in the set,
$3 \leq j \leq n$ is the number of attributes that define the relation,
$v_{i1} \in$ CHANGE_IDS,
$v_{i2} \in$ DESCRIPTION,
$v_{i3} \in$ LIKELIHOOD_VALUES,
$v_{ij} \in$ Domain$_j$,
$v_{in} \in$ Domain$_n$, and
$\forall$ chTuple$_i$, chTuple$_{k \neq i}$ $\in$ CHANGE DETAILS TUPLES: chTuple$_i$.CHANGE_ID $\neq$ chTuple$_k$.CHANGE_ID. [CHANGE_ID is a key attribute that ensures uniqueness across the tuples with respect to the values in this field.]

SPEC. 41:
KEYWORDS={keyword∈(RL∪DL)|keyword is a term used to search for changes.}

SPEC. 42:

| CHANGE-KEYWORD TUPLE ATTRIBUTES | |
|---|---|
| CHANGE_ID | KEYWORD |

+ other attributes

CHANGE-KEYWORD TUPLES = [(CHANGE_ID: $v_{i1}$), (KEYWORD: $v_{i2}$), ..., (Attribute$_j$: $v_{ij}$), ..., (Attribute$_n$: $v_{in}$)], where:
1 ≤ i ≤ m is the number of tuples in the set,
2 ≤ j ≤ n is the number of attributes that define the relation,
$v_{i1}$ ∈ CHANGE_IDS,
$v_{i2}$ ∈ KEYWORDS,
$v_{ij}$ ∈ Domain$j$,
$v_{in}$ ∈ Domain$_n$, and
∀ chIDkeyTuple$_i$, chIDkeyTuple$_{k≠i}$ ∈ CHANGE-KEYWORD TUPLES:
(chIDkeyTuple$_i$.CHANGE_ID ≠ chIDkeyTuple$_k$.CHANGE_ID) ∨ (chIDkeyTuple$_i$.KEYWORD ≠ chIDkeyTuple$_k$.KEYWORD). [CHANGE_ID and KEYWORD are key attributes that jointly ensure uniqueness across the tuples with respect to the pair of values in these fields.]

SPEC. 43:
Let the change impact relation on data or operations be defined as CHANGE IMPACT RELATION={chDeTuple∈CHANGE DETAILS TUPLES, sEITuple∈(DATA TUPLES∪OPERATION TUPLES)|Impact(chDeTuple, sEITuple)=true}, where Impact is a function that returns true if the EFF change represented by chDeTuple would or did require users to review and potentially modify the solution element represented by sEITuple in order to implement the EFF change or false otherwise.

SPEC. 44:
CHANGE_RELATIONSHIP_VALUES={" ", "*", "ADD", "MODIFY", "DELETE", "UNCERTAIN", ..., chRelshp$_i$, ..., chRelshp$_n$}, where CHANGE_RELATIONSHIP_VALUES ⊂ DL, and 1≤i≤n, the number of strings in the set.

SPEC. 45:

| CHANGE IMPACT RELATIONSHIP TUPLE ATTRIBUTES | | |
|---|---|---|
| CHANGE_ID | DA_OR_OP_ID | CHANGE_RELATIONSHIP |

+ other attributes

CHANGE IMPACT RELATIONSHIP TUPLES = {(CHANGE ID: $v_{i1}$), (DA_OR_OP_ID: $v_{i2}$), (CHANGE RELATIONSHIP: $v_{i3}$), ..., (Attribute$_j$: $v_{ij}$), ..., (Attribute$_n$: $v_{in}$)], where:
1 ≤ i ≤ m is the number of tuples in the set,
3 ≤ j ≤ n is the number of attributes that define the relation,
$v_{i1}$ ∈ CHANGE_IDS,
($v_{i2}$ ∈ DATA_OR_OPERATION_IDS) ∧ ((∃daTuple ∈ DATA TUPLES s.t. (daTuple.DATA_ID = $v_{i2}$) ∧ (Impact(chDeTuple, daTuple) = true)) ∨ (∃opTuple ∈ OPERATION TUPLES s.t. (opTuple.OP_ID = $v_{i2}$) ∧ (Impact(chDeTuple, opTuple) = true))), where Impact is a function as defined in Spec. 43,
$v_{i3}$ ∈ CHANGE_RELATIONSHIP_VALUES,
$v_{ij}$ ∈ Domain$_j$,
$v_{in}$ ∈ Domain$_n$, and
∀ chIRelTuple$_i$, chIRelTuple$_{k≠i}$ ∈ CHANGE IMPACT RELATIONSHIP TUPLES:
(chIRelTuple$_k$.CHANGE_ID ≠ chIRelTuple$_i$.CHANGE_ID) ∨ (chIRelTuple$_k$.DA_OR_OP_ID ≠ chIRelTuple$_i$.DA_OR_OP_ID). [CHANGE_ID and DA_OR_OP_ID are key attributes that jointly ensure uniqueness across the tuples with respect to the pair of values in these fields.]

SPEC. 46:
ISSUES={issue∈(RL∪DL)|issue is a statement that describes an issue to be resolved.}

SPEC. 47:
DECISIONS={dec∈(RL∪DL)|dec is a statement about a decision that has been made.}

SPEC. 48:
  DECISION_STATUS_VALUES={"OPEN",
    "CLOSED", "DISMISSED", . . . , $stat_i$, . . . , $stat_n$},
    where DECISION_STATUS_VALUES ⊂ DL, and
    $1 \le i \le n$, the number of strings in the set.

SPEC. 49:

| CHANGE IMPACT DECISION TUPLE ATTRIBUTES | | | | |
|---|---|---|---|---|
| CHANGE_ID | DA_OR_OP_ID | ISSUE | DECISION | STATUS |

+ other attributes

CHANGE IMPACT DECISION TUPLES = {(CHANGE_ID: $v_{i1}$), (DA_OR_OP_ID: $v_{i2}$), (ISSUE: $v_{i3}$),
(DECISION: $v_{i4}$), (STATUS: $vi_5$), . . . , (Attribute$_j$: $v_{ij}$), . . . , (Attribute$_n$: $v_{in}$)}, where:
  $1 \le i \le m$ is the number of tuples in the set,
  $5 \le j \le n$ is the number of attributes that define the relation,
  $v_{i1} \in$ CHANGE_IDS,
  $v_{i2} \in$ DATA_OR_OPERATION_IDS,
  $v_{i3} \in$ ISSUES,
  $v_{i4} \in$ DECISIONS,
  $vi_5 \in$ DECISION_STATUS_VALUES,
  $v_{ij} \in$ Domain$_j$,
  $v_{in} \in$ Domain$_n$, and
  ∀ chIDecTuple$_i$, chIDecTuple$_{k \ne i}$ ∈ CHANGE IMPACT DECISION TUPLES:
  (chIDecTuple$_k$.CHANGE_ID ≠ chIDecTuple$_i$.CHANGE_ID) ∨ (chIDecTuple$_k$.DA_OR_OP_ID ≠
  chIDecTuple$_i$.DA_OR_OP_ID)). [CHANGE_ID and DA_OR_OP_ID are key attributes that jointly
  ensure uniqueness across the tuples with respect to the pair of values in these fields.]

SPEC. 50:
  USER_IDS={userID∈RL|ValidUser(userID)=True},
    where ValidUser is a function that returns true if userID
    is the identifier of an authorized user or false otherwise.

SPEC. 51:

| TARGET LIKELIHOOD TUPLE ATTRIBUTES | |
|---|---|
| LIKELIHOOD | USER_ID |

+ other attributes

TARGET LIKELIHOOD TUPLES = {(LIKELIHOOD: $v_{i1}$), (USER_ID: $v_{i2}$), . . . , (Attribute$_j$: $v_{ij}$), . . . ,
(Attribute$_n$: $v_{in}$)}, where:
  $1 \le i \le m$ is the number of tuples in the set,
  $2 \le j \le n$ is the number of attributes that define the relation,
  $v_{i1} \in$ LIKELIHOOD_VALUES,
  $v_{i2} \in$ USER_IDS,
  $v_{ij} \in$ Domain$_j$,
  $v_{in} \in$ Domain$_n$, and
  ∀ tarLikeTuple$_i$, tarLikeTuple$_{k \ne i}$ ∈ TARGET LIKELIHOOD TUPLES:
  (tarLikeTuple$_k$.LIKELIHOOD ≠ tarLikeTuple$_i$.LIKELIHOOD) ∨ (tarLikeTuple$_k$.USER_ID ≠
  tarLikeTuple$_i$.USER_ID). [LIKELIHOOD and USER_ID are key attributes that jointly ensure
  uniqueness across the tuples with respect to the pair of values in these fields.]

SPEC. 52:

| TARGET KEEP FLAG TUPLE ATTRIBUTES | |
|---|---|
| KEEP_FLAG | USER_ID |

+ other attributes

TARGET KEEP FLAG TUPLES = {(KEEP_FLAG: $v_{i1}$), (USER_ID: $v_{i2}$), . . . , (Attribute$_j$: $v_{ij}$), . . . ,
(Attribute$_n$: $v_{in}$)}, where:
  $1 \le i \le m$ is the number of tuples in the set,
  $2 \le j \le n$ is the number of attributes that define the relation,
  $v_{i1} \in$ KEEP_FLAG_VALUES,
  $v_{i2} \in$ USER_IDS,
  $v_{ij} \in$ Domain$_j$,
  $v_{in} \in$ Domain$_n$, and
  ∀ tarKeepFlTuple$_i$. tarKeepFlTuple$_{k \ne i}$ ∈ TARGET KEEP FLAG TUPLES:
  (tarKeepFlTuple$_k$.KEEP_FLAG ≠ tarKeepFlTuple$_i$.KEEP_FLAG) ∨ (tarKeepFlTuple$_k$.USER_ID
  ≠ tarKeepFlTuple$_i$.USER_ID). [KEEP_FLAG and USER_ID are key attributes that jointly
  ensure uniqueness across the tuples with respect to the pair of values in these fields.]

SPEC. 53:
  Let TARGET_CHANGES={tarChDeTuple∈CHANGE DETAILS TUPLES|∃ tarLikeTuple∈TARGET LIKELIHOOD TUPLES s.t. (tarChDeTuple.LIKELIHOOD=tarLikeTuple.LIKELIHOOD)∧(tarLikeTuple.USER_ID=User( ), where User is a function that returns the identifier of the current user if the user has a valid identifier as defined in Spec. 50, or null otherwise))∨(UserSelectedChange (tarChDeTuple)=true, where UserSelectedChange (tarChDeTuple) is a function that returns true if the current user has selected the change associated with tarChDeTuple and false otherwise.)}

SPEC. 54:
  Let TARGET_SOLUTION_ELEMENTS={tarSETuple∈ (DATA TUPLES∪OPERATION TUPLES)|(∃ tarKeepFlTuple∈TARGET KEEP FLAG tuples s.t. (tarKeepFTuple.KEEP_FLAG=tarSETuple.KEEP_FLAG)∧(tarKeepFTuple.USER_ID=User( ), where User is a function as defined in Spec. 53))∨(UserSelectedSE(tarSETuple)=true, where UserSelectedSE (tarSETuple) is a function that returns true if the current user has selected the datum or operation associated with tarSETuple and false otherwise.)}
  Let TARGET_IMPACTED_SOLUTION_ELEMENTS= {tarISETuple∈TARGET_SOLUTION_ELEMENTS| (∃ tarChTuple∈TARGET_CHANGES)∧(∃ chIRelTuple∈CHANGE IMPACT RELATIONSHIP tuples) s.t. ((tarChTuple.CHANGE_ID=chIRelTuple.CHANGE_ID)∧((tarISETuple∈DATA TUPLES→tarISETuple.DATA_ID=chIRelTuple.DA_OR_OP_ID)∨(tarISETuple∈OPERATION TUPLES→tarISETuple.OP_ID=chIRelTuple.DA_OR_OP_ID))}

SPEC. 55:
  Let TARGET_CHANGE_IMPACT_RELATIONSHIPS= {tarChIRelTuple∈CHANGE IMPACT RELATIONSHIP TUPLES| ((∃ tarChTuple∈TARGET_CHANGES)∧(∃ tarISETuple∈TARGET_IMPACTED_SOLUTION_ELEMENTS)) s.t. ((tarChTupe.CHANGE_ID=tarChIRelTupe.CHANGE_ID)∧((tarISETuple∈DATA TUPLES→tarISETuple.DATA_ID=tarChIRelTuple.DA_OR_OP_ID)∨(tarISETuple∈OPERATION TUPLES→tarISETuple.OP_ID=tarChIRelTuple.DA_OR_OP_ID)))}

SPEC. 56:
  IMP_PAR_IDS={iParID∈DL|∃ iParTuple∈IMPACT PARTITION TUPLES s.t. iParID=IParID(iParTuple)}, where IParID is a function that returns the identifier associated with iParTuple.

SPEC. 57:
  DATE={date∈DL|DateFormat(date)=True}, where DateFormat is a function that returns true if date represents a valid date or false otherwise.

SPEC. 58:
  TIME={time∈DL|TimeFormat(time)=True}, where TimeFormat is a function that returns true if time represents a valid time or false otherwise.

SPEC. 59:

| IMPACT PARTITION TUPLE ATTRIBUTES | | | |
|---|---|---|---|
| IMP_PAR_ID | DATE | TIME | USER_ID |

+ other attributes

IMPACT PARTITION TUPLES = {(IMP_PAR_ID: $v_{i1}$), (DATE: $v_{i2}$), (TIME: $v_{i3}$), (USER_ID: $v_{i4}$), . . . , (Attribute$_j$: $v_{ij}$), . . . , (Attribute$_n$: $v_{in}$)}, where:
  $1 \leq i \leq m$ is the number of tuples in the set,
  $4 \leq j \leq n$ is the number of attributes that define the relation,
  $v_{i1} \in$ IMP_PAR_IDS,
  $v_{i2} \in$ DATE,
  $v_{i3} \in$ TIME,
  $v_{i4} \in$ USER_IDS,
  $v_{ij} \in$ Domain$_j$,
  $v_{in} \in$ Domain$_n$, and
  ∀ iParTuple$_j$. iParTuple$_{k \neq i}$ ∈ IMPACT PARTITION TUPLES: iParTuple$_k$.IMP_PAR_ID ≠ iParTuple$_j$.IMP_PAR_ID. [IMP_PAR_ID is a key attribute that ensures uniqueness across the tuples with respect to the values in this field.]

SPEC. 60:

| IMPACT PARTITION-CHANGE TUPLE ATTRIBUTES | | |
|---|---|---|
| IMP_PAR_ID | CHANGE_ID | LIKELIHOOD |

+ other attributes

IMPACT PARTITION-CHANGE TUPLES = {(IMP_PAR_ID: $v_{i1}$), (CHANGE ID: $v_{i2}$), (LIKELIHOOD: $v_{i3}$), . . . , (Attribute$_j$: $v_{ij}$), . . . , (Attribute$_n$: $v_{in}$)}, where:
  $1 \leq i \leq m$ is the number of tuples in the set,
  $3 \leq j \leq n$ is the number of attributes that define the relation,
  $v_{i1} \in$ IMP_PAR_IDS,
  $v_{i2} \in$ CHANGE_IDS,
  $v_{i3} \in$ LIKELIHOOD,
  $v_{ij} \in$ Domain$_j$,
  $v_{in} \in$ Domain$_n$,
  ∃ tarChTuple ∈ TARGET_CHANGES s.t. (tarChTuple.CHANGE_ID = $v_{i2}$) ∧ (tarChTuple.LIKELIHOOD = $v_{i3}$), and
  ∀ iParChTuple$_j$. iParChTuple$_{k \neq i}$ ∈ IMPACT PARTITION-CHANGE TUPLES:

(iParChTuple$_k$.IMP_PAR_ID ≠ iParChTuple$_i$.IMP_PAR_ID) ∨ (iParChTuple$_k$.CHANGE_ID ≠ iParChTuple$_i$.CHANGE_ID). [IMP_PAR_ID and CHANGE_ID are key attributes that jointly ensure uniqueness across the tuples with respect to the pair of values in these fields.]

SPEC. 61:

| IMPACT PARTITION-DATA_OR_OP TUPLE ATTRIBUTES | | | |
|---|---|---|---|
| IMP_PAR_ID | DA_OR_OP_ID | KEEP_FLAG | IMPACTED |

+ other attributes

IMPACT PARTITION-DATA_OR_OP TUPLES = {(IMP_PAR_ID: $v_{i1}$), (DA_OR_OP_ID: $v_{i2}$), (KEEP_FLAG: $v_{i3}$), . . . , (Attribute$_j$: $v_{ij}$), . . . , (Attribute$_n$: $v_{in}$)}, where:
1 ≤ i ≤ m is the number of tuples in the set,
3 ≤ j ≤ n is the number of attributes that define the relation,
$v_{i1}$ ∈ IMP_PAR_IDS,
$v_{i2}$ ∈ DATA_OR_OPERATION_IDS,
$v_{i3}$ ∈ KEEP_FLAG_VALUES,
$v_{i4}$ ∈ {true, false},
$v_{ij}$ ∈ Domain$_j$,
$v_{in}$ ∈ Domain$_n$,
∃ tarSETuple ∈ TARGET_SOLUTION_ELEMENTS s.t. ((tarSETuple ∈ DATA TUPLES → tarSETuple.DATA_ID = $v_{i2}$) ∨ (tarSETuple ∈ OPERATION TUPLES → tarSETuple.OP_ID = $v_{i2}$)) ∧ (tarSETuple.KEEP_FLAG = $v_{i3}$), and
∀ iParDaOpTuple$_i$, iParDaOpTuple$_{k≠i}$ ∈ IMPACT PARTITION-DATA_OR_OP TUPLES:
(iParDaOpTuple$_k$.IMP_PAR_ID ≠ iParDaOpTuple$_i$.IMP_PAR_ID) ∨
(iParDaOpTuple$_k$.DA_OR_OP_ID ≠ iParDaOpTuple$_i$.DA_OR_OP_ID). [IMP_PAR_ID and DA_OR_OP_ID are key attributes that jointly ensure uniqueness across the tuples with respect to the pair of values in these fields.]

SPEC. 62:
IMP_SM_COMP_IDS={iSmCpID∈DL|∃ iSmCpTuple∈IMPACTED SMALL COMPONENT TUPLES s.t. ISmCpTuple.IMP_SM_COMP_ID=iSmCpID}, where each member of IMP_SM_COMP_IDS is the identifier of an IMPACTED SMALL COMPONENT tuple.

SPEC. 63:
IMP_SM_COMP_CH_SIGNATURES={iSmCpChSign ∈DL|∃ iSmCpTuple∈IMPACTED SMALL COMPONENT TUPLES s.t. iSmCpTuple.IMP_SM_COMP_CH_SIGNATURE= iSmCpChSign}, where each member of IMP_SM_COMP_CH_SIGNATURES is the change signature of an IMPACTED SMALL COMPONENT tuple.

SPEC. 64:

| IMPACTED SMALL COMPONENT TUPLE ATTRIBUTES | | |
|---|---|---|
| IMP_SM_COMP_ID | NAME | IMP_SM_COMP_CH_SIGNATURE |

+ other attributes

IMPACTED SMALL COMPONENT TUPLES = {(IMP_SM_COMP_ID: $v_{i1}$), (NAME: $v_{i2}$), (IMP_SM_COMP_CH_SIGNATURE: $v_{i3}$), . . . , (Attribute$_j$: $v_{ij}$), . . . , (Attribute$_n$: $v_{in}$)}, where:
1 ≤ i ≤ m is the number of tuples in the set,
3 ≤ j ≤ n is the number of attributes that define the relation,
$v_{i1}$ ∈ IMP_SM_COMP_IDS,
$v_{i2}$ ∈ DL,
$v_{i3}$ ∈ IMP_SM_COMP_CH_SIGNATURES,
$v_{ij}$ ∈ Domain$_j$,
$v_{in}$ ∈ Domain, and
∀ ISCTuple$_i$, iSCTuple$_{k≠i}$ ∈ IMPACTED SMALL COMPONENT TUPLES:
ISCTuple$_i$.IMP_SM_COMP_ID ≠ iSCTuple$_k$.IMP_SM_COMP_ID. [IMP_SM_COMP_ID is a key attribute that ensures uniqueness across the tuples with respect to the values in this field.]

SPEC. 65:

Let (TargetImpact(tarChTuple∈TARGET_CHANGES, tarISETuple∈TARGET_IMPACTED_SOLUTION_ELEMENTS)=true)→(∃ tarChImpRele TARGET CHANGE IMPACT RELATIONSHIPS s.t. (tarChImpRel.CHANGE_ID=tarChTuple.CHANGE_ID)∧ (((tarSETuple∈DATA TUPLES)∧ (tarChImpRel.DA_OR_OP_ID=tarISETuple.DATA_ID))∨((tarISETuple∈OPERATION TUPLES)∧ (tarChImpRel.DA_OR_OP_ID=tarISETuple.OP_ID)))), where TargetImpact is a function that determines whether the target EFF change represented by tarChTuple has a target change impact relationship with the target impacted solution element represented by tarISETuple.

SPEC. 66:

"In Same Impacted Small Component Property": ∀ tarSETuple$_i$, tarISETuple$_{k\neq i}$∈TARGET_IMPACTED_SOLUTION_ELEMENTS: InSameImSmCmp(tarSETuple$_i$, tarISETuple$_k$)→(∀ tarChTuple∈TARGET_CHANGES: (TargetImpact(tarChTuple, tarSETuple$_i$)→TargetImpact(tarChTuple$_i$, tarISETuple$_k$))).

Corollary to the "In Same Impacted Small Component Property": ∀ tarSETuple$_i$, tarISETuple$_{k\neq i}$∈TARGET_IMPACTED_SOLUTION_ELEMENTS: (∀ tarChTuple∈TARGET_CHANGES: (TargetImpact(tarChTuple, tarSETuple$_i$)→TargetImpact(tarChTuple, tarISETuple$_k$))→InSameImSmCmp (tarSETuple$_i$, tarISETuple$_k$)).

TargetImpact is a function as defined in Spec. 65, and InSameImSmCmp is a function that returns true if the target solution elements represented by tarSETuple$_i$, and tarISETuple$_k$ reside within the same impacted small component of an impact partition or false otherwise.

SPEC. 67:

| IMPACTED SMALL COMPONENT-DATA_OR_OP TUPLE ATTRIBUTES | |
|---|---|
| IMP_SM_COMP_ID | DA_OR_OP_ID |

+ other attributes

IMPACTED SMALL COMPONENT-DATA_OR_OP TUPLES = {(IMP_SM_COMP_ID: $v_{i1}$), (DA_OR_OP_ID: $v_{i2}$), . . . , (Attribute$_j$: $v_{ij}$), . . . , (Attribute$_n$: $v_{in}$)}, where:

$1 \leq i \leq m$ is the number of tuples in the set, $2 \leq j \leq n$ is the number of attributes that define the relation, $v_{i1}$ ∈ IMP_SM_COMP_IDS, ($v_{i2}$ ∈ DATA_OR_OPERATION_IDS) ∧ (∃tarISETuple ∈ TARGET_IMPACTED_SOLUTION_ELEMENTS s.t.

((tarISETuple ∈ DATA TUPLES) ∧ (tarISETuple.DATA_ID = $v_{i2}$)) ∨

((tarISETuple ∈ OPERATION TUPLES) ∧ (tarISETuple.OP_ID = $v_{i2}$)))

$v_{ij}$ ∈ Domain$_j$, $v_{in}$ ∈ Domain$_n$,

∀ iSmCpDOTuple$_i$, iSmCpDOTuple$_{k\neq i}$ ∈ IMPACTED SMALL COMPONENT-DATA_OR_OP TUPLES: (iSmCpDOTuple$_i$.IMP_SM_COMP_ID = iSmCpDOTuple$_k$.IMP_SM_COMP_ID) → (∃ tarISETuple$_j$, tarISETuple$_{i\neq j}$ ∈ TARGET_IMPACTED_SOLUTION_ELEMENTS s.t.

(((tarISETuple$_j$∈ DATA TUPLES) ∧ (tarISETuple$_j$.DATA_ID = iSmCpDOTuple$_i$.DA_OR_OP_ID)) ∨ ((tarISETuple$_j$∈ OPERATION TUPLES) ∧ (tarISETuple$_j$.OP_ID = iSmCpDOTuple$_i$.DA_OR_OP_ID))) ∧ (((tarISETuple$_l$∈ DATA TUPLES) ∧ (tarISETuple$_l$.DATA_ID = iSmCpDOTuple$_k$)) ∨ ((tarISETuple$_l$∈ OPERATION TUPLES) ∧ (tarISETuple$_l$.OP_ID = iSmCpDOTuple$_k$.DA_OR_OP_ID))) ∧ InSameImSmCmp(tarISETuple$_j$, tarISETuple$_l$)), and ∀ iSmCpDOTuple$_i$, iSmCpDOTuple$_{k\neq i}$ ∈ IMPACTED SMALL COMPONENT-DATA_OR_OP TUPLES: (iSmCpDOTuple$_k$.IMP_SM_COMP_ID ≠ iSmCpDOTuple$_i$.IMP_SM_COMP_ID) ∨ (iSmCpDOTuple$_k$.DA_OR_OP_ID ≠ iSmCpDOTuple$_i$.DA_OR_OP_ID). [IMP_SM_COMP_ID and DA_OR_OP_ID are key attributes that jointly ensure uniqueness across the tuples with respect to the pair of values in these fields.]

SPEC. 68:
Let (ImpactSmCmp(tarChTuple∈TARGET_CHANGES, iSmCpTuple∈IMPACTED SMALL COMPONENT TUPLES)=true)→(∃ iSmCpDaOpTuple∈IMPACTED SMALL COMPONENT-DATA_OR_OP TUPLES, tarISETuple∈TARGET_IMPACTED_SOLUTION_ELEMENTS s.t.
(iSmCpDaOpTuple.IMP_SM_COMP_ID=iSmCpTuple.IMP_SM_COMP_ID)∧
(((tarISETuple∈DATA TUPLES)∧ (iSmCpDaOpTuple.DA_OR_OP_ID=tarISETuple.DATA_ID))∨((tarISETuple∈OPERATION TUPLES)∧ (iSmCpDaOpTuple.DA_OR_OP_ID=tarISETuple.OP_ID)))∧
TargetImpact(tarChTuple, tarISETuple)=true*, where TargetImpact is a function as defined in Spec. 65, and ImpactSmCmp is a function that determines whether the target EFF change represented by tarChTuple has a target change impact relationship with the target solution elements contained within the impacted small component associated with iSmCpTuple.

From the definition of the "In Same Impacted Small Component Property" in Spec. 66, it follows that ∀ tarISETuple$_i$, tarISETuple$_{k≠i}$∈TARGET IMPACTED SOLUTION ELEMENTS: (InSameImSmCmp(tarISETuple$_i$, tarISETuple$_k$)∧TargetImpact(tarChTuple, tarISETuple$_i$))→TargetImpact(tarChTuple, tarISETuple$_k$).

SPEC. 69:
Let the relation SharedImpact={iSmCpTuple$_i$, iSmCpTuple$_{k≠i}$∈IMPACTED SMALL COMPONENT TUPLES|∃ tarChTuple∈TARGETED CHANGES s.t. ImpactSmCmp(tarChTuple, iSmCpTuple$_i$)∧ImpactSmCmp(tarChTuple, iSmCpTuple$_k$), where ImpactSmCmp is a function as defined in Spec. 68.}

Let the relation SI$^+$ represent the transitive closure of SharedImpact.

"In Same Impacted Large Component Property":
∀ iSmCpTuple$_i$, iSmCpTuple$_{k≠i}$∈IMPACTED SMALL COMPONENT TUPLES:
(InSameImLgCp(iSmCpTuple$_i$, iSmCpTuple$_k$)→iSmCpTuple$_i$ SI$^+$ iSmCpTuple$_k$), where InSameImLgCp is a function that returns true if the impacted small components represented by iSmCpTuple$_i$, and iSmCpTuple$_k$ reside in the same impacted large component of an impact partition or false otherwise.

Corollary to the "In Same Impacted Large Component Property":
∀ iSmCpTuple$_i$, iSmCpTuple$_{k≠i}$∈IMPACTED SMALL COMPONENT TUPLES:
iSmCpTuple$_i$ SI$^+$ iSmCpTuple$_k$→InSameImLgCp (iSmCpTuple$_i$, iSmCpTuple$_k$).

SPEC. 70:
IMP_LG_COMP_IDS={iLgCpID∈DL|∃ ILgCpTuple∈IMPACTED LARGE COMPONENT TUPLES s.t. iLgCpTuple.IMP_LG_COMP_ID=iLgCpID}, where each member of IMP_LG_COMP_IDS is the identifier of an IMPACTED LARGE COMPONENT tuple.

SPEC. 71:
IMP_LG_COMP_CH_SIGNATURES={iLgCpChSign ∈DL|∃ iLgCpTuple∈IMPACTED LARGE COMPONENT TUPLES s.t. iLgCpTuple.IMP_LG_COMP_CH_SIGNATURE= iLgCpChSign}, where each member of IMP_LG_COMP_CH_SIGNATURES is the change signature of an IMPACTED LARGE COMPONENT tuple.

SPEC. 72:

| IMPACTED LARGE COMPONENT TUPLE ATTRIBUTES | | |
|---|---|---|
| IMP_LG_COMP_ID | NAME | IMP_LG_COMP_CH_SIGNATURE |

+ other attributes

IMPACTED LARGE COMPONENT TUPLES = {(IMP_LG_COMP_ID: $v_{i1}$), (NAME: $v_{i2}$), (IMP_LG_COMP_CH_SIGNATURE: $v_{i3}$), ..., (Attribute$_j$: $v_{ij}$), ..., (Attribute$_n$: $v_{in}$)}, where:
1 ≤ i ≤ m is the number of tuples in the set,
3 ≤ j ≤ n is the number of attributes that define the relation,
$v_{i1}$ ∈ IMP_LG_COMP_IDS,
$v_{i2}$ ∈ DL,
$v_{i3}$ ∈ IMP_LG_COMP_CH_SIGNATURES,
$v_{ij}$ ∈ Domain$_j$,
$v_{in}$ ∈ Domain$_n$, and
∀ iLgCpTuple$_i$, iLgCpTuple$_{k≠i}$ ∈ IMPACTED LARGE COMPONENT TUPLES:
iLgCpTuple$_i$.IMP_LG_COMP_ID ≠ iLgCpTuple$_k$.IMP_LG_COMP_ID. [IMP_LG_COMP_ID is a key attribute that ensures uniqueness across the tuples with respect to the values in this field.]

SPEC. 73:

| IMPACTED LARGE COMPONENT-IMPACTED SMALL COMPONENT TUPLE ATTRIBUTES | |
|---|---|
| IMP_LG_COMP_ID | IMP_SM_COMP_ID |

+ other attributes

IMPACTED LARGE COMPONENT-IMPACTED SMALL COMPONENT TUPLES = {(IMP_LG_COMP_ID: $v_{i1}$), (IMP_SM_COMP_ID: $v_{i2}$), ..., (Attribute$_j$: $v_{ij}$), ..., (Attribute$_n$: $v_{in}$)}, where:
1 ≤ i ≤ m is the number of tuples in the set,
2 ≤ j ≤ n is the number of attributes that define the relation,
$v_{i1}$ ∈ IMP_LG_COMP_IDS,
$v_{i2}$ ∈ IMP_SM_COMP_IDS,
$v_{ij}$ ∈ Domain$_j$, -continued $v_{in} \in Domain_n$,
∀ iLgCpSmCpTuple$_i$, iLgCpSmCpTuple$_{k \neq i}$ ∈ IMPACTED LARGE COMPONENT-IMPACTED SMALL COMPONENT TUPLES: (iLgCpSmCpTuple$_i$.IMP_LG_COMP_ID = iLgCpSmCpTuple$_k$.IMP_LG_COMP_ID) → (∃iSmCpTuple$_j$, iSmCpTuple$_{l \neq j}$ ∈ IMPACTED SMALL COMPONENT TUPLES s.t. (iSmCpTuple$_j$.IMP_SM_COMP_ID = iLgCpSmCpTuple$_i$.IMP_SM_COMP_ID) ∧ (iSmCpTuple$_l$.IMP_SM_COMP_ID = iLgCpSmCpTuple$_k$.IMP_LG_COMP_ID) ∧ InSameImLgCp(iSmCpTuple$_j$, iSmCpTuple$_l$)), where InSameImLgCp is a function as defined in Spec. 69, and
∀ iLgCpSmCpTuple$_i$, iLgCpSmCpTuple$_{k \neq i}$ ∈ IMPACTED LARGE COMPONENT-IMPACTED SMALL COMPONENT TUPLES: iLgCpSmCpTuple$_i$.IMP_SM_COMP_ID ≠ iLgCpSmCpTuple$_k$.IMP_SM_COMP_ID. [IMP_SM_COMP_ID is a key attribute that ensures uniqueness across the tuples with respect to the values in this field.]

SPEC. 74:

| IMPACT PARTITION-IMPACTED LARGE COMPONENT TUPLE ATTRIBUTES | |
| --- | --- |
| IMP_PAR_ID | IMP_LG_COMP_ID |

+ other attributes

IMPACT PARTITION-IMPACTED LARGE COMPONENT TUPLES = {(IMP_PAR_ID: $v_{i1}$), (IMP_LG_COMP_ID: $v_{i2}$), ..., (Attribute$_j$: $v_{ij}$), ..., (Attribute$_n$: $v_{in}$)}, where:
1 ≤ i ≤ m is the number of tuples in the set,
2 ≤ j ≤ n is the number of attributes that define the relation,
$v_{i1}$ ∈ IMP_PAR_IDS,
$v_{i2}$ ∈ IMP_LG_COMP_IDS,
$v_{ij}$ ∈ Domain$_j$,
$v_{in}$ ∈ Domain$_n$,
∀ iParTuple$_i$, iParTuple$_{k \neq i}$ ∈ IMPACTED PARTITION TUPLES: (iParTuple$_i$.IMP_PAR_ID = iParTuple$_k$.IMP_PAR_ID) → (∃LgCpTuple$_j$, iLgCpTuple$_l$ ∈ IMPACTED LARGE COMPONENT TUPLES s.t. (iLgCpTuple$_j$.IMP_LG_COMP_ID = iParTuple$_i$.IMP_LG_COMP_ID) ∧ (iLgCpTuple$_l$.IMP_LG_COMP_ID = iParTuplek.IMP_LG_COMP_ID) ∧ (SameIPar(iLgCpTuple$_j$, iLgCpTuple$_l$) = true), where SameIPar is a function that returns true if iLgCpTuple$_j$ and iLgCpTuple$_l$ are parts of the same impacted partition and false otherwise), and
∀ iParLgCpTuple$_i$, iParLgCpTuple$_{k \neq i}$ ∈ IMPACT PARTITION-IMPACTED LARGE COMPONENT TUPLES: iParLgCpTuple$_i$.IMP_LG_COMP _ID ≠ iParLgCpTuple,IMP_LG_COMP_ID.
[IMP_LG_COMP_ID is a key attribute that ensures uniqueness across the tuples with respect to the values in this field.]

SPEC. 75:
```
Function GenImSmCmpChSign(iSmCpTuple:
    IMPACTED SMALL COMPONENT TUPLES)
  Let chSig∈DL=empty string
  ∀ tarChTuple∈TARGET_CHANGES
    ImpactSmCmp (tarChTuple, iSmCpTuple)→chSig+
      tarChTuple.CHANGE_ID+"/\"
    chSig=DelLastChar(chSig)
  GenImSmCmpSign=chSig
End GenImSmCmpChSign
```
SPEC. 76:
```
Function GenImLgCmpChSign(iLgCpTuple:
    IMPACTED LARGE COMPONENT TUPLES)
  Let chSig DL=empty string
  Let tarChImLgCp={tarChTuple∈Target Changes|∃
    iLgSmCpTuple∈IMPACTED LARGE COMPO-
    NENT-IMPACTED SMALL COMPONENT,
    iSmCpTuple∈IMPACTED SMALL COMPONENT
    TUPLES s.t.
    (iLgSmCpTuple.IMP_LG_COMP_ID=iLgCpTuple.
    IMP_LG_COMP_ID)∧
    (iLgSmCpTuple.IMP_SM_COMP_ID=iSmCp
    Tuple.IMP_SM_COMP_ID)∧ImpactSmCmp
    (tarChTuple, iSmCpTuple), where ImpactSmCmp is
    a function as defined in Spec. 68.}
  ∀ tarChTuple∈tarChImLgCp: chSig=chSig+tarChTu-
    ple.CHANGE_ID+"\/"
  chSig=DelLastChar(chSig)
  GenImLgCmpChSign=chSig
End GenImLgCmpChSign
```
SPEC. 77:

| CHANGE-IMPACTED SMALL COMPONENT TUPLE ATTRIBUTES | |
| --- | --- |
| CHANGE_ID | IMP_SM_COMP_ID |

+ other attributes

CHANGE-IMPACTED SMALL COMPONENT TUPLES = {(CHANGE_ID: $v_{i1}$), (IMP_SM_COMP_ID: $v_{i2}$), ..., (Attribute$_j$: $v_{ij}$), ..., (Attribute$_n$: $v_{in}$)}, where:
1 ≤ m is the number of tuples in the set,
2 ≤ n is the number of attributes that define the relation,
$v_{i1}$ ∈ CHANGE_IDS,
$v_{i2}$ ∈ IMP_SM_COMP_IDS,
$V_{ij}$ ∈ Domain$_j$,
$v_{in}$ ∈ Domain$_n$, and

CHANGE-IMPACTED SMALL COMPONENT TUPLE ATTRIBUTES $\forall$ chISmCmpTuple$_i$, chISmCmpTuple$_{k \neq i}$ $\in$ CHANGE-IMPACTED SMALL COMPONENT TUPLES: (chISmCmpTuple$_k$.CHANGE_ID $\neq$ chISmCmpTuple$_i$.CHANGE_ID: $v_{i1}$) $\lor$ (chISmCmpTuple$_k$.IMP_LG_COMP_ID $\neq$ chISmCmpTuple$_i$.IMP_LG_COMP_ID). [CHANGE_ID and IMP_LG_COMP_ID are key attributes that jointly ensure uniqueness across the tuples with respect to the pair of values in these fields.]

SPEC. 78:
  NIMP_PAR_IDS={nImParID$\in$DL|$\exists$ nImParTuple$\in$NO IMPACT PARTITION TUPLES s.t. nImParID=NIParID(nImParTuple)}, where NIParID is a function that returns the identifier associated with nImParTuple.

SPEC. 79:

NO IMPACT PARTITION TUPLE ATTRIBUTES

| NIMP_PAR_ID | IMP_PAR_ID | DATE | TIME | USER_ID |
|---|---|---|---|---|

+ other attributes

NO IMPACT PARTITION TUPLES = {(NIMP_PAR_ID: $v_{i1}$), (IMP_PAR_ID: $v_{i2}$), (DATE: $v_{i3}$), (TIME: $v_{i4}$), (USER_ID: $v_{i5}$), ..., (Attribute$_j$: $v_{ij}$), ..., (Attribute$_n$: $v_{in}$)}, where:
$1 \leq i \leq m$ is the number of tuples in the set,
$5 \leq j \leq n$ is the number of attributes that define the relation,
$v_{i1} \in$ NIMP_PAR_IDS,
$v_{i2} \in$ IMP_PAR_IDS,
$v_{i3} \in$ DATE,
$v_{i4} \in$ TIME,
$v_{i5} \in$ USER_IDS,
$V_{ij} \in$ Domain$_j$,
$v_{in} \in$ Domain$_n$,
$\forall$ nIParTuple $\in$ NO IMPACT PARTITION TUPLES: ($\exists$ iParTuple $\in$ IMPACT PARTITION TUPLES s.t. (iParTuple.IMP_PAR_ID = nIParTuple.IMP_PAR_ID) $\land$ RelatedIPar(nIParTuple, iParTuple) = true, where RelatedIPar is a function that returns true if the no impact partition associated with nIParTuple correlates to the impact partition associated with iParTuple and false otherwise, and
$\forall$ nIParTuple$_i$, nIParTuple$_{k \neq i}$ $\in$ NO IMPACT PARTITION TUPLES: (nIParTuple$_k$.NIMP_PAR_ID $\neq$ nIParTuple$_i$.NIMP_PAR_ID) $\land$ (nIParTuple$_k$.IMP_PAR_ID $\neq$ nIParTuple$_i$.IMP_PAR_ID).
[NIMP_PAR_ID and IMP_PAR_ID are each $\land$ key attribute that ensures uniqueness across the tuples with respect to the values in the respective field.]

SPEC. 80:
  NIMP_SM_COMP_IDS={nISmCpID$\in$DL|$\exists$ nISmCpTuple$\in$NOT IMPACTED LARGE COMPONENT TUPLES s.t. nISmCpID=NSmCpID(nISmCpTuple)}, where NSmCpID is a function that returns the identifier associated with nISmCpTuple.

SPEC. 81:

NOT IMPACTED SMALL COMPONENT TUPLE ATTRIBUTES

| NIMP_SM_COMP_ID | NAME | DA_OR_OP_ID |
|---|---|---|

+ other attributes

NOT IMPACTED SMALL COMPONENT TUPLES = {(NIMP_SM_COMP_ID: $v_{i1}$), (NAME: $v_{i2}$), (DA_OR_OP_ID: $v_{i3}$), ..., (Attribute$_j$: $v_{ij}$), ..., (Attribute$_n$: $v_{in}$)}, where:
$1 \leq i \leq m \leq$ is the number of tuples in the set,
$3 \leq j \leq n$ is the number of attributes that define the relation,
$v_{i1} \in$ NIMP_SM_COMP_IDS,
$v_{i2} \in$ DL,
$v_{i3} \in$ DATA_OR_OPERATION_IDS $\land$ ($\exists$ tarSETuple $\in$ TARGET SOLUTION_ELEMENTS s.t. (((tarSETuple $\in$ DATA TUPLES) $\land$ (tarSETuple.DATA_ID = $v_{i3}$)) $\lor$ ((tarSETuple $\in$ OPERATION TUPLES) $\land$ (tarISETuple.OP_ID = $v_{i3}$))) $\land$ (tarSETuple $\notin$ TARGET_IMPACTED_SOLUTION_ELEMENTS)) $\lor$ ($\exists$ daTuple $\in$ DATA TUPLES s.t. (daTuple.DATA_ID = $v_{i3}$) $\land$ (daTuple $\notin$ TARGET_SOLUTION_ELEMENTS)) $\lor$ ($\exists$ opTuple $\in$ OPERATION TUPLES s.t. (opTuple.OP_ID = $v_{i3}$) $\land$ (opTuple $\notin$ TARGET_SOLUTION ELEMENTS)).
$v_{in} \in$ Domain$_n$, -continued

| NOT IMPACTED SMALL COMPONENT TUPLE ATTRIBUTES |
|---|
| $\forall$ nISmCpTuple$_j$, nISmCpTuple$_{k \neq i}$ $\in$ NOT IMPACTED SMALL COMPONENT TUPLES: nISmCpTuple$_k$.NIMP_SM_COMP_ID $\neq$ nISmCpTuple$_i$.NIMP_SM_COMP_ID. [NIMP_SM_COMP_ID is a key attribute that ensures uniqueness across the tuples with respect to the values in this field.] |

SPEC. 82:
    NIMP_LG_COMP_IDS={nILgCpID$\in$DL|$\exists$ nILgCpTuple$\in$NOT IMPACTED LARGE COMPONENT TUPLES s.t. nILgCpID=NLgCpID(nILgCpTuple)}, where NLgCpID is a function that returns the identifier associated with nILgCpTuple.

SPEC. 83:

| NOT IMPACTED LARGE COMPONENT TUPLE ATTRIBUTES | | |
|---|---|---|
| NIMP_LG_COMP_ID | NAME | NIMP_SM_COMP_ID |
| + other attributes | | |

NOT IMPACTED LARGE COMPONENT TUPLES = {(NIMP_LG_COMP_ID: $v_{i1}$), (NAME: $v_{i2}$), (Attribute$_j$: v)
(NIMP_SM_COMP_ID: $v_{i3}$), . . . , (Attribute$_j$: $v_{ij}$), . . . , (Attribute$_n$: $v_{in}$)}, where:
$1 \leq i \leq m$ is the number of tuples in the set,
$3 \leq j \leq n$ is the number of attributes that define the relation,
$v_{i1} \in$ NIMP_LG_COMP_IDS,
$v_{i2} \in$ DL,
$v_{i3} \in$ NIMP_SM_COMP_IDS,
$v_{ij} \in$ Domain$_j$,
$v_{in} \in$ Domain$_n$,
$\forall$ nILgCpTuple$_i$, nILgCpTuple$_{k \neq i}$ $\in$ NOT IMPACTED LARGE COMPONENT TUPLES:
(nILgCpTuple$_k$.NIMP_LG_COMP_ID $\neq$ nILgCpTuple$_i$.NIMP_LG_COMP_ID) $\wedge$
(nILgCpTuple$_k$.NIMP_SM_COMP_ID $\neq$ nILgCpTuple$_i$.NIMP_SM_COMP_ID).
[NIMP_LG_COMP_ID and NIMP_SM_COMP_ID are each a key attribute that ensures uniqueness across the tuples with respect to the values in the respective field.]

SPEC. 84:

| NO IMPACT PARTITION-NOT IMPACTED LARGE COMPONENT TUPLE ATTRIBUTES | |
|---|---|
| NIMP_PAR_ID | NIMP_LG_COMP_ID |
| + other attributes | |

NO IMPACT PARTITION-NOT IMPACTED LARGE COMPONENT TUPLES = {(NIMP_PAR_ID: $v_{i1}$),
(NIMP_LG_COMP_ID: $v_{i2}$), . . . , (Attribute$_j$: $v_{ij}$), . . . , (Attribute$_n$: $v_{in}$)}, where:
$1 \leq i \leq m$ is the number of tuples in the set,
$2 \leq j \leq n$ is the number of attributes that define the relation,
$v_{i1} \in$ NIMP_PAR_IDS,
$v_{i2} \in$ NIMP_LG_COMP_IDS,
$v_{ij} \in$ Domain$_j$,
$v_{in} \in$ Domain$_n$,
$\forall$ nImParTuple$_i$, nImParTuple$_{k \neq i}$ $\in$ NO IMPACTED PARTITION TUPLES:
(nImParTuple$_i$.IMP_PAR_ID = nImParTuple$_k$.IMP_PAR_ID) $\rightarrow$ ($\exists$nImLgCpTuple$_j$,
nImLgCpTuple$_l$ $\in$ NO IMPACTED LARGE COMPONENT TUPLES s.t.
(nImLgCpTuple$_j$.IMP_LG_COMP_ID = nImParTuple$_i$.IMP_LG_COMP_ID) $\wedge$
(nImLgCpTuple$_j$.IMP_LG_COMP_ID = nImParTuple$_k$.IMP_LG_COMP_ID) $\wedge$
(SameNIPar(nImLgCpTuple$_j$, nImLgCpTuple$_l$) = true), where SameNIPar is a function that
returns true if nIMLgCpTuple$_j$ and nImLgCpTuple$_l$ are parts of the same no impact partition
and false otherwise), and
$\forall$ nImParLgCpTuple$_i$, nImParLgCpTuple$_{k \neq i}$ $\in$ NO IMPACT PARTITION-NOT IMPACTED
LARGE COMPONENT TUPLES: nImParLgCpTuple$_k$.NIMP_LG_COMP_ID $\neq$
nImParLgCpTuple$_i$.NIMP_LG_COMP_ID). [NIMP_LG_COMP_ID is a key attribute that ensures
uniqueness across the tuples with respect to the pair of values in this field.]

SPEC. 85:
  ANALYSIS_DECISION_IDS={anDecID∈DL|∃
    anDecTuple∈ANALYSIS DECISION TUPLES s.t.
    anDecID=AnDecID (anDecTuple)}, where AnDecID
    is a function that returns the identifier associated with
    anDecTuple.
SPEC. 86:
  ANALYSES={"Phase1: NV", "REVIEW-Phase1: NV",
    "Phase2:DO", "REVIEW-Phase2:DO", "ChangeID",
    "REVIEW-ChangeID", "ChangeImpact", "REVIEW-
    ChangeImpact", "Partition", "REVIEW-
    Partition", . . . , analysis$_i$, . . . , analysis$_n$}, where each
    analysis$_i$∈DL, 1≤i≤n, the number of strings in the set,
    and the members of ANALYSES represent types of
    analyses.
SPEC. 87:

| ANALYSIS DECISION TUPLE ATTRIBUTES | | | | |
|---|---|---|---|---|
| AN_DEC_ID | ANALYSIS | ISSUE | DECISION | STATUS |
| + other attributes | | | | |

ANALYSIS DECISION TUPLES = [(AN_DEC_ID: $v_{i1}$), (ANALYSIS: $v_{i2}$), (ISSUE: $v_{i3}$), (DECISION: $v_{i4}$), (STATUS: $v_{i5}$), . . . , (Attribute$_j$: $v_{in}$), . . . , (Attribute$_n$: $v_{in}$)}, where:
1 ≤ i ≤ m is the number of tuples in the set,
5 ≤ j ≤ n is the number of attributes that define the relation,
$v_{i1}$ ∈ ANALSIS_DECISION_IDS,
$v_{i2}$ ∈ ANALYSES,
$v_{i3}$ ∈ ISSUES,
$v_{i4}$ ∈ DECISIONS,
$v_{i5}$ ∈ DECISION_STATUS_VALUES
$v_{ij}$ ∈ Domain$_j$,
$v_{in}$ ∈ Domain$_n$, and
∀ anDcTuple$_i$, anDcTuple$_{k≠i}$ ∈ ANALYSIS DECISION TUPLES: anDcTuple$_k$.AN_DEC_ID ≠ anDcTuple$_i$.AN_DEC_ID. [AN_DEC_ID is a key attribute that ensures uniqueness across the tuples with respect to the values in this field.]

SPEC. 88:
  CORRELATED_ANALYSES_IDS={corAnID∈DL|∃
    anCtxTuple∈ANALYSIS CONTEXT TUPLES s.t.
    corAnID=CorAnID(anCtxTuple)}, where CorAnID is
    a function that returns the identifier associated with
    anCtxTuple.
SPEC. 89:
  TOTAL_TIME={totime∈DL|TotalTimeFormat(totime)=
    True}, where TotalTimeFormat is a function that
    returns true if totime is in an implementation-specific
    form to indicate a total time in hours, minutes, or
    seconds, or false otherwise.
SPEC. 90:
  ANALYSIS_STATUS_VALUES={"READY_TO_
    START", "IN_PROGRESS", "ON_HOLD", "COM-
    PLETED", "CANCELLED", . . . , stat$_i$, . . . , stat$_n$},
    where stat$_i$∈DL and 1≤i≤n, the number of strings in the
    set.
SPEC. 91:

| ANALYSIS CONTEXT TUPLE ATTRIBUTES | | | | | | |
|---|---|---|---|---|---|---|
| COR_AN_D | ANALYSIS | LEAD_USER | SDATE | EDATE | TOTIME | STATUS |
| + other attributes | | | | | | |

ANALYSIS CONTEXT TUPLES = {(COR_AN_ID: $v_{i1}$), (ANALYSIS: $v_{i2}$), (USER: $v_{i3}$), (STDATE: $v_{i4}$), (ENDATE: $v_{i5}$), (TOTIME: $i_{i6}$), (STATUS: $v_{i7}$), . . . , (Attribute$_j$: $v_{ij}$), . . . , (Attribute$_n$: $v_{in}$)}, where:
1 ≤ i ≤ m is the number of tuples in the set,
7 ≤ j ≤ n is the number of attributes that define the relation,
$v_{i1}$ ∈ CORRELATED_ANALYSES_IDS,
$v_{i2}$ ∈ ANALYSES,
$v_{i3}$ ∈ USER_IDS,

| ANALYSIS CONTEXT TUPLE ATTRIBUTES |
| --- |
| $v_{i4} \in$ DATE, |
| $v_{i5} \in$ DATE, |
| $v_{i6} \in$ TOTAL_TIME, |
| $v_{i7} \in$ ANALYSIS_STATUS_VALUES, |
| $v_{ij} \in$ Domain$_j$, |
| $v_{in} \in$ Domain$_n$, and |
| $\forall$ anCtxTuple $\in$ ANALYSIS CONTEXT TUPLES: ValidStartEndDates(anCtxTuple$_i$.SDATE, anCtxTuple$_i$.EDATE) = true, where ValidStartEndDates is a function that returns true if anCtxTuple$_i$.SDATE precedes or is the same day as anCtxTuple$_i$.EDATE and false otherwise. $\forall$ anCtxTuple$_i$ anCtxTuple$_{k \neq i}$ $\in$ ANALYSIS CONTEXT TUPLES: (anCtxTuple$_k$.COR_AN_ID $\neq$ anCtxTuple$_i$.COR_AN_ID) $\lor$ (anCtxTuple$_k$.ANALYSIS $\neq$ anCtxTuple$_i$.ANALYSIS). [COR_AN_ID and ANALYSIS are key attributes that jointly ensure uniqueness across the tuples with respect to the pair of values in these fields.] |

SPEC. 92:
   MANAGER_USER_IDS={mgUserID∈USER_IDS| ValidManager(mgUserID)=True}, where ValidManager is a function that returns true if mgUserID is the identifier of a user who is authorized to manage user information for a set of correlated analyses or false otherwise.

SPEC. 93:

| ANALYSIS MANAGER TUPLE ATTRIBUTES | |
| --- | --- |
| COR_AN_ID | MANAGER |

+ other attributes

ANALYSIS MANAGER TUPLES = {(COR_AN_ID: $v_{i1}$), (MANAGER: $v_{i2}$) ..., (Attribute$_j$: $v_{ij}$), ..., (Attribute$_n$: $v_{in}$)}, where:
$1 \leq i \leq m$ is the number of tuples in the set,
$2 \leq j \leq n$ is the number of attributes that define the relation,
$v_{i1} \in$ CORRELATED_ANALYSES_IDS,
$v_{i2} \in$ MANAGER_USER_IDS,
$v_{ij} \in$ Domain$_j$,
$v_{in} \in$ Domain$_n$, and
$\forall$ anMgTuple$_i$ anMgTuple$_{k \neq i}$ $\in$ ANALYSIS MANAGER TUPLES: (anMgTuple$_k$.COR_AN_ID $\neq$ anMgTuple$_i$.COR_AN_ID) $\lor$ (anMgTuple$_k$.MANAGER $\neq$ anMgTuple$_i$.MANAGER). [COR_AN_ID and MANAGER are key attributes that jointly ensure uniqueness across the tuples with respect to the pair of values in these fields.]

SPEC. 94:

| ANALYSIS AUTHORIZED USER TUPLE ATTRIBUTES | | | |
| --- | --- | --- | --- |
| COR_AN_ID | USER | ANALYSIS | TOTIME |

+ other attributes

ANALYSIS AUTHORIZED USER TUPLES = {(COR_AN_ID: $v_{i1}$), (MANAGER: $v_{i2}$), (ANALYSIS: $v_{i3}$), (TOTIME: $v_{i4}$), ..., (Attribute$_j$: $v_{ij}$), ..., (Attribute$_n$: $v_{in}$)}, where:
$1 \leq i \leq m$ is the number of tuples in the set,
$4 \leq j \leq n$ is the number of attributes that define the relation,
$v_{i1} \in$ CORRELATED_ANALYSES_IDS,
$v_{i2} \in$ USER_IDS,
$v_{i3} \in$ ANALYSES,
$v_{i4} \in$ TOTAL TIME,
$v_{ij} \in$ Domain$_j$,
$v_{in} \in$ Domain$_n$, and
$\forall$ anUserTuple anUserTuple$_{k \neq i}$ $\in$ ANALYSIS AUTHORIZED TUPLES:
(anUserTuple$_k$.COR_AN_ID $\neq$ anUserTuple$_i$.COR_AN_ID) $\lor$(anUserTuple$_k$.USER $\neq$ anUserTuple$_i$.USER) $\lor$ (anUserTuple$_k$.ANALYSIS $\neq$ anUserTuple$_i$.ANALYSIS). [COR_AN_ID, USER, and ANALYSIS are key attributes that jointly ensure uniqueness across the tuples with respect to the values in these fields.]

SPEC. 95:

| ANALYSIS CONTEXT-REQ_ID TUPLE ATTRIBUTES | |
|---|---|
| COR_AN_ID | REQ_ID |

+ other attributes

ANALYSIS CONTEXT-REQ_ID TUPLES = {(COR_AN_ID: $v_{i1}$), (REQ_ID: $v_{i2}$), . . . , (Attribute$_j$: $v_{ij}$), . . . , (Attribute$_n$: v)}, where:
$1 \leq i \leq m$ is the number of tuples in the set,
$2 \leq j \leq n$ is the number of attributes that define the relation,
$v_{i1} \in$ CORRELATED_ANALYSES_IDS,
$v_{i2} \in$ REQ_IDS,
$v_{ij} \in$ Domain$_j$,
$v_{in} \in$ Domain$_n$, and
∀ anRqIDTuple$_i$, anRqIDTuple$_{k \neq i}$ ∈ ANALYSIS CONTEXT-REQ_ID TUPLES:
(anRqIDTuple$_k$.COR_AN_ID ≠ anRqIDTuple$_i$.COR_AN_ID) ∨ (anRqIDTuple$_k$.REQ_ID ≠ anRqIDTuple+$_i$.REQ_ID). [COR_AN_ID, REQ_ID, and RSNOUN are key attributes that jointly ensure uniqueness across the tuples with respect to the pair of values in these fields.]

SPEC. 96:

| ANALYSIS CONTEXT-DATA_OR_OP TUPLE ATTRIBUTES | |
|---|---|
| COR_AN_ID | DA_OR_OP_ID |

+ other attributes

ANALYSIS CONTEXT-DATA_OR_OP TUPLES = {(COR_AN_ID: $v_{i1}$), (DA_OR_OP_ID: $v_{i2}$), . . . , (Attribute$_j$: $v_{ij}$), . . . , (Attribute$_n$: $v_{in}$)}, where:
$1 \leq i \leq m$ is the number of tuples in the set,
$2 \leq j \leq n$ is the number of attributes that define the relation,
$v_{i1} \in$ CORRELATED_ANALYSES_IDS,
$v_{i2} \in$ DATA_OR_OPERATION_IDS,
$v_{ij} \in$ Domain$_j$,
$v_{in} \in$ Domain$_n$, and
∀ anDaOpIDTuple$_i$, anDaOpIDTuple$_{k \neq i}$ ∈ ANALYSIS CONTEXT-DATA_OR_OP TUPLES:
(anDaOpIDTuple$_k$.COR_AN_ID ≠ anDaOpIDTuple$_i$.COR_AN_ID) ∨
(anDaOpIDTuple$_k$.DA_OR_OP_ID ≠ anDaOpIDTuple$_i$.DA_OR_OP_ID). [COR_AN_ID and DA_OR_OP_ID are key attributes that jointly ensure uniqueness across the tuples with respect to the pair of values in these fields.]

SPEC. 97:

| ANALYSIS CONTEXT-CHANGE DETAILS TUPLE ATTRIBUTES | |
|---|---|
| COR_AN_ID | CHANGE_ID |

+ other attributes

ANALYSIS CONTEXT-CHANGE DETAILS TUPLES = {(COR_ANJD: $v_{i1}$), (CHANGE ID: $v_{i2}$), . . . , (Attribute$_j$: $v_{ij}$), . . . , (Attribute$_n$: $v_{in}$)}, where:
$1 \leq i \leq m$ is the number of tuples in the set,
$2 \leq j \leq n$ is the number of attributes that define the relation,
$v_{i1} \in$ CORRELATED_ANALYSES_IDS,
$v_{i2} \in$ CHANGE_IDS,
$v_{ij} \in$ Domain$_j$,
$v_{in} \in$ Domain$_n$, and
∀ anChIDTuple$_i$, anChIDTuple$_{k \neq i}$ ∈ ANALYSIS CONTEXT-CHANGE_ID TUPLES:
(anChIDTuple$_k$.COR_AN_ID ≠ anChIDTuple$_i$.COR_AN_ID) ∨ (anChIDTuple$_k$.CHANGE_ID ≠ anChIDTuple$_i$.CHANGE_ID). [COR_AN_ID and CHANGE_ID are key attributes that jointly ensure uniqueness across the tuples with respect to the pair of values in these fields.]

SPEC. 98:

| ANALYSIS CONTEXT-IMPACT PARTITION TUPLE ATTRIBUTES | |
|---|---|
| COR_AN_ID | IMP_PAR_ID |
| + other attributes | |

ANALYSIS CONTEXT-IMPACT PARTITION TUPLES = {(COR_AN_ID: $v_{i1}$), (IMP_PAR_ID: $v_{i2}$), ..., (Attribute$_j$: $v_{ij}$), ..., (Attribute$_n$: $v_{in}$)}, where:
$1 \le i \le m$ is the number of tuples in the set,
$2 \le j \le n$ is the number of attributes that define the relation,
$v_{i1} \in$ CORRELATED_ANALYSES_IDS,
$v_{i2} \in$ IMP_PAR_IDS,
$v_{ij} \in$ Domain$_j$,
$v_{in} \in$ Domain$_n$, and
$\forall$ anImParIDTuple$_i$, anImParIDTuple$_{k \ne i} \in$ ANALYSIS CONTEXT-IMPACT PARTITION TUPLES: anImParIDTuple$_k$.IMP_PAR_ID $\ne$ anImParIDTuple$_i$.IMP_PAR_ID. [IMP_PAR_ID is a key attribute ensuring uniqueness across the tuples with respect to the values in this field.]

SPEC. 99:

| ANALYSIS CONTEXT-ANALYSIS DECISION TUPLE ATTRIBUTES | |
|---|---|
| COR_AN_ID | AN_DEC_ID |
| + other attributes | |

ANALYSIS CONTEXT-ANALYSIS DECISION TUPLES = {(COR_AN_ID: $v_{i1}$), (AN_DEC_ID: $v_{i2}$), ..., (Attribute$_j$: $v_{ij}$), ..., (Attribute$_n$: $v_{in}$)}, where:
$1 \le i \le m$ is the number of tuples in the set,
$2 \le j \le n$ is the number of attributes that define the relation,
$v_{i1} \in$ CORRELATED_ANALYSES_IDS,
$v_{i2} \in$ ANALYSIS_DECISION_IDS,
$v_{ij} \in$ Domain$_j$,
$vi_n \in$ Domain$_n$, and
$\forall$ anDecIDTuple$_i$, anDecIDTuple$_{k \ne i} \in$ ANALYSIS CONTEXT-ANALYSIS DECISION TUPLES: anDecIDTuple$_k$.AN_DEC_ID $\ne$ anDecIDTuple$_i$.AN_DEC_ID. [AN_DEC_ID is a key attribute that ensures uniqueness across the tuples with respect to the values in this field.]

SPEC. 100:
PASSWORDS={password∈String|ValidPassword(password)=True}, where ValidPassword is a function that returns true if the format of passwordis correct or false otherwise.

SPEC. 101:
NAMES={name∈String|(ValidName(name)=True)}, where ValidName is a function that returns true if the format of name is correct or false otherwise.

SPEC. 102:

| USER PROFILE TUPLE ATTRIBUTES | | |
|---|---|---|
| USER_ID | PASSWORD | NAME |
| + other attributes | | |

USER PROFILE TUPLES = {(USER_ID: $v_{i1}$), (PASSWORD: $v_{i2}$), (NAME: $v_{i3}$), ..., (Attribute$_j$: $v_{ij}$), ..., (Attribute$_n$: $v_{in}$)), where:
$1 \le i \le m$ is the number of tuples in the set,
$3 \le j \le n$ is the number of attributes that define the relation,
$v_{i1} \in$ USER_IDS,
$v_{i2} \in$ PASSWORDS,
$v_{i3} \in$ NAMES,
$v_{ij} \in$ Domain$_j$,
$v_{in} \in$ Domain$_n$, and
$\forall$ userPfTuple$_i$, userPfTuple$_{k \ne i} \in$ USER PROFILE TUPLES: userPfTuple$_k$.USER_ID $\ne$ userPfTuple$_i$.USER_ID. [USER_ID is a key attribute that ensures uniqueness across the tuples with respect to the values in this field.]

SPEC. 103:

| USER SESSION TUPLE ATTRIBUTES | | | | | | | |
|---|---|---|---|---|---|---|---|
| USER_ID | COR_AN_ID | ANALYSIS | SDATE | EDATE | STIME | ETIME | TOTIME |

+ other attributes

USER SESSION TUPLES = {(USER_ID: $v_{i1}$), (COR_AN_ID: $v_{i2}$), (ANALYSIS: $v_{i3}$), (SDATE: $v_{i4}$), (EDATE: $v_{i5}$), (STIME: $v_{i6}$), (ETIME: $v_{i7}$), (EDATE: $v_{i8+L}$), ..., $_{(Attribute_j)}$), ..., (Attribute$_n$: $v_{in}$)},
where:
$1 \leq i \leq m$ is the number of tuples in the set,
$8 \leq j \leq n$ is the number of attributes that define the relation,
$v_{i1} \in$ USER_IDS,
$v_{i2} \in$ CORRELATED_ANALYSES_IDS,
$v_{i3} \in$ ANALYSES,
$v_{i4} \in$ DATE,
$v_{i5} \in$ DATE,
$v_{i6} \in$ TIME,
$v_{i7} \in$ TIME,
$v_{i8} \in$ TOTAL_TIME,
$v_{ij} \in$ Domain$_j$,
$v_{in} \in$ Domain$_n$, and
$\forall$ userSeTuple$_i \in$ USER SESSION TUPLES: AfterTimeInstance(userSeTuple$_i$.SDATE, userSeTuple$_i$.EDATE, userSeTuple$_i$.STIME, userSeTuple$_i$.ETIME)= true, where AfterTimeInstance is a function that returns true if the point in time indicated by EDATE and ETIME is after the point in time represented by SDATE and STIME.
$\forall$ userSeTuple$_i$, userSeTuple$_{k \neq i} \in$ USER SESSION TUPLES: (userSeTuple$_k$.USER_ID $\neq$ userSeTuple$_i$.USER_ID) $\lor$ (userSeTuple$_k$.COR_AN_ID $\neq$ userSeTuple$_i$.COR_AN_ID) $\lor$ (userSeTuple$_k$.ANALYSIS $\neq$ userSeTuple$_i$.ANALYSIS) $\lor$ (userSeTuple$_k$.SDATE $\neq$ userSeTuple$_i$.SDATE) $\lor$ (userSeTuple$_k$.STIME $\neq$ userSeTuple$_i$.STIME) $\lor$ (userSeTuple$_k$.EDATE $\neq$ userSeTuple$_i$.EDATE) $\lor$ (userSeTuple$_k$.ETIME $\neq$ userSeTuple$_i$.ETIME). [USER_ID, COR_AN_ID, ANALYSIS, SDATE, STIME, EDATE, and ETIME jointly ensure uniqueness across the tuples with respect to the values in these fields.]
$\forall$ userSeTuple$_i$, userSeTuple$_{k \neq i} \in$ USER SESSION TUPLES: (userSeTuple$_k$.USER_ID = userSeTuple$_i$.USER_ID) $\rightarrow$ NotOverlapping(userSeTuple$_i$.SDATE, userSeTuple$_i$.EDATE, userSeTuple$_i$.STIME, userSeTuple$_i$.ETIME, userSeTuple$_k$.SDATE, userSeTuple$_k$.EDATE, userSeTuple$_k$.STIME, userSeTuple$_k$.ETIME) = true, where NotOverlapping is a function that returns true if the input time periods for userSeTuple$_i$ and userSeTuple$_k$ do not overlap and false otherwise. The invention tracks a specific user's activity on one analysis at a time.

What is claimed is:

1. A computer-implemented method for designing an evolvable composition of reusable software components, comprising receiving textual requirement statements for a software solution or part thereof, the textual requirement statements comprising a set of statements about required item-features and action-features for the software solution or part thereof, and performing an analysis, the analysis comprising:

analyzing required solution elements by:
a phase 1 analysis of nouns and verbs in requirements, comprising:
for each requirement statement (RS):
inputting a unique identifier (REQ_ID) for the RS;
inputting each noun or noun phrase that is unique with respect to the RS; associating a RSNOUN attribute value with each inputted noun or noun phrase;
generating a REQ_ID-RSNOUN tuple for each inputted noun or noun phrase;
inputting each verb or verb phrase that is unique with respect to the RS; associating a RSVERB attribute value with each inputted verb or verb phrase;
generating a REQ_ID-RSVERB tuple for each inputted verb or verb phrase;
identifying primary candidate nouns and primary candidate verbs by:
for all REQ_ID-RSNOUN tuples having an identical RSNOUN attribute value: generating a PRIMARY CANDIDATE NOUN tuple to be associated with a primary candidate noun; assigning the identical RSNOUN attribute value to a NOUN attribute of the primary candidate noun's associated PRIMARY CANDIDATE NOUN tuple;
for all REQ_ID-RSVERB tuples having an identical RSVERB attribute value: generating a PRIMARY CANDIDATE VERB tuple to be associated with a primary candidate verb; assigning the identical RSVERB attribute value to a VERB attribute of the primary candidate verb's associated PRIMARY CANDIDATE VERB tuple;
a phase 2 analysis of required data and operations, comprising:
mapping each primary candidate noun to a unique required datum in the software solution by:
generating a DATA tuple to be associated with the unique required datum and correlating the unique required datum with the primary candidate noun by assigning the NOUN attribute value of the primary candidate noun's associated PRIMARY CANDIDATE NOUN tuple to the NOUN attribute of the unique required datum's associated DATA tuple; using a DATA_ID attribute of the DATA tuple to identify the DATA tuple and its associated datum; using a KEEP_FLAG attribute of the DATA tuple to designate the associated datum's status with respect to the software solution and to select DATA tuples and their associated data based on the KEEP_FLAG attribute value;

generating a DATA_ID-REQ_ID tuple for each different REQ_ID attribute value of a REQ_ID-RSNOUN tuple whose RSNOUN attribute value or PCNOUN attribute value is identical to the NOUN attribute value of the unique required datum's associated DATA tuple, thereby correlating the unique required datum with the requirement statements corresponding to the primary candidate noun mapped to the unique required datum;

mapping each primary candidate verb to a unique required operation in the software solution by:

generating an OPERATION tuple to be associated with the unique required operation and correlating the unique required operation with the primary candidate verb by assigning the VERB attribute value of the primary candidate verb's associated PRIMARY CANDIDATE VERB tuple to the VERB attribute of the unique required operation's associated OPERATION tuple; using an OP_ID attribute of the OPERATION tuple to identify the OPERATION tuple and its associated operation; using the KEEP_FLAG attribute of the OPERATION tuple to designate the associated operation's status with respect to the software solution and to select OPERATION tuples and their associated operations based on the KEEP_FLAG attribute value;

generating an OP_ID-REQ_ID tuple for each different REQ_ID attribute value of a REQ_ID-RSVERB tuple whose RSVERB attribute value or PCVERB attribute value is identical to the VERB attribute value of the unique required operation's associated OPERATION tuple, thereby correlating the unique required operation with the requirement statements corresponding to the primary candidate verb mapped to the unique required operation;

generating a DATA-OPERATION tuple for each unique required operation that operates solely on a specific unique required datum, whereby the design and implementation of the unique required operation is dependent on the design and implementation of the specific unique required datum;

identifying reuse candidates by generating a REUSE CANDIDATE tuple for each unique required datum or unique required operation specifically designated for reuse within a target software solution or across related software solutions; using a DA_OR_OP_ID attribute of the REUSE CANDIDATE tuple to correlate the reuse candidate with a specific DATA tuple and its associated datum or with a specific OPERATION tuple and its associated operation;

analyzing change and evolution of the software solution by:

identifying expected and feasible or feasible (EFF) changes that would be made to requirements, requirements and solution elements, or solution elements (to RRSS), whereby each solution element is a unique required datum or is a unique required operation and whereby the EFF changes would be made during the evolution of the software solution, by:

for each identified EFF change: generating a CHANGE DETAILS tuple; using a CHANGE_ID attribute of the CHANGE DETAILS tuple to identify the CHANGE DETAILS tuple and its associated EFF change; using a LIKELIHOOD attribute of the CHANGE DETAILS tuple to indicate a likelihood that the associated EFF change will be implemented to evolve the software solution;

identifying the solution elements that would be impacted by the EFF changes by:

for each EFF change: identifying a change impact relationship and generating a CHANGE IMPACT RELATIONSHIP tuple for each solution element that a software developer would need to review and potentially alter to implement the EFF change during the evolution of the software solution;

using an ISSUE attribute, a DECISION attribute, and a STATUS attribute of CHANGE IMPACT DECISION tuples to track change impact relationship decisions;

partitioning a target set of solution elements into multi-level software encapsulations that localize the impact of a target set of EFF changes by:

specifying target EFF changes by selecting the entire set, or part thereof, of the EFF changes identified in a prerequisite analysis of the EFF changes to RRSS; using a USER_ID attribute of TARGET LIKELIHOOD tuples to associate parameters used to select target EFF changes with a specific user;

specifying target solution elements by selecting the entire set, or part thereof, of the solution elements resulting from a prerequisite analysis of the unique required data and of the unique required operations; using the USER_ID attribute of TARGET KEEP FLAG tuples to associate parameters used to select target solution elements with a specific user;

generating an IMPACT PARTITION tuple to be associated with an impact partition of target solution elements that would be impacted by target EFF changes; generating or inputting a unique value for an IMP_PAR_ID attribute of the IMPACT PARTITION tuple to identify the IMPACT PARTITION tuple and its associated impact partition;

generating a set of small software components that partition the target solution elements that would be impacted by the target EFF changes during evolution of the software solution, whereby each impacted small component comprises one or more impacted target solution elements and each target solution element contained within a specific impacted small component would be impacted by each target EFF change that is associated with the impacted small component, by:

for each impacted small component: generating an IMPACTED SMALL COMPONENT tuple; generating or inputting a unique value for an IMP_SM_COMP_ID attribute of the IMPACTED SMALL COMPONENT tuple to identify the IMPACTED SMALL COMPONENT tuple and its associated impacted small component;

for each target solution element contained within an impacted small component: generating an IMPACTED SMALL COMPONENT-DATA_OR_OP tuple to correlate the target solution element and its associated DATA tuple or the target solution element and its associated OPERATION tuple with the impacted small component that contains the target solution element and its associated IMPACTED SMALL COMPONENT tuple;

generating a set of large software components that partition the impacted small components, whereby each impacted large component comprises the impacted small components whose constituent target solution elements would be impacted by one or more of the target EFF changes associated with the impacted large component, by:

for each impacted large component: generating an IMPACTED LARGE COMPONENT tuple; generating or inputting a unique value for an IMP_LG_COMP_ID attribute of the IMPACTED LARGE COMPONENT tuple to identify the IMPACTED LARGE COMPONENT tuple and its associated impacted large component;

for each impacted small component contained within an impacted large component: generating an IMPACTED LARGE COMPONENT-IMPACTED SMALL COMPONENT tuple to associate the impacted small component and its associated IMPACTED SMALL COMPONENT tuple with the impacted large component that contains the impacted small component and its associated IMPACTED LARGE COMPONENT tuple;

generating a NO IMPACT PARTITION tuple to be associated with a no impact partition of target solution elements that would not be impacted by target EFF changes; generating or inputting a unique value for a NIMP_PAR_ID attribute of the NO IMPACT PARTITION tuple to identify the NO IMPACT PARTITION tuple and its associated no impact partition;

for each target solution element that would not be impacted by any of the target EFF changes: generating a NOT IMPACTED SMALL COMPONENT tuple to be associated with a not impacted small component consisting of the solution element;

for each not impacted small component: generating a NOT IMPACTED LARGE COMPONENT tuple to be associated with a not impacted large component consisting of the not impacted small component, thus paralleling the multi-level encapsulation of the target solution elements that would be impacted by the target EFF changes.

2. The method recited in claim 1, further comprising refining primary candidate nouns and primary candidate verbs to eliminate redundant, redundant and ambiguous, or ambiguous candidates and to standardize primary candidate nouns used to describe required item-features and primary candidate verbs used to describe required action-features by:

merging and deleting or deleting primary candidate nouns that are redundant by combining and deleting or deleting the associated PRIMARY CANDIDATE NOUN tuples;

renaming primary candidate nouns that are ambiguous, ambiguous and non-standard, or non-standard by changing the NOUN attribute values of the associated PRIMARY CANDIDATE NOUN tuples;

merging and deleting or deleting primary candidate verbs that are redundant by combining and deleting or deleting the associated PRIMARY CANDIDATE VERB tuples;

renaming primary candidate verbs that are ambiguous, ambiguous and non-standard, or non-standard by changing the VERB attribute values of the associated PRIMARY CANDIDATE VERB tuples.

3. The method recited in claim 2, further comprising identifying and using standard primary candidate noun synonyms and standard primary candidate verb synonyms by:

for each ordered pair of primary candidate nouns that are synonyms: preloading or generating a NOUN SYNONYM tuple; using a STANDARD attribute of the associated NOUN SYNONYM tuple to designate that a first element in an ordered pair of noun synonyms is a standard noun; searching NOUN SYNONYM tuples to locate and reuse primary candidate nouns that are synonyms and standard nouns;

for each ordered pair of primary candidate verbs that are synonyms: preloading or generating a VERB SYNONYM tuple; using the STANDARD attribute of the associated VERB SYNONYM tuple to designate that a first element in an ordered pair of verb synonyms is a standard verb; searching VERB SYNONYM tuples to locate and reuse primary candidate verbs that are synonyms and standard verbs.

4. The method recited in claim 2, further comprising enabling identification and reconstruction of deleted primary candidates and facilitating traceability between refined primary candidates and their correlated requirement statements by:

designating the deletion of a primary candidate noun via a PCDELETED attribute of the REQ_ID-RSNOUN tuples that have RSNOUN attribute values identical to the primary candidate noun; using the PCDELETED attribute of REQ_ID-RSNOUN tuples with identical RSNOUN attribute values to identify a primary candidate noun that was deleted and generating a new PRIMARY CANDIDATE NOUN tuple to reconstruct the primary candidate noun;

recording a new name for a primary candidate noun in the PCNOUN attribute of the REQ_ID-RSNOUN tuples that have RSNOUN attribute values identical to a former name of the primary candidate noun; using the PCNOUN attribute to locate the REQ_ID-RSNOUN tuples that correspond to the renamed primary candidate noun and using the REQ_ID attribute values of these REQ_ID-RSNOUN tuples to locate the requirement statements that correlate to the primary candidate noun;

designating the deletion of a primary candidate verb via the PCDELETED attribute of the REQ_ID-RSVERB tuples that have RSVERB attribute values identical to the primary candidate verb; using the PCDELETED attribute of REQ_ID-RSVERB tuples with identical RSVERB attribute values to identify a primary candidate verb that was deleted and generating a new PRIMARY CANDIDATE VERB tuple to reconstruct the primary candidate verb;

recording a new name for a primary candidate verb in the PCVERB attribute of the REQ_ID-RSVERB tuples that have RSVERB attribute values identical to the former name of the primary candidate verb; using the PCVERB attribute to locate the REQ_ID-RSVERB tuples that correspond to the renamed primary candidate verb and using the REQ_ID attribute values of these REQ_ID-RSVERB tuples to locate the requirement statements that correlate to the primary candidate verb.

5. The method recited in claim 1, further comprising characterizing each unique required datum and each unique required operation via a plurality of attributes that compose the associated DATA tuple or the associated OPERATION tuple by:

generating or inputting a unique DATA_ID attribute value to identify the datum or a unique OP_ID value to identify the operation;

inputting a USE attribute value that describes a purpose of the datum or operation;

inputting a FUNCTION attribute value that outlines the operation's required actions including directives or calls to other operations in the order of their execution;

assigning a KEEP_FLAG attribute value to indicate the status of the datum or operation with respect to its inclusion in the software solution; selecting keep flag values from a plurality of standard terms comprising "ONGOING" to indicate the datum or operation being part of the software solution going forward, "REF" to indicate the datum or operation being used for reference only as part of a design rationale, "REC" to indicate that the datum or operation has been recomposed, and other terms;

generating, inputting, or assigning values for other attributes that enable a software developer to understand, implement, and recall required behavior and design rationale for the required datum or for the required operation.

6. The method recited in claim 1, further comprising characterizing each newly identified reuse candidate via a plurality of attributes that compose the associated REUSE CANDIDATE tuple by:

assigning the value of the DATA_ID attribute of the corresponding datum's associated DATA tuple or the value of the OP_ID attribute of the corresponding operation's associated OPERATION tuple to the DA_OR_OP_ID attribute of the REUSE CANDIDATE tuple;

assigning the value of the NOUN attribute of the corresponding datum's associated DATA tuple or the value of the VERB attribute of the corresponding operation's associated OPERATION tuple as a default value for a NAME attribute of the REUSE CANDIDATE tuple;

assigning a value of "ACROSS", "WITHIN", or another standard term to a REUSE_SCOPE attribute of the REUSE CANDIDATE tuple to designate an expected scope for reuse;

inputting or assigning a value to a LIBRARY_REFERENCE attribute of the REUSE CANDIDATE tuple that facilitates location of the corresponding datum's implementation or of the corresponding operation's implementation;

generating, inputting, or assigning values for other attributes that help the software developer to identify and apply reuse candidates.

7. The method recited in claim 5, further comprising refining the unique required data and the unique required operations to satisfy required software solution qualities, whereby software solution qualities that are required comprise changeability and reuse and software solution qualities that may be required comprise adaptability, performance, security, and others, by:

decomposing large-effect parent data into smaller-effect child data and large-effect parent operations into smaller-effect child operations by:

for each new child datum:
generating a new DATA tuple; assigning a standard value or inputting another value for the NOUN attribute of the new DATA tuple to name the smaller datum; using information associated with a parent datum to determine an appropriate USE attribute value for the child datum; assigning the value "ONGOING" to the new DATA tuple's KEEP_FLAG attribute;

generating a DATA PARENT-CHILD tuple to associate the child datum and its associated DATA tuple with the parent datum and its associated DATA tuple; for each requirement statement associated with the parent datum that the child helps to satisfy: generating a DATA_ID-REQ_ID tuple to associate the requirement restatement with the child datum;

for each new child operation:
generating a new OPERATION tuple; assigning a standard value or inputting another value for the VERB attribute of the new OPERATION tuple to name the smaller operation; using information associated with a parent operation to determine appropriate USE and FUNCTION attribute values for the child operation; assigning the value "ONGOING" to the new OPERATION tuple's KEEP_FLAG attribute;

generating an OPERATION PARENT-CHILD tuple to associate the child operation and its associated operation tuple with the parent operation and its associated operation tuple; for each requirement statement associated with the parent operation that the child helps to satisfy: generating an OP_ID-REQ_ID tuple to associate the requirement restatement with the child operation;

recharacterizing the parent datum via modification of the parent datum's associated DATA tuple or recharacterizing the parent operation via modification of the parent operation's associated OPERATION tuple by:

replacing each required action in the parent operation's FUNCTION attribute value to be performed by a child operation with a name of the child operation consisting of the VERB attribute value of the child operation's associated OPERATION tuple;

assigning a value to a PARENT_RELATIONSHIP attribute to indicate a relationship between the parent datum and its child datum or child data or between a parent operation and its child operation or child operations; selecting PARENT_RELATIONSHIP attribute values from a plurality of standard terms comprising "G-S" to indicate a general-to-specific relationship, "W-P" to indicate a whole-part relationship, and other terms;

changing the KEEP_FLAG attribute value to "REF" if the parent datum or parent operation will not be needed in the software solution;

reducing redundancy through reuse of data and operations within the software solution by:

assigning the value "REF" to the KEEP_FLAG attribute of a redundant datum's associated DATA tuple or of a redundant operation's associated OPERATION tuple;

replacing each reference to a redundant operation within the FUNCTION attribute value of a referencing operation's associated OPERATION tuple with a name for the operation to be reused in place of the redundant operation.

8. The method recited in claim 7, further comprising enabling recomposition of child data and of child operations by:

verifying with respect to a current parent-child and referencing structure within the software solution whether specific data or operations should be recomposed;

assigning the value "REC" to indicate recomposed or recombined with parent to the KEEP_FLAG attribute value of each recomposed child's associated DATA tuple or OPERATION tuple;

replacing each reference to a recomposed child operation in the FUNCTION attribute value of a parent operation's associated OPERATION tuple by the required action performed by the child operation;

assigning the value "ONGOING" to the KEEP_FLAG attribute of the DATA tuple associated with each parent datum of each recomposed child datum;

assigning the value "ONGOING" to the KEEP_FLAG attribute of the OPERATION tuple associated with each parent operation of each recomposed child operation.

9. The method recited in claim 1, further comprising describing each EFF change, eliminating redundant EFF changes, and reusing EFF change descriptions across analyses of change and evolution that involve different sets of requirement statements or alternative change likelihood values by:

characterizing each EFF change via a plurality of attributes composing the associated CHANGE DETAILS tuple by:
generating or inputting a unique CHANGE_ID attribute value to identify the EFF change;
inputting a detailed DESCRIPTION attribute value to describe the nature of the EFF change;
assigning a LIKELIHOOD attribute value to indicate the current likelihood that the EFF change will be implemented to evolve the software solution; selecting likelihood values from a plurality of standard terms comprising "EXPECTED", "LIKELY", "FEASIBLE", "NOT EXPECTED", and other terms;
generating, inputting, or assigning values for other attributes that help the software developer to identify, apply, and reuse change detail descriptions;
for each keyword used to search for a specific change and its associated CHANGE DETAILS tuple: preloading or generating a CHANGE-KEYWORD tuple; using CHANGE-KEYWORD tuples to locate and reuse change descriptions; eliminating redundant change descriptions by deleting or archiving the associated CHANGE DETAILS tuples.

10. The method recited in claim 1, further comprising describing each change impact relationship via a plurality of attributes composing the associated CHANGE IMPACT RELATIONSHIP tuple by:
assigning the CHANGE_ID attribute value of the CHANGE DETAILS tuple associated with a specific EFF change that would impact a specific solution element to the CHANGE_ID attribute;
assigning the DATA_ID attribute value of the DATA tuple or the OP_ID attribute value of the OPERATION tuple associated with the specific solution element that would be impacted by the specific EFF change to the DA_OR_OP_ID attribute;
selecting a CHANGE RELATIONSHIP attribute value from a plurality of standard terms comprising "ADD", "MODIFY", "DELETE", "UNCERTAIN", and other terms that describe a type of change that would be needed to the specific solution element that would be impacted by the specific EFF change;
generating, inputting, or assigning values for other attributes that help the software developer to understand the impact that EFF changes would have on the solution elements and to make decisions regarding the evolution of the software solution.

11. The method recited in claim 1, further comprising generating a CHANGE IMPACT DECISION tuple for each decision that users identify as needing to be made about whether a specific EFF change would impact a specific solution element and about the nature of the impact; characterizing and tracking change impact decisions to be made via a plurality of attributes comprising the CHANGE IMPACT DECISION tuple associated with each decision by:
assigning the CHANGE_ID attribute value of the CHANGE DETAILS tuple associated with the specific EFF change for which a change impact decision is needed to the CHANGE_ID attribute;
assigning the DATA_ID attribute value of the DATA tuple or the OP_ID attribute value of the OPERATION tuple associated with the specific solution element for which the change impact decision is needed to the DA_OR_OP_ID attribute;
inputting an ISSUE attribute value to describe the issue or decision to be made about the impact of the EFF change;
inputting a DECISION attribute value to describe the change impact decision that is made and the rationale for the decision;
selecting a STATUS attribute value from a plurality of standard terms comprising "OPEN", "CLOSED", "DISMISSED", and other terms;
generating, inputting, or assigning values for other attributes that help the software developer to track and manage change impact decisions.

12. The method recited in claim 1, further comprising specifying the target set of EFF changes via selection from a default set of EFF changes identified in the prerequisite analysis of the EFF changes to RRSS by:
enabling users to specify the target EFF changes by directly selecting the associated CHANGE DETAILS tuples or by specifying target LIKELIHOOD attribute values used to select the associated CHANGE DETAILS tuples;
generating a TARGET LIKELIHOOD tuple for each valid user-specified likelihood value or for each standard likelihood value; assigning a valid user ID to the USER_ID attribute of the TARGET LIKELIHOOD tuples to designate the target likelihood values for reuse by a specific user.

13. The method recited in claim 1, further comprising specifying the target set of solution elements via selection from a default set of solution elements resulting from the prerequisite analysis of the unique required data and of the unique required operations by:
enabling users to specify the target solution elements by directly selecting the associated DATA tuples, DATA tuples and OPERATION tuples, or OPERATION tuples or by specifying target KEEP_FLAG attribute values used to select the associated tuples;
generating a TARGET KEEP FLAG tuple for each valid user-specified keep flag value or for each standard keep flag value; assigning a valid user ID to the USER_ID attribute of the TARGET KEEP FLAG tuples to designate the target keep flag values for reuse by a specific user.

14. The method recited in claim 11, further comprising verifying the target EFF changes, target solution elements, and corresponding target change impact relationships to be used in generating the impact partition by:
  verifying that each EFF change identified in the prerequisite analysis of the EFF changes to RRSS is associated with an existing CHANGE DETAILS tuple that is assigned a valid CHANGE_ID attribute value and a valid LIKELIHOOD attribute value; providing for deletion of EFF changes associated with missing or invalid tuples from the target set of EFF changes;
  checking the solution elements identified in the prerequisite analysis of the unique required data and of the unique required operations by:
    verifying that each solution element of type datum is associated with an existing DATA tuple that is assigned a valid DATA_ID attribute value and a valid KEEP_FLAG attribute value;
    verifying that each solution element of type operation is associated with an existing OPERATION tuple that is assigned a valid OP_ID attribute value and a valid KEEP_FLAG attribute value;
    providing for deletion of solution elements associated with missing or invalid tuples from the target set of solution elements;
  using the CHANGE IMPACT DECISION tuples associated with the target EFF changes and the target solution elements to identify corresponding change impact relationships that have not been closed or resolved; providing for exclusion of change impact relationships involving open issues from the target change impact relationships to be used in a subsequent generation of the impact partition by removing the associated CHANGE IMPACT RELATIONSHIP tuples from a target set of CHANGE IMPACT RELATIONSHIP tuples used to generate the impact partition.

15. The method recited in claim 1, further comprising enabling the generation, storage, retrieval, and comparison of alternative impact partitions by:
  using the IMP_PAR_ID attribute value of the IMPACT PARTITION tuple associated with a specific impact partition to correlate a plurality of tuples associated with parameters and results of the impact partition by:
    for each target EFF change used to generate the impact partition:
      generating an IMPACT PARTITION-CHANGE tuple and assigning the IMP_PAR_ID attribute value of the impact partition's associated IMPACT PARTITION tuple to the IMP_PAR_ID attribute of the IMPACT PARTITION-CHANGE tuple;
      retaining knowledge of the target EFF change's current likelihood by assigning the LIKELIHOOD attribute value of the target EFF change's associated CHANGE DETAILS tuple to the LIKELIHOOD attribute of the IMPACT PARTITION-CHANGE tuple;
    for each target solution element used to generate the impact partition:
      generating an IMPACT PARTITION-DATA_OR_OP tuple and assigning the IMP_PAR_ID attribute value of the impact partition's associated IMPACT PARTITION tuple to the IMP_PAR_ID attribute of the IMPACT PARTITION-DATA_OR_OP tuple;
      retaining knowledge of the target solution element's status by assigning the KEEP_FLAG attribute value of the associated DATA tuple or associated OPERATION tuple to the KEEP_FLAG attribute of the IMPACT PARTITION-DATA_OR_OP tuple;
      using an IMPACTED attribute of the IMPACT PARTITION-DATA_OR_OP tuple to denote whether the target solution element would be impacted by one or more of the target EFF changes used to generate the impact partition;
    for each impacted large component composing the impact partition:
      generating an IMPACT PARTITION-IMPACTED LARGE COMPONENT tuple and assigning the IMP_PAR_ID attribute value of the impact partition's associated IMPACT PARTITION tuple to the IMP_PAR_ID attribute of the IMPACT PARTITION-IMPACTED LARGE COMPONENT tuple;
      using the IMP_LG_COMP_ID attribute of the IMPACT PARTITION-IMPACTED LARGE COMPONENT tuple to provide a link to the impacted large component's associated IMPACTED LARGE COMPONENT tuple and to corresponding IMPACTED LARGE COMPONENT-IMPACTED SMALL COMPONENT tuples;
      using IMP_SM_COMP_ID attribute values of corresponding IMPACTED LARGE COMPONENT-IMPACTED SMALL COMPONENT tuples to locate IMPACTED SMALL COMPONENT tuples associated with the impacted small components contained within the impacted large component;
      using IMP_SM_COMP_ID attribute values of IMPACTED SMALL COMPONENT tuples associated with the impacted small components contained within the impacted large component to locate corresponding IMPACTED SMALL COMPONENT-DATA_OR_OP tuples and using DA_OR_OP_ID attribute values of corresponding IMPACTED SMALL COMPONENT-DA_OR_OR tuples to identify the target solution elements that compose each impacted small component;
  using the NIMP_PAR_ID attribute value of the NO IMPACT PARTITION tuple associated with a specific no impact partition to correlate a plurality of tuples associated with the results of the no impact partition by:
    for each not impacted large component composing the no impact partition:
      generating a NO IMPACT PARTITION-NOT IMPACTED LARGE COMPONENT tuple, whereby a NIMP_LG_COMP_ID attribute of the NO IMPACT PARTITION-NOT IMPACTED LARGE COMPONENT tuple provides a link to the not impacted large component's associated NOT IMPACTED LARGE COMPONENT tuple;
      using a NIMP_SM_COMP_ID attribute value of the associated NOT IMPACTED LARGE COMPONENT tuple to locate a NOT IMPACTED SMALL COMPONENT tuple associated with the not impacted small component contained within the not impacted large component; using the NOT IMPACTED SMALL COMPONENT tuple's DA_OR_OP_ID attribute value to identify the target solution element contained within the associated not impacted small component;
  associating each no impact partition with its prerequisite impact partition by correlating the IMP_PAR_ID attribute values of the associated NO IMPACT PARTITION tuple and IMPACT PARTITION tuple.

16. The method recited in claim 1, further comprising generating unique change signature values and a change signature index to facilitate rapid analysis of the scope and nature of the impact of target EFF changes on impacted large components and impacted small components composing an impact partition by:

for each impacted large component's associated IMPACTED LARGE COMPONENT tuple: generating and assigning a unique value to an IMP_LG_COMP_CH_SIGNATURE attribute to indicate specific target EFF changes associated with the impacted large component and the scope of the impact of these target EFF changes across the target solution elements contained within the impacted small components that comprise the impacted large component;

for each impacted small component's associated IMPACTED SMALL COMPONENT tuple:

generating and assigning a unique value to an IMP_SM_COMP_CH_SIGNATURE attribute to indicate specific target EFF changes associated with the impacted small component and the scope of the impact of these target EFF changes across the target solution elements contained within the impacted small component;

generating and communicating to users the change signature index that shows the impact of the target EFF changes associated with a specific impact partition by:

for each target EFF change associated with the impact partition:

indicating the CHANGE_ID attribute value of the CHANGE DETAILS tuple associated with the target EFF change;

indicating the IMP_LG_COMP_CH_SIGNATURE attribute value of the IMPACTED LARGE COMPONENT tuple associated with the impacted large component that would be impacted by the target EFF change;

indicating the IMP_SM_COMP_CH_SIGNATURE attribute values of the IMPACTED SMALL COMPONENT tuples associated with the impacted small components that are contained within the impacted large component and whose constituent target solution elements would be impacted by the target EFF change.

17. The method recited in claim 9, further comprising facilitating analysis of the scope of the impact of target EFF changes across one or more software solutions designed using impact partition analyses that target specific EFF changes by:

for each target EFF change associated with an impact partition analysis:

for each impacted small component resulting from the impact partition analysis and impacted by the target EFF change: generating a CHANGE-IMPACTED SMALL COMPONENT tuple to correlate the target EFF change and its associated CHANGE DETAILS tuple with the impacted small component and its associated IMPACTED SMALL COMPONENT tuple;

identifying CHANGE-KEYWORD tuples associated with user-specified keywords that describe the target EFF changes and using the CHANGE_ID attribute values of identified CHANGE-KEYWORD tuples to identify CHANGE DETAILS tuples and CHANGE-IMPACTED SMALL COMPONENT tuples associated with the target EFF changes;

using IMP_SM_COMP_ID attribute values of identified CHANGE-IMPACTED SMALL COMPONENT tuples to identify IMPACTED SMALL COMPONENT tuples associated with impacted small components that would be impacted by the target EFF changes; using other impact partition tuples and correlated attribute values to identify impacted large components that contain identified impacted small components and to identify target solution elements contained within identified impacted small components;

using IMP_PAR_ID attribute values to selectively identify and review impacted large components, impacted small components, and target solution elements associated with specific impact partitions that result from impact partition analyses associated with the target EFF changes.

18. The method recited in claim 1, further comprising generating an ANALYSIS DECISION tuple for each decision to be made regarding an issue identified by users or automatically; characterizing and tracking each decision to be made via a plurality of attributes comprising the ANALYSIS DECISION tuple associated with the decision by:

generating and assigning a unique AN_DEC_ID attribute value to identify the analysis decision and its associated ANALYSIS DECISION tuple;

selecting an ANALYSIS attribute value from a plurality of standard terms describing a type of analysis, the standard terms comprising "Phase1: NV", "REVIEW-Phase1: NV", "Phase2:DO", "REVIEW-Phase2:DO", "ChangeID", "REVIEW-ChangeID", "ChangeImpact", "REVIEW-ChangeImpact", "Partition", "REVIEW-Partition", and other terms;

inputting an ISSUE attribute value to describe the issue or decision to be made;

inputting a DECISION attribute value to describe the decision that is made and the rationale for making the decision;

selecting a STATUS attribute value from a plurality of standard terms comprising "OPEN", "CLOSED", "DISMISSED", and other terms;

generating, inputting, or assigning values for other attributes that help the software developer to track and manage analysis decisions.

19. The method recited in claim 18, further comprising retaining knowledge of analysis inputs and results to facilitate information reuse and reflection on major aspects of developing a software solution via a plurality of contextual tuples comprising:

generating an ANALYSIS CONTEXT tuple for each type of analysis performed within a specified set of correlated analyses; characterizing a context of the analysis via a plurality of attributes by:

generating or inputting a unique COR_AN_ID attribute value to identify the specific set of correlated analyses that include prerequisite analyses, generation of an impact partition, generation of a no impact partition, and analysis reviews;

assigning a user identifier to a LEAD_USER attribute to specify an authorized user who is a designated lead for managing the performance of a specific analysis within the specified set of correlated analyses;

selecting an ANALYSIS attribute value from the plurality of standard terms describing a type of analysis recited in claim 18;

generating, inputting, or assigning date, time, status, and other types of values for additional attributes that help software developers to track and manage analyses within the context of the specified set of correlated analyses;

generating analysis context tuples that each link the specified set of correlated analyses to an input, result, or other type of information related to one or more analyses in the set, comprising:

generating an ANALYSIS CONTEXT-REQ_ID tuple for each input RS for an analysis of nouns and verbs in requirements;

generating an ANALYSIS CONTEXT-DATA_OR_OP tuple for each datum and for each operation identified during an analysis of unique required data and of unique required operations;

generating an ANALYSIS CONTEXT-CHANGE DETAILS tuple for each change identified during an analysis of EFF changes to RRSS;

generating an ANALYSIS CONTEXT-IMPACT PARTITION tuple to link the specified set of correlated analyses to an associated impact partition;

generating an ANALYSIS CONTEXT-ANALYSIS DECISION tuple for each analysis decision identified during the performance of an analysis in the specified set of correlated analyses;

generating other tuples that each link the specified set of correlated analyses to a type of input, result, or related information about an analysis in the specified set of correlated analyses;

using the ANALYSIS CONTEXT tuple and other analysis context-related tuples to archive, retrieve, review, and reuse the inputs, results, and other information related to the performance of a specified set of correlated analyses.

20. The method recited in claim 19, further comprising facilitating the use of analysis context information for project management and enabling user access verification by:

using the ANALYSIS CONTEXT tuples to track and report a lead authorized user in charge of a specific type of analysis within the specified set of correlated analyses, the total time spent by all authorized users working on the analysis, the start and end dates for all work performed on the analysis, and the status of the analysis selected from a set of standard terms comprising "READY_TO_START", "IN_PROGRESS", "ON_HOLD", "COMPLETED", "CANCELLED", and other terms;

generating an ANALYSIS MANAGER tuple for each valid user authorized to manage a specific set of correlated analyses; using the ANALYSIS MANAGER tuples to verify that a specific valid user is authorized to assign other valid users the authority to perform specific types of analyses within the context of the specified set of correlated analyses;

generating an ANALYSIS AUTHORIZED USER tuple for each valid user authorized to perform a specific type of analysis within the specified set of correlated analyses; using the ANALYSIS AUTHORIZED USER tuples to verify that a specific valid user is authorized to perform the specific type of analysis within the specified set of correlated analyses;

generating a USER PROFILE tuple for each valid user who is authorized to perform a selected type of operational feature; using the USER PROFILE tuples to verify that an input user identifier and password are associated with a valid user;

generating a USER SESSION tuple for each interval of time or session in which an authorized user works on an analysis; using the USER SESSION tuples to track and report the total time and specific days on which the authorized user works on a specific analysis of the specified set of correlated analyses.

21. A system for designing an evolvable composition of reusable software components comprising:

a database configured to store textual requirement statements;

a database configured to store REQ_ID-RSNOUN tuples, REQ_ID-RSVERB tuples, PRIMARY CANDIDATE NOUN tuples, and PRIMARY CANDIDATE VERB tuples;

a database configured to store DATA tuples, DATA_ID-REQ_ID tuples, OPERATION tuples, OP_ID-REQ_ID tuples, and DATA-OPERATION tuples;

a database configured to store REUSE CANDIDATE tuples;

a database configured to store CHANGE DETAILS tuples;

a database configured to store CHANGE IMPACT RELATIONSHIP tuples;

a database configured to store CHANGE IMPACT DECISION tuples;

a database configured to store TARGET LIKELIHOOD tuples, TARGET KEEP FLAG tuples, IMPACT PARTITION tuples, IMPACTED SMALL COMPONENT tuples, IMPACTED SMALL COMPONENT-DATA_OR_OP tuples, IMPACTED LARGE COMPONENT tuples, IMPACTED LARGE COMPONENT-IMPACTED SMALL COMPONENT tuples, NO IMPACT PARTITION tuples, NOT IMPACTED SMALL COMPONENT tuples, and NOT IMPACTED LARGE COMPONENT tuples;

a processor configured with instructions executable by the processor, represented by data stored in a non-transitory computer-readable storage medium, for receiving textual requirement statements for a software solution or part thereof, the textual requirement statements comprising a set of statements about required item-features and action-features for the software solution or part thereof, and performing an analysis, the instructions for performing the analysis comprising:

instructions for analyzing required solution elements by:
a phase 1 analysis of nouns and verbs, comprising:
for each requirement statement (RS):
inputting a unique identifier (REQ_ID) for the RS;
inputting each noun or noun phrase that is unique with respect to the RS; associating a RSNOUN attribute value with each inputted noun or noun phrase;
generating a REQ_ID-RSNOUN tuple for each inputted noun or noun phrase;
inputting each verb or verb phrase that is unique with respect to the RS; associating a RSVERB attribute value with each inputted verb or verb phrase;
generating a REQ_ID-RSVERB tuple for each inputted verb or verb phrase;
identifying primary candidate nouns and primary candidate verbs by:
for all REQ_ID-RSNOUN tuples having an identical RSNOUN attribute value: generating a PRIMARY CANDIDATE NOUN tuple to be associated with a primary candidate noun; assigning the identical RSNOUN attribute value to a NOUN attribute of the primary candidate noun's associated PRIMARY CANDIDATE NOUN tuple;

for all REQ_ID-RSVERB tuples having an identical RSVERB attribute value: generating a PRIMARY CANDIDATE VERB tuple to be associated with a primary candidate verb; assigning the identical RSVERB attribute value to a VERB attribute of the primary candidate verb's associated PRIMARY CANDIDATE VERB tuple;

a phase 2 analysis of required data and operations, comprising:

mapping each primary candidate noun to a unique required datum in the software solution by:

generating a DATA tuple to be associated with the unique required datum and correlating the unique required datum with the primary candidate noun by assigning the NOUN attribute value of the primary candidate noun's associated PRIMARY CANDIDATE NOUN tuple to the NOUN attribute of the unique required datum's associated DATA tuple; using a DATA_ID attribute of the DATA tuple to identify the DATA tuple and its associated datum; using a KEEP_FLAG attribute of the DATA tuple to designate the associated datum's status with respect to the software solution and to select DATA tuples and their associated data based on the KEEP_FLAG attribute value;

generating a DATA_ID-REQ_ID tuple for each different REQ_ID attribute value of a REQ_ID-RSNOUN tuple whose RSNOUN attribute value or PCNOUN attribute value is identical to the NOUN attribute value of the unique required datum's associated DATA tuple, thereby correlating the unique required datum with the requirement statements corresponding to the primary candidate noun mapped to the unique required datum;

mapping each primary candidate verb to a unique required operation in the software solution by:

generating an OPERATION tuple to be associated with the unique required operation and correlating the unique required operation with the primary candidate verb by assigning the VERB attribute value of the primary candidate verb's associated PRIMARY CANDIDATE VERB tuple to the VERB attribute of the unique required operation's associated OPERATION tuple; using an OP_ID attribute of the OPERATION tuple to identify the OPERATION tuple and its associated operation; using the KEEP_FLAG attribute of the OPERATION tuple to designate the associated operation's status with respect to the software solution and to select OPERATION tuples and their associated operations based on the KEEP_FLAG attribute value;

generating an OP_ID-REQ_ID tuple for each different REQ_ID attribute value of a REQ_ID-RSVERB tuple whose RSVERB attribute value or PCVERB attribute value is identical to the VERB attribute value of the unique required operation's associated OPERATION tuple, thereby correlating the unique required operation with the requirement statements corresponding to the primary candidate verb mapped to the unique required operation;

generating a DATA-OPERATION tuple for each unique required operation that operates solely on a specific unique required datum, whereby the design and implementation of the unique required operation is dependent on the design and implementation of the specific unique required datum;

identifying reuse candidates by generating a REUSE CANDIDATE tuple for each unique required datum or unique required operation specifically designated for reuse within a target software solution or across related software solutions; using a DA_OR_OP_ID attribute of the REUSE CANDIDATE tuple to correlate the reuse candidate with a specific DATA tuple and its associated datum or with a specific OPERATION tuple and its associated operation;

instructions for analyzing change and evolution of the software solution by:

identifying expected and feasible or feasible (EFF) changes that would be made to requirements, requirements and solution elements, or solution elements (to RRSS), whereby each solution element is a unique required datum or is a unique required operation and whereby the EFF changes would be made during the evolution of the software solution, by:

for each identified EFF change: generating a CHANGE DETAILS tuple; using a CHANGE_ID attribute of the CHANGE DETAILS tuple to identify the CHANGE DETAILS tuple and its associated EFF change; using a LIKELIHOOD attribute of the CHANGE DETAILS tuple to indicate a likelihood that the associated EFF change will be implemented to evolve the software solution;

identifying the solution elements that would be impacted by the EFF changes by:

for each EFF change: identifying a change impact relationship and generating a CHANGE IMPACT RELATIONSHIP tuple for each solution element that a software developer would need to review and potentially alter to implement the EFF change during the evolution of the software solution; using an ISSUE attribute, a DECISION attribute, and a STATUS attribute of CHANGE IMPACT DECISION tuples to track change impact relationship decisions;

instructions for partitioning a target set of solution elements into multi-level software encapsulations that localize the impact of a target set of EFF changes by:

specifying target EFF changes by selecting the entire set, or part thereof, of the EFF changes identified in a prerequisite analysis of the EFF changes to RRSS; using a USER_ID attribute of TARGET LIKELIHOOD tuples to associate parameters used to select target EFF changes with a specific user;

specifying target solution elements by selecting the entire set, or part thereof, of the solution elements resulting from a prerequisite analysis of the unique required data and of the unique required operations; using the USER_ID attribute of TARGET KEEP FLAG tuples to associate parameters used to select target solution elements with a specific user;

generating an IMPACT PARTITION tuple to be associated with an impact partition of target solution elements that would be impacted by target EFF changes; generating or inputting a unique value for an IMP_PAR_ID attribute of the IMPACT PARTITION tuple to identify the IMPACT PARTITION tuple and its associated impact partition;

generating a set of small software components that partition the target solution elements that would be impacted by the target EFF changes during evolution of the software solution, whereby each impacted small component comprises one or more impacted target solution elements and each target solution element contained within a specific impacted small component would be impacted by each target EFF change that is associated with the impacted small component, by:
  for each impacted small component: generating an IMPACTED SMALL COMPONENT tuple; generating or inputting a unique value for an IMP_SM_COMP_ID attribute of the IMPACTED SMALL COMPONENT tuple to identify the IMPACTED SMALL COMPONENT tuple and its associated impacted small component;
  for each target solution element contained within an impacted small component: generating an IMPACTED SMALL COMPONENT-DATA_OR_OP tuple to correlate the target solution element and its associated DATA tuple or the target solution element and its associated OPERATION tuple with the impacted small component that contains the target solution element and its associated IMPACTED SMALL COMPONENT tuple;

generating a set of large software components that partition the impacted small components, whereby each impacted large component comprises the impacted small components whose constituent target solution elements would be impacted by one or more of the target EFF changes associated with the impacted large component, by:
  for each impacted large component: generating an IMPACTED LARGE COMPONENT tuple; generating or inputting a unique value for an IMP_LG_COMP_ID attribute of the IMPACTED LARGE COMPONENT tuple to identify the IMPACTED LARGE COMPONENT tuple and its associated impacted large component;
  for each impacted small component contained within an impacted large component: generating an IMPACTED LARGE COMPONENT-IMPACTED SMALL COMPONENT tuple to associate the impacted small component and its associated IMPACTED SMALL COMPONENT tuple with the impacted large component that contains the impacted small component and its associated IMPACTED LARGE COMPONENT tuple;

generating a NO IMPACT PARTITION tuple to be associated with a no impact partition of target solution elements that would not be impacted by target EFF changes; generating or inputting a unique value for a NIMP_PAR_ID attribute of the NO IMPACT PARTITION tuple to identify the NO IMPACT PARTITION tuple and its associated no impact partition;

for each target solution element that would not be impacted by any of the target EFF changes: generating a NOT IMPACTED SMALL COMPONENT tuple to be associated with a not impacted small component consisting of the solution element;

for each not impacted small component: generating a NOT IMPACTED LARGE COMPONENT tuple to be associated with a not impacted large component consisting of the not impacted small component, thus paralleling the multi-level encapsulation of the target solution elements that would be impacted by the target EFF changes.

22. The system recited in claim 21, wherein the processor is further configured for refining primary candidate nouns and primary candidate verbs to eliminate redundant, redundant and ambiguous, or ambiguous candidates and to standardize primary candidate nouns used to describe required item-features and primary candidate verbs used to describe required action-features by:
  merging and deleting or deleting primary candidate nouns that are redundant by combining and deleting or deleting the associated PRIMARY CANDIDATE NOUN tuples;
  renaming primary candidate nouns that are ambiguous, ambiguous and non-standard, or non-standard by changing the NOUN attribute values of the associated PRIMARY CANDIDATE NOUN tuples;
  merging and deleting or deleting primary candidate verbs that are redundant by combining and deleting or deleting the associated PRIMARY CANDIDATE VERB tuples;
  renaming primary candidate verbs that are ambiguous, ambiguous and non-standard, or non-standard by changing the VERB attribute values of the associated PRIMARY CANDIDATE VERB tuples.

23. The system recited in claim 22, wherein the system further comprises:
  a database configured to store NOUN SYNONYM tuples and VERB SYNONYM tuples;
  the processor is further configured for identifying and using standard primary candidate noun synonyms and standard primary candidate verb synonyms by:
    for each ordered pair of primary candidate nouns that are synonyms: preloading or generating a NOUN SYNONYM tuple; using a STANDARD attribute of the associated NOUN SYNONYM tuple to designate that a first element in an ordered pair of noun synonyms is a standard noun; searching NOUN SYNONYM tuples to locate and reuse primary candidate nouns that are synonyms and standard nouns;
    for each ordered pair of primary candidate verbs that are synonyms: preloading or generating a VERB SYNONYM tuple; using the STANDARD attribute of the associated VERB SYNONYM tuple to designate that a first element in an ordered pair of verb synonyms is a standard verb; searching VERB SYNONYM tuples to locate and reuse primary candidate verbs that are synonyms and standard verbs.

24. The system recited in claim 22, wherein the processor is further configured for enabling identification and reconstruction of deleted primary candidates and facilitating traceability between refined primary candidates and their correlated requirement statements by:
  designating the deletion of a primary candidate noun via a PCDELETED attribute of the REQ_ID-RSNOUN tuples that have RSNOUN attribute values identical to the primary candidate noun; using the PCDELETED attribute of REQ_ID-RSNOUN tuples with identical RSNOUN attribute values to identify a primary candidate noun that was deleted and generating a new PRIMARY CANDIDATE NOUN tuple to reconstruct the primary candidate noun;

recording a new name for a primary candidate noun in the PCNOUN attribute of the REQ_ID-RSNOUN tuples that have RSNOUN attribute values identical to a former name of the primary candidate noun; using the PCNOUN attribute to locate the REQ_ID-RSNOUN tuples that correspond to the renamed primary candidate noun and using the REQ_ID attribute values of these REQ_ID-RSNOUN tuples to locate the requirement statements that correlate to the primary candidate noun;

designating the deletion of a primary candidate verb via the PCDELETED attribute of the REQ_ID-RSVERB tuples that have RSVERB attribute values identical to the primary candidate verb; using the PCDELETED attribute of REQ_ID-RSVERB tuples with identical RSVERB attribute values to identify a primary candidate verb that was deleted and generating a new PRIMARY CANDIDATE VERB tuple to reconstruct the primary candidate verb;

recording a new name for a primary candidate verb in the PCVERB attribute of the REQ_ID-RSVERB tuples that have RSVERB attribute values identical to the former name of the primary candidate verb; using the PCVERB attribute to locate the REQ_ID-RSVERB tuples that correspond to the renamed primary candidate verb and using the REQ_ID attribute values of these REQ_ID-RSVERB tuples to locate the requirement statements that correlate to the primary candidate verb.

25. The system recited in claim 21, wherein the processor is further configured for characterizing each unique required datum and each unique required operation via a plurality of attributes that compose the associated DATA tuple or the associated OPERATION tuple by:

generating or inputting a unique DATA_ID attribute value to identify the datum or a unique OP_ID value to identify the operation;

inputting a USE attribute value that describes a purpose of the datum or operation;

inputting a FUNCTION attribute value that outlines the operation's required actions including directives or calls to other operations in the order of their execution;

assigning a KEEP_FLAG attribute value to indicate the status of the datum or operation with respect to its inclusion in the software solution; selecting keep flag values from a plurality of standard terms comprising "ONGOING" to indicate the datum or operation being part of the software solution going forward, "REF" to indicate the datum or operation being used for reference only as part of a design rationale, "REC" to indicate that the datum or operation has been recomposed, and other terms;

generating, inputting, or assigning values for other attributes that enable a software developer to understand, implement, and recall required behavior and design rationale for the required datum or for the required operation.

26. The system recited in claim 21, wherein the processor is further configured for characterizing each newly identified reuse candidate via a plurality of attributes that compose the associated REUSE CANDIDATE tuple by:

assigning the value of the DATA_ID attribute of the corresponding datum's associated DATA tuple or the value of the OP_ID attribute of the corresponding operation's associated OPERATION tuple to the DA_OR_OP_ID attribute of the REUSE CANDIDATE tuple;

assigning the value of the NOUN attribute of the corresponding datum's associated DATA tuple or the value of the VERB attribute of the corresponding operation's associated OPERATION tuple as a default value for a NAME attribute of the REUSE CANDIDATE tuple;

assigning a value of "ACROSS", "WITHIN", or another standard term to a REUSE_SCOPE attribute of the REUSE CANDIDATE tuple to designate an expected scope for reuse;

inputting or assigning a value to a LIBRARY_REFERENCE attribute of the REUSE CANDIDATE tuple that facilitates location of the corresponding datum's implementation or of the corresponding operation's implementation;

generating, inputting, or assigning values for other attributes that help the software developer to identify and apply reuse candidates.

27. The system recited in claim 25, wherein the system is further configured to comprise:

a database to store DATA PARENT-CHILD tuples and OPERATION PARENT-CHILD tuples;

the processor is further configured for refining the unique required data and the unique required operations to satisfy required software solution qualities, whereby software solution qualities that are required comprise changeability and reuse and software solution qualities that may be required comprise adaptability, performance, security, and others, by:

decomposing large-effect parent data into smaller-effect child data and large-effect parent operations into smaller-effect child operations by:

for each new child datum:

generating a new DATA tuple; assigning a standard value or inputting another value for the NOUN attribute of the new DATA tuple to name the smaller datum; using information associated with a parent datum to determine an appropriate USE attribute value for the child datum; assigning the value "ONGOING" to the new DATA tuple's KEEP_FLAG attribute;

generating a DATA PARENT-CHILD tuple to associate the child datum and its associated DATA tuple with the parent datum and its associated DATA tuple; for each requirement statement associated with the parent datum that the child helps to satisfy: generating a DATA_ID-REQ_ID tuple to associate the requirement restatement with the child datum;

for each new child operation:

generating a new OPERATION tuple; assigning a standard value or inputting another value for the VERB attribute of the new OPERATION tuple to name the smaller operation; using information associated with a parent operation to determine appropriate USE and FUNCTION attribute values for the child operation; assigning the value "ONGOING" to the new OPERATION tuple's KEEP_FLAG attribute;

generating an OPERATION PARENT-CHILD tuple to associate the child operation and its associated operation tuple with the parent operation and its associated operation tuple; for each requirement statement associated with the parent operation that the child helps to satisfy: generating an OP_ID-REQ_ID tuple to associate the requirement restatement with the child operation;

recharacterizing the parent datum via modification of the parent datum's associated DATA tuple or recharacterizing the parent operation via modification of the parent operation's associated OPERATION tuple by:
    replacing each required action in the parent operation's FUNCTION attribute value to be performed by a child operation with a name of the child operation consisting of the VERB attribute value of the child operation's associated OPERATION tuple;
    assigning a value to a PARENT_RELATIONSHIP attribute to indicate a relationship between the parent datum and its child datum or child data or between a parent operation and its child operation or child operations; selecting PARENT_RELATIONSHIP attribute values from a plurality of standard terms comprising "G-S" to indicate a general-to-specific relationship, "W-P" to indicate a whole-part relationship, and other terms;
    changing the KEEP_FLAG attribute value to "REF" if the parent datum or parent operation will not be needed in the software solution;
reducing redundancy through the reuse of data and operations within the software solution by:
    assigning the value "REF" to the KEEP_FLAG attribute of a redundant datum's associated DATA tuple or of a redundant operation's associated OPERATION tuple;
    replacing each reference to a redundant operation within the FUNCTION attribute value of a referencing operation's associated OPERATION tuple with a name for the operation to be reused in place of the redundant operation.

28. The system recited in claim 27, wherein the processor is further configured for enabling recomposition of child data and of child operations by:
    verifying with respect to a current parent-child and referencing structure within the software solution whether specific data or operations should be recomposed;
    assigning the value "REC" to indicate recomposed or recombined with parent to the KEEP_FLAG attribute value of each recomposed child's associated DATA tuple or OPERATION tuple;
    replacing each reference to a recomposed child operation in the FUNCTION attribute value of a parent operation's associated OPERATION tuple by the required action performed by the child operation;
    assigning the value "ONGOING" to the KEEP_FLAG attribute of the DATA tuple associated with each parent datum of each recomposed child datum;
    assigning the value "ONGOING" to the KEEP_FLAG attribute of the OPERATION tuple associated with each parent operation of each recomposed child operation.

29. The system recited in claim 21, wherein the system further comprises:
    a database configured to store CHANGE-KEYWORD tuples;
    the processor is further configured for describing each EFF change, eliminating redundant EFF changes, and reusing EFF change descriptions across analyses of change and evolution that involve different sets of requirement statements or alternative change likelihood values by:
    characterizing each EFF change via a plurality of attributes composing the associated CHANGE DETAILS tuple by:
        generating or inputting a unique CHANGE_ID attribute value to identify the EFF change;
        inputting a detailed DESCRIPTION attribute value to describe the nature of the EFF change;
        assigning a LIKELIHOOD attribute value to indicate the current likelihood that the EFF change will be implemented to evolve the software solution; selecting likelihood values from a plurality of standard terms comprising "EXPECTED", "LIKELY", "FEASIBLE", "NOT EXPECTED", and other terms;
        generating, inputting, or assigning values for other attributes that help the software developer to identify, apply, and reuse change detail descriptions;
    for each keyword used to search for a specific change and its associated CHANGE DETAILS tuple: preloading or generating a CHANGE-KEYWORD tuple; using CHANGE-KEYWORD tuples to locate and reuse change descriptions; eliminating redundant change descriptions by deleting or archiving the associated CHANGE DETAILS tuples.

30. The system recited in claim 21, wherein the processor is further configured for describing each change impact relationship via a plurality of attributes composing the associated CHANGE IMPACT RELATIONSHIP tuple by:
    assigning the CHANGE_ID attribute value of the CHANGE DETAILS tuple associated with a specific EFF change that would impact a specific solution element to the CHANGE_ID attribute;
    assigning the DATA_ID attribute value of the DATA tuple or the OP_ID attribute value of the OPERATION tuple associated with the specific solution element that would be impacted by the specific EFF change to the DA_OR_OP_ID attribute;
    selecting a CHANGE RELATIONSHIP attribute value from a plurality of standard terms comprising "ADD", "MODIFY", "DELETE", "UNCERTAIN", and other terms that describe a type of change that would be needed to the specific solution element that would be impacted by the specific EFF change;
    generating, inputting, or assigning values for other attributes that help the software developer to understand the impact that EFF changes would have on the solution elements and to make decisions regarding the evolution of the software solution.

31. The system recited in claim 21, wherein the processor is further configured for generating a CHANGE IMPACT DECISION tuple for each decision that users identify as needing to be made about whether a specific EFF change would impact a specific solution element and about the nature of the impact; characterizing and tracking change impact decisions to be made via a plurality of attributes comprising the CHANGE IMPACT DECISION tuple associated with each decision by:
    assigning the CHANGE_ID attribute value of the CHANGE DETAILS tuple associated with the specific EFF change for which a change impact decision is needed to the CHANGE_ID attribute;
    assigning the DATA_ID attribute value of the DATA tuple or the OP_ID attribute value of the OPERATION tuple associated with the specific solution element for which the change impact decision is needed to the DA_OR_OP_ID attribute;

inputting an ISSUE attribute value to describe the issue or decision to be made about the impact of the EFF change;

inputting a DECISION attribute value to describe the change impact decision that is made and the rationale for the decision;

selecting a STATUS attribute value from a plurality of standard terms comprising "OPEN", "CLOSED", "DISMISSED", and other terms;

generating, inputting, or assigning values for other attributes that help the software developer to track and manage change impact decisions.

32. The system recited in claim 21, wherein the processor is further configured for specifying the target set of EFF changes via selection from a default set of EFF changes identified in the prerequisite analysis of the EFF changes to RRSS by:

enabling users to specify the target EFF changes by directly selecting the associated CHANGE DETAILS tuples or by specifying target LIKELIHOOD attribute values used to select the associated CHANGE DETAILS tuples;

generating a TARGET LIKELIHOOD tuple for each valid user-specified likelihood value or for each standard likelihood value; assigning a valid user ID to the USER_ID attribute of the TARGET LIKELIHOOD tuples to designate the target likelihood values for reuse by a specific user.

33. The system recited in claim 21, wherein the processor is further configured for specifying the target set of solution elements via selection from a default set of solution elements resulting from the prerequisite analysis of the unique required data and of the unique required operations by:

enabling users to specify the target solution elements by directly selecting the associated DATA tuples, DATA tuples and OPERATION tuples, or OPERATION tuples or by specifying target KEEP_FLAG attribute values used to select the associated tuples;

generating a TARGET KEEP FLAG tuple for each valid user-specified keep flag value or for each standard keep flag value; assigning a valid user ID to the USER_ID attribute of the TARGET KEEP FLAG tuples to designate the target keep flag values for reuse by a specific user.

34. The system recited in claim 31, wherein the processor is further configured for verifying the target EFF changes, target solution elements, and corresponding target change impact relationships to be used in generating the impact partition by:

verifying that each EFF change identified in the prerequisite analysis of the EFF changes to RRSS is associated with an existing CHANGE DETAILS tuple that is assigned a valid CHANGE_ID attribute value and a valid LIKELIHOOD attribute value; providing for deletion of EFF changes associated with missing or invalid tuples from the target set of EFF changes;

checking the solution elements identified in the prerequisite analysis of the unique required data and of the unique required operations by:

verifying that each solution element of type datum is associated with an existing DATA tuple that is assigned a valid DATA_ID attribute value and a valid KEEP_FLAG attribute value;

verifying that each solution element of type operation is associated with an existing OPERATION tuple that is assigned a valid OP_ID attribute value and a valid KEEP_FLAG attribute value;

providing for deletion of solution elements associated with missing or invalid tuples from the target set of solution elements;

using the CHANGE IMPACT DECISION tuples associated with the target EFF changes and the target solution elements to identify corresponding change impact relationships that have not been closed or resolved; providing for exclusion of change impact relationships involving open issues from the target change impact relationships to be used in a subsequent generation of the impact partition by removing the associated CHANGE IMPACT RELATIONSHIP tuples from a target set of CHANGE IMPACT RELATIONSHIP tuples used to generate the impact partition.

35. The system recited in claim 21, wherein the system further comprises:

a database configured to store IMPACT PARTITION-CHANGE tuples, IMPACT PARTITION-DATA_OR_OP tuples, IMPACT PARTITION-IMPACTED LARGE COMPONENT tuples, and NO IMPACT PARTITION-NOT IMPACTED LARGE COMPONENT tuples;

the processor is further configured for enabling the generation, storage, retrieval, and comparison of alternative impact partitions by:

using the IMP_PAR_ID attribute value of the IMPACT PARTITION tuple associated with a specific impact partition to correlate a plurality of tuples associated with parameters and results of the impact partition by:

for each target EFF change used to generate the impact partition:

generating an IMPACT PARTITION-CHANGE tuple and assigning the IMP_PAR_ID attribute value of the impact partition's associated IMPACT PARTITION tuple to the IMP_PAR_ID attribute of the IMPACT PARTITION-CHANGE tuple;

retaining knowledge of the target EFF change's current likelihood by assigning the LIKELIHOOD attribute value of the target EFF change's associated CHANGE DETAILS tuple to the LIKELIHOOD attribute of the IMPACT PARTITION-CHANGE tuple;

for each target solution element used to generate the impact partition:

generating an IMPACT PARTITION-DATA_OR_OP tuple and assigning the IMP_PAR_ID attribute value of the impact partition's associated IMPACT PARTITION tuple to the IMP_PAR_ID attribute of the IMPACT PARTITION-DATA_OR_OP tuple;

retaining knowledge of the target solution element's status by assigning the KEEP_FLAG attribute value of the associated DATA tuple or associated OPERATION tuple to the KEEP_FLAG attribute of the IMPACT PARTITION-DATA_OR_OP tuple;

using an IMPACTED attribute of the IMPACT PARTITION-DATA_OR_OP tuple to denote whether the target solution element would be impacted by one or more of the target EFF changes used to generate the impact partition;

for each impacted large component composing the impact partition:

generating an IMPACT PARTITION-IMPACTED LARGE COMPONENT tuple and assigning the

IMP_PAR_ID attribute value of the impact partition's associated IMPACT PARTITION tuple to the IMP_PAR_ID attribute of the IMPACT PARTITION-IMPACTED LARGE COMPONENT tuple;
using the IMP_LG_COMP_ID attribute of the IMPACT PARTITION-IMPACTED LARGE COMPONENT tuple to provide a link to the impacted large component's associated IMPACTED LARGE COMPONENT tuple and to corresponding IMPACTED LARGE COMPONENT-IMPACTED SMALL COMPONENT tuples;
using IMP_SM_COMP_ID attribute values of corresponding IMPACTED LARGE COMPONENT-IMPACTED SMALL COMPONENT tuples to locate IMPACTED SMALL COMPONENT tuples associated with the impacted small components contained within the impacted large component;
using IMP_SM_COMP_ID attribute values of IMPACTED SMALL COMPONENT tuples associated with the impacted small components contained within the impacted large component to locate corresponding IMPACTED SMALL COMPONENT-DATA_OR_OP tuples and using DA_OR_OP_ID attribute values of corresponding IMPACTED SMALL COMPONENT-DA_OR_OR tuples to identify the target solution elements that compose each impacted small component;
using the NIMP_PAR_ID attribute value of the NO IMPACT PARTITION tuple associated with a specific no impact partition to correlate a plurality of tuples associated with the results of the no impact partition by:
for each not impacted large component composing the no impact partition:
generating a NO IMPACT PARTITION-NOT IMPACTED LARGE COMPONENT tuple, whereby a NIMP_LG_COMP_ID attribute of the NO IMPACT PARTITION-NOT IMPACTED LARGE COMPONENT tuple provides a link to the not impacted large component's associated NOT IMPACTED LARGE COMPONENT tuple;
using a NIMP_SM_COMP_ID attribute value of the associated NOT IMPACTED LARGE COMPONENT tuple to locate a NOT IMPACTED SMALL COMPONENT tuple associated with the not impacted small component contained within the not impacted large component; using the NOT IMPACTED SMALL COMPONENT tuple's DA_OR_OP_ID attribute value to identify the target solution element contained within the associated not impacted small component;
associating each no impact partition with its prerequisite impact partition by correlating the IMP_PAR_ID attribute values of the associated NO IMPACT PARTITION tuple and IMPACT PARTITION tuple.

36. The system recited in claim 21, wherein the processor is further configured for generating unique change signature values and a change signature index to facilitate rapid analysis of the scope and nature of the impact of target EFF changes on impacted large components and impacted small components composing an impact partition by:
for each impacted large component's associated IMPACTED LARGE COMPONENT tuple: generating and assigning a unique value to an IMP_LG_COMP_CH_SIGNATURE attribute to indicate specific target EFF changes associated with the impacted large component and the scope of the impact of these target EFF changes across the target solution elements contained within the impacted small components that comprise the impacted large component;
for each impacted small component's associated IMPACTED SMALL COMPONENT tuple: generating and assigning a unique value to an IMP_SM_COMP_CH_SGNATURE attribute to indicate specific target EFF changes associated with the impacted small component and the scope of the impact of these target EFF changes across the target solution elements contained within the impacted small component;
generating and communicating to users the change signature index that shows the impact of the target EFF changes associated with a specific impact partition by:
for each target EFF change associated with the impact partition:
indicating the CHANGE_ID attribute value of the CHANGE DETAILS tuple associated with the target EFF change;
indicating the IMP_LG_COMP_CH_SIGNATURE attribute value of the IMPACTED LARGE COMPONENT tuple associated with the impacted large component that would be impacted by the target EFF change;
indicating the IMP_SM_COMP_CH_SIGNATURE attribute values of the IMPACTED SMALL COMPONENT tuples associated with the impacted small components that are contained within the impacted large component and whose constituent target solution elements would be impacted by the target EFF change.

37. The system recited in claim 29, wherein the system further comprises:
a database configured to store CHANGE-IMPACTED SMALL COMPONENT tuples;
the processor is further configured for facilitating analysis of the scope of the impact of target EFF changes across one or more software solutions designed using impact partition analyses that target specific EFF changes by:
for each target EFF change associated with an impact partition analysis:
for each impacted small component resulting from the impact partition analysis and impacted by the target EFF change:
generating a CHANGE-IMPACTED SMALL COMPONENT tuple to correlate the target EFF change and its associated CHANGE DETAILS tuple with the impacted small component and its associated IMPACTED SMALL COMPONENT tuple;
identifying CHANGE-KEYWORD tuples associated with user-specified keywords that describe the target EFF changes and using the CHANGE_ID attribute values of identified CHANGE-KEYWORD tuples to identify CHANGE DETAILS tuples and CHANGE-IMPACTED SMALL COMPONENT tuples associated with the target EFF changes;
using IMP_SM_COMP_ID attribute values of identified CHANGE-IMPACTED SMALL COMPONENT tuples to identify IMPACTED SMALL COMPONENT tuples associated with impacted small components that would be impacted by the target EFF changes; using other impact partition tuples and correlated attribute values to identify impacted large components that contain identified impacted small components and to identify target solution elements contained within identified impacted small components;

using IMP_PAR_ID attribute values to selectively identify and review impacted large components, impacted small components, and target solution elements associated with specific impact partitions that result from impact partition analyses associated with the target EFF changes.

38. The system recited in claim 21, wherein the processor is further configured for generating an ANALYSIS DECISION tuple for each decision to be made regarding an issue identified by users or automatically; characterizing and tracking each decision to be made via a plurality of attributes comprising the ANALYSIS DECISION tuple associated with the decision by:

generating and assigning a unique AN_DEC_ID attribute value to identify the analysis decision and its associated ANALYSIS DECISION tuple;

selecting an ANALYSIS attribute value from a plurality of standard terms describing a type of analysis, the standard terms comprising "Phase1: NV", "REVIEW-Phase1: NV", "Phase2:DO", "REVIEW-Phase2:DO", "ChangeID", "REVIEW-ChangeID", "ChangeImpact", "REVIEW-ChangeImpact", "Partition", "REVIEW-Partition", and other terms;

inputting an ISSUE attribute value to describe the issue or decision to be made;

inputting a DECISION attribute value to describe the decision that is made and the rationale for making the decision;

selecting a STATUS attribute value from a plurality of standard terms comprising "OPEN", "CLOSED", "DISMISSED", and other terms;

generating, inputting, or assigning values for other attributes that help the software developer to track and manage analysis decisions.

39. The system recited in claim 38, wherein the system further comprises:

a database configured to store ANALYSIS CONTEXT tuples, ANALYSIS CONTEXT-REQ_ID tuples, ANALYSIS CONTEXT-DATA_OR_OP tuples, ANALYSIS CONTEXT-CHANGE DETAILS tuples, ANALYSIS CONTEXT-IMPACT PARTITION tuples, ANALYSIS CONTEXT-ANALYSIS DECISION tuples, and other analysis context-related tuples to archive information regarding a specified set of correlated analyses;

the processor is further configured for retaining knowledge of analysis inputs and results to facilitate information reuse and reflection on major aspects of developing a software solution via a plurality of contextual tuples comprising:

generating an ANALYSIS CONTEXT tuple for each type of analysis performed within a specified set of correlated analyses; characterizing a context of the analysis via a plurality of attributes by:

generating or inputting a unique COR_AN_ID attribute value to identify the specific set of correlated analyses that include prerequisite analyses, generation of an impact partition, generation of a no impact partition, and analysis reviews;

assigning a user identifier to a LEAD_USER attribute to specify an authorized user who is a designated lead for managing the performance of a specific analysis within the specified set of correlated analyses;

selecting an ANALYSIS attribute value from the plurality of standard terms describing a type of analysis recited in claim 38;

generating, inputting, or assigning date, time, status, and other types of values for additional attributes that help software developers to track and manage analyses within the context of the specified set of correlated analyses;

generating analysis context tuples that each link the specified set of correlated analyses to an input, result, or other type of information related to one or more analyses in the set, comprising:

generating an ANALYSIS CONTEXT-REQ_ID tuple for each input RS for an analysis of nouns and verbs in requirements;

generating an ANALYSIS CONTEXT-DATA_OR_OP tuple for each datum and for each operation identified during an analysis of unique required data and of unique required operations;

generating an ANALYSIS CONTEXT-CHANGE DETAILS tuple for each change identified during an analysis of EFF changes to RRSS;

generating an ANALYSIS CONTEXT-IMPACT PARTITION tuple to link the specified set of correlated analyses to an associated impact partition;

generating an ANALYSIS CONTEXT-ANALYSIS DECISION tuple for each analysis decision identified during the performance of an analysis in the specified set of correlated analyses;

generating other tuples that each link the specified set of correlated analyses to a type of input, result, or related information about an analysis in the specified set of correlated analyses;

using the ANALYSIS CONTEXT tuple and other analysis context-related tuples to archive, retrieve, review, and reuse the inputs, results, and other information related to the performance of a specified set of correlated analyses.

40. The system recited in claim 39, wherein the system further comprises:

a database configured to store ANALYSIS MANAGER tuples and ANALYSIS AUTHORIZED USER tuples;

a database configured to store USER PROFILE tuples and USER SESSION tuples;

the processor is further configured for facilitating the use of analysis context information for project management and enabling user access verification by:

using the ANALYSIS CONTEXT tuples to track and report a lead authorized user in charge of a specific type of analysis within the specified set of correlated analyses, the total time spent by all authorized users working on the analysis, the start and end dates for all work performed on the analysis, and the status of the analysis selected from a set of standard terms comprising "READY_TO_START", "IN_PROGRESS", "ON_HOLD", "COMPLETED", "CANCELLED", and other terms;

generating an ANALYSIS MANAGER tuple for each valid user authorized to manage a specific set of correlated analyses; using the ANALYSIS MANAGER tuples to verify that a specific valid user is authorized to assign other valid users the authority to perform specific types of analyses within the context of the specified set of correlated analyses;

generating an ANALYSIS AUTHORIZED USER tuple for each valid user authorized to perform a specific type of analysis within the specified set of correlated analyses; using the ANALYSIS AUTHORIZED USER tuples to verify that a specific valid user is authorized to perform the specific type of analysis within the specified set of correlated analyses;

generating a USER PROFILE tuple for each valid user who is authorized to perform a selected type of operational feature; using the USER PROFILE tuples to verify that an input user identifier and password are associated with a valid user;

generating a USER SESSION tuple for each interval of time or session in which an authorized user works on an analysis; using the USER SESSION tuples to track and report the total time and specific days on which the authorized user works on a specific analysis of the specified set of correlated analyses.

* * * * *